(12) United States Patent
Darimont et al.

(10) Patent No.: US 12,497,615 B2
(45) Date of Patent: Dec. 16, 2025

(54) NUCLEIC ACID COMPOSITIONS AND METHODS OF MULTI-EXON SKIPPING

(71) Applicant: AVIDITY BIOSCIENCES, INC., La Jolla, CA (US)

(72) Inventors: Beatrice Diana Darimont, San Diego, CA (US); Yunyu Shi, La Jolla, CA (US); Michael Caramian Cochran, La Jolla, CA (US); Andrew John Geall, Carlsbad, CA (US)

(73) Assignee: AVIDITY BIOSCIENCES, INC., San Diego, CA (US)

( * ) Notice: Subject to any disclaimer, the term of this patent is extended or adjusted under 35 U.S.C. 154(b) by 981 days.

(21) Appl. No.: 17/605,955

(22) PCT Filed: Apr. 24, 2020

(86) PCT No.: PCT/US2020/029731
§ 371 (c)(1),
(2) Date: Oct. 22, 2021

(87) PCT Pub. No.: WO2020/219820
PCT Pub. Date: Oct. 29, 2020

(65) Prior Publication Data
US 2022/0235354 A1 Jul. 28, 2022

Related U.S. Application Data

(60) Provisional application No. 62/838,888, filed on Apr. 25, 2019.

(51) Int. Cl.
C12N 15/113 (2010.01)
A61K 31/7088 (2006.01)
C12N 15/11 (2006.01)
C12Q 1/68 (2018.01)

(52) U.S. Cl.
CPC ........ *C12N 15/113* (2013.01); *A61K 31/7088* (2013.01); *C12N 15/111* (2013.01); *C12N 2310/11* (2013.01); *C12N 2310/3145* (2013.01); *C12N 2310/3183* (2013.01); *C12N 2310/3233* (2013.01); *C12N 2310/3519* (2013.01); *C12N 2320/33* (2013.01)

(58) Field of Classification Search
None
See application file for complete search history.

(56) References Cited

U.S. PATENT DOCUMENTS

| | | | |
|---|---|---|---|
| 4,694,778 A | 9/1987 | Learn et al. | |
| 5,142,047 A | 8/1992 | Summerton et al. | |
| 5,185,444 A | 2/1993 | Summerton et al. | |
| 5,334,711 A | 8/1994 | Sproat et al. | |
| 5,627,053 A | 5/1997 | Usman et al. | |
| 5,716,824 A | 2/1998 | Beigelman et al. | |
| 5,736,557 A | 4/1998 | Hofheinz et al. | |
| 5,889,136 A | 3/1999 | Scaringe et al. | |
| 6,008,400 A | 12/1999 | Scaringe et al. | |
| 6,111,086 A | 8/2000 | Scaringe | |
| 6,194,551 B1 | 2/2001 | Idusogie et al. | |
| 6,528,624 B1 | 3/2003 | Idusogie et al. | |
| 6,538,124 B1 | 3/2003 | Idusogie et al. | |
| 6,821,783 B1 | 11/2004 | Comely et al. | |
| 6,884,869 B2 | 4/2005 | Senter et al. | |
| 7,364,731 B2 | 4/2008 | Idusogie et al. | |
| 7,452,987 B2 | 11/2008 | Giese et al. | |
| 7,498,298 B2 | 3/2009 | Doronina et al. | |
| 7,833,992 B2 | 11/2010 | Vargeese et al. | |
| 7,850,975 B2 | 12/2010 | Mullis | |
| 7,893,245 B2 | 2/2011 | Giese et al. | |
| 7,923,547 B2 | 4/2011 | Mcswiggen et al. | |
| 7,943,762 B2 | 5/2011 | Weller et al. | |
| 8,084,582 B2 | 12/2011 | Dahiyat et al. | |
| 8,084,598 B1 | 12/2011 | Bentwich | |
| 8,090,542 B2 | 1/2012 | Khvorova et al. | |
| 8,202,979 B2 | 6/2012 | Mcswiggen et al. | |
| 8,273,866 B2 | 9/2012 | Mcswiggen et al. | |
| 8,288,352 B2 | 10/2012 | Doronina et al. | |
| 8,324,370 B2 | 12/2012 | Giese et al. | |
| 8,324,371 B2 | 12/2012 | Popplewell et al. | |
| 8,361,979 B2 | 1/2013 | Aartsma-Rus et al. | |
| 8,455,634 B2 | 6/2013 | Wilton et al. | |
| 8,461,325 B2 | 6/2013 | Popplewell et al. | |
| 8,501,703 B2 | 8/2013 | Bennett et al. | |
| 8,501,930 B2 | 8/2013 | Rozema et al. | |
| 8,591,910 B2 | 11/2013 | Mullis | |
| 8,604,184 B2 | 12/2013 | Mullis et al. | |

(Continued)

FOREIGN PATENT DOCUMENTS

| | | | |
|---|---|---|---|
| CN | 106459955 A | 2/2017 | |
| EP | 0336675 A1 | 10/1989 | |

(Continued)

OTHER PUBLICATIONS

U.S. Appl. No. 16/649,572 Office Action dated Feb. 22, 2023.
Takeda, Shin'ichi. Exon-skipping therapy for Duchenne muscular dystrophy. Clinical Neurology 51:914-916 (2011) (English Abstract).
U.S. Appl. No. 16/649,572 Office Action dated Apr. 16, 2024.
U.S. Appl. No. 16/649,572 Office Action dated Oct. 30, 2024.
Brain and Development 42:117-123 (2010).
Aartsma-Rus et al., Antisense-induced multiexon skipping for Duchenne muscular dystrophy makes more sense. American Journal of Human Genetics 74(1):83-92 (2004).
Aartsma-Rus et al. Guidelines for antisense oligonucleotide design and insight into splice-modulating mechanisms. Mol Ther 17(3):548-53 (2009).
Aartsma-Rus et al. Targeted exon skipping as a potential gene correction therapy for Duchenne muscular dystrophy. Neuromuscul Disord. 12 Suppl 1:S71-7 (2002).

(Continued)

*Primary Examiner* — Sean Mcgarry
(74) *Attorney, Agent, or Firm* — WILSON SONSINI GOODRICH & ROSATI

(57) ABSTRACT

Disclosed herein are oligonucleotide conjugates and pharmaceutical compositions for inducing multi-exon skipping. In some instances, also disclosed herein are methods of treating a muscular dystrophy, including treating Duchenne muscular dystrophy or Becker muscular dystrophy.

15 Claims, 12 Drawing Sheets

Specification includes a Sequence Listing.

(56) References Cited

U.S. PATENT DOCUMENTS

| | | | |
|---|---|---|---|
| 8,609,105 B2 | 12/2013 | Senter et al. |
| 8,618,277 B2 | 12/2013 | Beigelman et al. |
| 8,648,185 B2 | 2/2014 | Mcswigen et al. |
| 8,697,688 B2 | 4/2014 | Howard et al. |
| 8,895,722 B2 | 11/2014 | Iversen et al. |
| 8,933,215 B2 | 1/2015 | Giese et al. |
| 8,936,910 B2 | 1/2015 | Mitsch et al. |
| 8,969,526 B2 | 3/2015 | Baehner et al. |
| 9,078,911 B2 | 7/2015 | Lu |
| 9,089,614 B2 | 7/2015 | Lin et al. |
| 9,096,877 B2 | 8/2015 | Johnson et al. |
| 9,139,828 B2 | 9/2015 | Platenburg et al. |
| 9,175,286 B2 | 11/2015 | Wilton et al. |
| 9,181,551 B2 | 11/2015 | Mcswiggen et al. |
| 9,222,092 B2 | 12/2015 | Giese et al. |
| 9,228,187 B2 | 1/2016 | Wilton et al. |
| 9,234,198 B1 | 1/2016 | Sazani et al. |
| 9,243,245 B2 | 1/2016 | De Kimpe et al. |
| 9,243,251 B2 | 1/2016 | Popplewell et al. |
| 9,243,252 B2 | 1/2016 | Popplewell et al. |
| 9,249,416 B2 | 2/2016 | Wilton et al. |
| 9,260,471 B2 | 2/2016 | Cancilla et al. |
| 9,416,361 B2 | 8/2016 | Iversen et al. |
| 9,434,948 B2 | 9/2016 | Sazani et al. |
| 9,441,229 B2 | 9/2016 | Wilton et al. |
| 9,447,415 B2 | 9/2016 | Wilton et al. |
| 9,447,417 B2 | 9/2016 | Sazani et al. |
| 9,481,905 B2 | 11/2016 | Chen et al. |
| 9,499,818 B2 | 11/2016 | Van Deutukom |
| 9,512,424 B2 | 12/2016 | Watanabe et al. |
| 9,528,109 B2 | 12/2016 | De Kimpe et al. |
| 9,605,019 B2 | 3/2017 | Verdine et al. |
| 9,657,294 B2 | 5/2017 | Beigelman et al. |
| 9,695,211 B2 | 7/2017 | Wada et al. |
| 9,695,423 B2 | 7/2017 | Giese et al. |
| 9,732,344 B2 | 8/2017 | Beigelman et al. |
| 9,765,338 B2 | 9/2017 | Bennett et al. |
| 9,771,588 B2 | 9/2017 | Mcswiggen et al. |
| 9,796,974 B2 | 10/2017 | Rajeev et al. |
| 9,890,379 B2 | 2/2018 | De Kimpe et al. |
| 9,926,557 B2 | 3/2018 | De Kimpe et al. |
| 9,982,257 B2 | 5/2018 | Butler et al. |
| 10,000,754 B2 | 6/2018 | Beigelman et al. |
| 10,144,931 B2 | 12/2018 | Enya et al. |
| 10,179,912 B2 | 1/2019 | De Visser et al. |
| 10,337,003 B2 | 7/2019 | Kaye |
| 10,533,171 B2 | 1/2020 | Van Deutekom et al. |
| 10,781,450 B2 | 9/2020 | Wilton et al. |
| 10,994,020 B2 | 5/2021 | Levin et al. |
| 11,034,956 B2 | 6/2021 | Van Deutekom et al. |
| 11,168,141 B2 | 11/2021 | Subramanian et al. |
| 11,179,472 B2 | 11/2021 | Levin et al. |
| 11,311,627 B1 | 4/2022 | Levin et al. |
| 11,400,163 B2 | 8/2022 | Levin et al. |
| 11,459,358 B2 | 10/2022 | De Visser et al. |
| 12,064,483 B2 | 8/2024 | Levin et al. |
| 2002/0142980 A1 | 10/2002 | Thompson et al. |
| 2008/0311557 A1 | 12/2008 | Elsemore et al. |
| 2011/0081362 A1 | 4/2011 | Elledge et al. |
| 2011/0263686 A1 | 10/2011 | Wilton et al. |
| 2011/0294753 A1 | 12/2011 | De Kimpe et al. |
| 2011/0301218 A1 | 12/2011 | Bozzoni et al. |
| 2012/0065169 A1 | 3/2012 | Hanson et al. |
| 2012/0094299 A1 | 4/2012 | Ranum et al. |
| 2012/0172415 A1 | 7/2012 | Voit et al. |
| 2012/0270925 A1 | 10/2012 | Wilton et al. |
| 2013/0028919 A1 | 1/2013 | Howard et al. |
| 2013/0172238 A1 | 7/2013 | Mitsch et al. |
| 2013/0309256 A1 | 11/2013 | Lyon et al. |
| 2014/0127239 A1 | 5/2014 | Howard |
| 2014/0194610 A1 | 7/2014 | Verdine et al. |
| 2014/0286970 A1 | 9/2014 | Jeffrey et al. |
| 2014/0294851 A1 | 10/2014 | Nguyen |
| 2014/0296321 A1 | 10/2014 | Iversen |
| 2014/0315862 A1 | 10/2014 | Kaye |
| 2015/0037360 A1 | 2/2015 | Smith |
| 2015/0105539 A1 | 4/2015 | Miao et al. |
| 2015/0105540 A1 | 4/2015 | Miao et al. |
| 2015/0211006 A1 | 7/2015 | Butler et al. |
| 2016/0002637 A1 | 1/2016 | Sazani et al. |
| 2016/0053262 A1 | 2/2016 | Platenburg et al. |
| 2016/0102135 A1 | 4/2016 | Escobar-Cabrera |
| 2016/0298111 A1 | 10/2016 | Bestwick et al. |
| 2016/0304864 A1 | 10/2016 | De Kimpe et al. |
| 2016/0304877 A1 | 10/2016 | Swayze et al. |
| 2016/0367687 A1 | 12/2016 | Manoharan et al. |
| 2017/0107512 A1 | 4/2017 | De Kimpe et al. |
| 2017/0204410 A1 | 7/2017 | Watanabe et al. |
| 2017/0204414 A1 | 7/2017 | Van Deutekom et al. |
| 2017/0342416 A1 | 11/2017 | Mcswiggen et al. |
| 2018/0016574 A1 | 1/2018 | Bestwick et al. |
| 2018/0028554 A1 | 2/2018 | Van Deutekom et al. |
| 2018/0044675 A1 | 2/2018 | Watanabe et al. |
| 2018/0112214 A1 | 4/2018 | De Kimpe et al. |
| 2018/0127758 A1 | 5/2018 | Bennett |
| 2018/0163209 A1 | 6/2018 | Bennett et al. |
| 2018/0305689 A1 | 10/2018 | Sætrom et al. |
| 2018/0369400 A1 | 12/2018 | Levin et al. |
| 2019/0177723 A1 | 6/2019 | Dickson |
| 2019/0240346 A1 | 8/2019 | Sugo et al. |
| 2019/0330626 A1 | 10/2019 | Rigo et al. |
| 2020/0282074 A1* | 9/2020 | Levin ................ A61K 47/6949 |
| 2021/0254071 A1 | 8/2021 | Von Deutekom et al. |
| 2022/0025368 A1* | 1/2022 | van Deutekom ....... A61P 21/00 |
| 2022/0081689 A1 | 3/2022 | Rigo et al. |
| 2022/0288218 A1 | 9/2022 | Yokota et al. |
| 2022/0313833 A1 | 10/2022 | Levin et al. |
| 2023/0330128 A1 | 10/2023 | Van Deutekom et al. |
| 2024/0358736 A1 | 10/2024 | Levin et al. |
| 2025/0161344 A1 | 5/2025 | Levin et al. |
| 2025/0170260 A1 | 5/2025 | Levin et al. |

FOREIGN PATENT DOCUMENTS

| | | |
|---|---|---|
| EP | 0334656 B1 | 3/1994 |
| EP | 1579015 A2 | 9/2005 |
| EP | 1068241 B1 | 10/2007 |
| EP | 2119783 A1 | 11/2009 |
| EP | 2049664 B1 | 9/2011 |
| EP | 2278004 B1 | 10/2012 |
| EP | 2344637 B1 | 12/2014 |
| EP | 1423406 B2 | 11/2015 |
| EP | 3031920 A1 | 6/2016 |
| EP | 2421971 B1 | 7/2016 |
| EP | 2287306 B2 | 10/2016 |
| EP | 3030658 A4 | 3/2017 |
| EP | 2287305 B2 | 11/2017 |
| EP | 2486141 B1 | 1/2018 |
| EP | 2902406 B1 | 1/2018 |
| EP | 2595664 B1 | 10/2018 |
| WO | WO-9104753 A1 | 4/1991 |
| WO | WO-9207065 A1 | 4/1992 |
| WO | WO-9315187 A1 | 8/1993 |
| WO | WO-9726270 A2 | 7/1997 |
| WO | WO-9734631 A1 | 9/1997 |
| WO | WO-9813526 A1 | 4/1998 |
| WO | WO-0149698 A1 | 7/2001 |
| WO | WO-2004009851 A2 | 1/2004 |
| WO | WO-2004083446 A2 | 9/2004 |
| WO | WO-2006000057 A1 | 1/2006 |
| WO | WO-2008036127 A2 | 3/2008 |
| WO | WO-2009054725 A2 | 4/2009 |
| WO | WO-2009099942 A2 | 8/2009 |
| WO | WO-2009099991 A2 | 8/2009 |
| WO | WO-2009139630 A2 | 11/2009 |
| WO | WO-2009139630 A9 | 11/2009 |
| WO | WO-2009144481 A2 | 12/2009 |
| WO | WO-2010048586 A1 | 4/2010 |
| WO | WO-2010050801 A1 | 5/2010 |
| WO | WO-2011130371 A1 | 10/2011 |
| WO | WO-2011150408 A2 | 12/2011 |
| WO | WO-2013166155 A1 | 11/2013 |
| WO | WO-2014007620 A2 | 1/2014 |
| WO | WO-2014080251 A1 | 5/2014 |

(56) References Cited

FOREIGN PATENT DOCUMENTS

| | | |
|---|---|---|
| WO | WO-2014140317 A2 | 9/2014 |
| WO | WO-2014144978 A2 | 9/2014 |
| WO | WO-2014145090 A1 | 9/2014 |
| WO | WO-2014177042 A1 | 11/2014 |
| WO | WO-2014197748 A2 | 12/2014 |
| WO | WO-2014197854 A1 | 12/2014 |
| WO | WO-2015021457 A2 | 2/2015 |
| WO | WO-2015038426 A1 | 3/2015 |
| WO | WO-2015057699 A2 | 4/2015 |
| WO | WO-2015069587 A2 | 5/2015 |
| WO | WO-2015107425 A2 | 7/2015 |
| WO | WO-2016187425 A1 | 11/2016 |
| WO | WO-2016207240 A1 | 12/2016 |
| WO | WO-2017148879 A1 | 9/2017 |
| WO | WO-2017173408 A1 | 10/2017 |
| WO | WO-2017192679 A1 | 11/2017 |
| WO | WO-2017221883 A1 | 12/2017 |
| WO | WO-2018002812 A1 | 1/2018 |
| WO | WO-2018129384 A1 | 7/2018 |
| WO | WO-2019060775 A1 | 3/2019 |
| WO | WO-2019200185 A1 | 10/2019 |
| WO | WO-2020132584 A1 | 6/2020 |
| WO | WO-2020219820 A1 | 10/2020 |
| WO | WO-2021108640 A1 | 6/2021 |
| WO | WO-2021113390 A1 | 6/2021 |
| WO | WO-2021142307 A1 | 7/2021 |
| WO | WO-2022020107 A1 | 1/2022 |
| WO | WO-2023283615 A1 | 1/2023 |
| WO | WO-2023121444 A1 | 6/2023 |
| WO | WO-2023121445 A1 | 6/2023 |
| WO | WO-2023141710 A1 | 8/2023 |
| WO | WO-2023171820 A1 | 9/2023 |

OTHER PUBLICATIONS

Abramova et al. Novel oligonucleotide analogues based on morpholino nucleoside subunits-antisense technologies: new chemical possibilities. Indian Journal of Chemistry 48B:1721-1726 (2009).

Agarwal et al. A Pictet-Spengler ligation for protein chemical modification. PNAS 110(1):46-51 (2013).

Albarran et al. Efficient intracellular delivery of a pro-apoptotic peptide with a pH-responsive carrier. React Funct Polym 71:261-265 (2011).

Arechavala-Gomeza et al. Comparative analysis of antisense oligonucleotide sequences for targeted skipping of exon 51 during dystrophin pre-mRNA splicing in human muscle. Hum Gene Ther. 18(9):798-810 (2007).

Axup et al. Synthesis of site-specific antibody-drug conjugates using unnatural amino acids. PNAS 109(40):16101-16106 (2012).

Baumer et al. Antibody-mediated delivery of anti-KRAS-siRNA in vivo overcomes therapy resistance in colon cancer. Clin Can Res 21(6):1383-1394 (2015).

Beduneau et al. Design of targeted lipid nanocapsules by conjugation of whole antibodies and antibody Fab' fragments. Biomaterials 28(33):4978-4990 (2007).

Beigelman et al. Chemical modification of hammerhead ribozymes. Catalytic activity and nuclease resistance. J Biol Chem 270:25702-25708 (1995).

Bell et al. Epidermal Growth Factor Receptor Mutations and Gene Amplification in Non-Small-Cell Lung Cancer: Molecular Analysis of the Ideal/Intact Gefitinib Trials. J Clin Oncol 23(31):8081-8092 (2005).

Bird et al. Single-chain antigen-binding proteins. Science 242:423-442 (1988).

Blaney et al. Traceless solid-phase organic synthesis. Chem. Rev. 102:2607-2024 (2002.

Bulmus et al. A new pH-responsive and glutathione-reactive, endosomal membrane-disruptive polymeric carrier for intracellular delivery of biomolecular drugs. J Controlled Release 93:105-120 (2003).

Burke et al. siRNA-mediated knockdown of P450 oxidoreductase in rats: a tool to reduce metabolism by CYPs and increase exposure of high clearance compounds. Pharm. Res. 31(12):3445-3460 (2014).

Burlina et al. Chemical engineering of RNase resistant and catalytically active hammerhead ribozymes. Bioorg Med Chem 5:1999-2010 (1997).

Casi et al. Site-specific traceless coupling of potent cytotoxic drugs to recombinant antibodies for pharmacodelivery. J Am Chem Soc 134(13):5887-5892 (2012).

Castaneda et al. Acid-cleavable thiomaleamic acid linker for homogeneous antibody-drug conjugation, Chem. Commun. 49:8187-8189 (2013).

Chen et al. Strand-specific 5'-O-methylation of siRNA duplexes controls guide strand selection and targeting specificity. RNA 14:263-274 (2008).

Clackson et al. Making antibody fragments using phage display libraries. Nature 352(6336):624-628 (1991).

Colberre-Garapin et al. A new dominant hybrid selective marker for higher eukaryotic cells. J Mol Biol 150:1-14 (1981).

Cole et al. The EBV-hybridoma technique and its application to human lung cancer. In, Monoclonal Antibodies and Cancer Therapy (vol. 27, UCLA Symposia on Molecular and Cellular Biology, New Series) (eds. R.A. Reisfeld and S.Sell), New York: Alan R. Liss, Inc. pp. 77-96 (1985).

Crouse et al. Expression and amplification of engineered mouse dihydrofolate reductase minigenes. Mol Cell Biol 3(2):257-266 (1983).

Cuellar et al. Systematic evaluation of antibody-mediated siRNA delivery using an industrial platform of THIOMAB-siRNA conjugates. Nucleic Acids Res 43(2):1189-1203 (2015).

Darimont et al. 8-05 Abstract: A novel Antibody-Oligonucleotide Conjugate (AOC) platform enables efficient regulation of muscle targets in mice. Journal of Cachexia, Sarcopenia and Muscle 8:999-1080 (2017).

Dawson et al. Modulation of Reactivity in Native Chemical Ligation through the Use of Thiol Additives. J. Am. Chem. Soc. 119:4325-4329 (1997).

Dawson et al. Synthesis of proteins by native chemical ligation. Science 266(5186):776-779 (1994).

De Angelis et al. Chimeric snRNA molecules carrying antisense sequences against the splice junctions of exon 51 of the dystrophin pre-mRNA induce exon skipping and restoration of a dystrophin synthesis in Delta 48-50 DMD cells. PNAS USA 99:9456-9461 (2002).

Debinski et al. Monovalent immunotoxin containing truncated form of Pseudomonas exotoxin as potent antitumor agent. Cancer Research 52(19):5379-5385 (1992).

Deleavey et al. Designing chemically modified oligonucleotides for targeted gene silencing. Chem Biol. 19(8):937-954 (2012).

Dietel et al. A 2015 update on predictive molecular pathology and its role in targeted cancer therapy: a review focussing on clinical relevance. Cancer Gene Ther 22(9):417-430 (2015).

Dimasi et al. Development of a trispecific antibody designed to simultaneously and efficiently target three different antigens on tumor cells. Mol Pharm 12(9):3490-3501 (2015).

Domingo et al. Transferrin receptor as a target for antibody-drug conjugates. Methods in Enzymology 112:238-247 (1985).

Duncan et al. A polymer-Triton X-100 conjugate capable of pH-dependent red blood cell lysis: a model system illustrating the possibility of drug delivery within acidic intracellular compartments. J Drug Target 2:341-347 (1994).

Earnshaw et al. Modified oligoribonucleotides as site-specific probes of RNA structure and function. Biopolymers (Nucleic Acid Sciences) 48:39-55 (1998).

Echigoya et al. In Silico Screening Based on Predictive Algorithms as a Design Tool for Exon Skipping Oligonucleotides in Duchenne Muscular Dystrophy. PLoS One 10(3):e0120058 (2015).

El-Sayed et al. Rational design of composition and activity correlations for pH-responsive and glutathione-reactive polymer therapeutics. J Control Release 104:417-427 (2005).

Feener et al. Alternative splicing of human dystrophin mRNA generates isoforms at the carboxy terminus. Nature 338:509-511 (Apr. 6, 1989).

Ferreiro et al. Asymptomatic Becker muscular dystrophy in a family with a multiexon deletion. Muscle Nerve 39:239-243 (2009).

(56) References Cited

OTHER PUBLICATIONS

Flanary et al. Antigen delivery with poly(propylacrylic acid) conjugation enhanced MHC-1 presentation and T-cell activation. Bioconjugate Chem. 20:241-248 (2009).
Gao et al. Effective Dystrophin Restoration by a Novel Muscle-Homing Peptide-Morpholino Conjugate in Dystrophin-Deficient mdx Mice. Mol Ther. 22(7):1333-1341 (2014).
Gaziova et al. Chemically defined polyethylene glycol siRNA conjugates with enhanced gene silencing effect. Bioorg Med Chem 22(7):2320-2326 (2014).
Goldspiel et al. Human gene therapy. Clin Pharm 12:488-505 (1993).
Gooding et al. Oligonucleotide conjugates—Candidates for gene silencing therapeutics. Eur J Pharm Biopharm. 107:321-40 (2016).
Griffey et al. 2'-0-aminopropyl ribonucleotides: a zwitterionic modification that enhances the exonuclease resistance and biological activity of antisense oligonucleotides, J. Med. Chem. 39(26):5100-5109 (1997).
Hackeng et al. Protein synthesis by native chemical ligation: Expanded scope by using straightforward methodology. PNAS USA 96:10068-10073 (1999).
Hanes et al. In vitro selection and evolution of functional proteins by using ribosome display. PNAS USA 94:4937-4942 (1997).
Hejesen et al. A traceless aryl-triazene linker for DNA-directed chemistry. Org Biomol Chem 11(15):2493-2497 (2013).
Henry et al. pH-responsive poly(styrene-alt-maleic anhydride) alkylamide copolymers for intracellular drug delivery. Biomacromolecules 7:2407-2414 (2006).
Hitachi et al. Role of microRNAs in skeletal muscle hypertrophy. Front Physiol 16(4):408 (2014).
Hoffman et al. Restoring Dystrophin Expression in Duchenne Muscular Dystrophy Muscle: Progress in Exon Skipping and Stop Codon Read Through. Am J Pathol 179(1):12-22 (2011).
Hu et al. Site-specific Antibody-polymer Conjugates for siRNA Delivery. J Am Chem Soc 135(37):13885-13891 (2013).
Huang et al. Mechanisms of resistance to EGFR tyrosine kinase inhibitors. Acta Pharma Sinica B 5(5):390-401 (2015).
Hudson et al. Cellular delivery of hammerhead ribozymes conjugated to a transferrin receptor antibody. Int J Pharmaceuticals 182(1):49-58 (1999).
Huse et al. Generation of a large combinatorial library of the immunoglobulin repertoire in phage lambda. Science 246(4935):1275-1281 (1989).
Huston et al. Protein engineering of antibody binding sites: recovery of specific activity in an anti-digoxin single-chain Fv analogue produced in *Escherichia coli*. PNAS USA 85(16):5879-5883 (1988).
Ishikawa et al. Preparation of monomeric Fab'—horseradish peroxidase conjugate using thiol groups in the hinge and its evaluation in enzyme immunoassay and immunohistochemical staining. Ann N Y Acad Sci. 420:74-89 (1983).
Iversen et al. Optimized siRNA-PEG conjugates for extended blood circulation and reduced urine excretion in mice. Theranostics 3(3):201-209 (2013).
Jancik et al. Clinical relevance of KRAS in human cancers. J Biomed Biotechnol 2010:150960 (13 pgs.) (2010).
Jearawiriyapaisarn et al. Sustained Dystrophin Expression Induced by Peptide-conjugated Morpholino Oligomers in the Muscles of mdx Mice. Mol Ther. 16(9): 1624-1629 (2008).
Jones et al. Poly(2-alkylacrylic acid) polymers deliver molecules to the cytosol by pH-sensitive disruption of endosomal vesicles. Biochem J 372:65-75 (2003).
Karpeisky et al. Highly efficient synthesis of 2'-O-amino nucleosides and their incorporation in hammerhead ribozymes. Tetrahedron Lett 39:1131-1134 (1998).
Khormaee et al. Endosomolytic anionic polymer for the cytoplasmic delivery of siRNAs in localized in vivo applications. Adv Funct Mater 23:565-574 (2013).
Kim et al. PEG conjugated VEGF siRNA for anti-angiogenic gene therapy. J Cont Rel 116:123-129 (2006).

Kohler et al. Continuous cultures of fused cells secreting antibody of predefined specificity. Nature 256:495-497 (1975).
Koizumi. ENA oligonucleotides as therapeutics. Curr Opin Mol Ther 8(2):144-149 (2006).
Kontermann et al. Bispecific antibodies. Drug Discov Today 20(7):838-847 (2015).
Kozbor et al. The production of monoclonal antibodies from human lymphocytes. Immunology Today 4:72-79 (1983).
Kutmeier et al. Assembly of humanized antibody genes from synthetic oligonucleotides using a single-round PCR. BioTechniques 17:242 (1994).
Lee et al. Antisense PMO cocktails effectively skip dystrophin exons 45-55 in myotubes transdifferentiated from DMD patient fibroblasts. PLoS One 13(5):e0197084 (2018).
Lee et al. Direct Reprogramming of Human DMD Fibroblasts into Myotubes for In Vitro Evaluation of Antisense-Mediated Exon Skipping and Exons 45-55 Skipping Accompanied by Rescue of Dystrophin Expression. Methods Mol Biol. 1828:141-150 (2018).
Leigh et al. The Human Plasma Proteome: History, Character, and Diagnostic Prospects. Mol Cell Proteomics 1:845-867 (2002).
Levin. Targeting Therapeutic Oligonucleotides. N Engl J Med 376:86-88 (2017).
Loakes. Survey and summary: The applications of universal DNA base analogues. Nucleic Acids Research 29:2437-2447 (2001).
Loh et al. A Survey of siRNA Nanoscal Delivery Patents. 11 Nanotechnology Law & Bus. (pp. 29-37) (2014).
Lowy et al., Isolation of transforming DNA: Cloning the hamster aprt gene. Cell 22:817-823 (1980).
Lyon et al. Self-hydrolyzing maleimides improve the stability and pharmacological properties of antibody-drug conjugates. Nat. Biotechnol. 32(10):1059-1062 (2014).
Martinez et al. Single-stranded antisense siRNAs guide target RNA cleavage in RNAi. Cell 110(5):563-574 (2002).
McEnaney et al. Antibody-recruiting molecules: an emerging paradigm for engaging immune function in treating human disease. ACS Chem Biol. 7(7):1139-1151 (2012).
Mei et al. FBXO32 Targets c-Myc for Proteasomal Degradation and Inhibits c-Myc Activity. J Biol Chem 290:16202-16214 (2015).
Miyata et al. Polymer nanotechnology for nucleic acid delivery. Drug Delivery System 31(1):44-53 (2016) (English Abstract).
Morgan et al. Human gene therapy. Ann Rev Biochem 62:191-217 (1993).
Morrison et al. Chimeric human antibody molecules: mouse antigen-binding domains with human constant region domains. PNAS USA 81(21):6851-6855 (1984).
Mulligan et al. Selection for animal cells that express the *Escherichia coli* gene coding for xanthine-guanine phosphoribosyltransferase. PNAS USA 78(4):2072-2076 (1981).
Mulligan. The basic science of gene therapy. Science 260(5110):926-932 (1993).
Naisbitt et al. Disposition of amodiaquine and related antimalarial agents in human neutrophils: implications for drug design. J Pharmacol Exp Ther 280:884-893 (1997).
Nakamura et al. Follow-up of three patients with a large in-frame deletion of exons 45-55 in the Duchenne muscular dystrophy (DMD) gene. J. Clin. Neurosci. 15:757-763 (2008).
Neuberger et al. Recombinant antibodies possessing novel effector functions. Nature 312(5995):604-608 (1984).
Normand-Sdiqui et al. Oligonucleotide delivery: Uptake of rat transferrin receptor antibody (OX / 26) conjugates into an in vitro immortalised cell line model of the blood, brain barrier. Int J Pharmaceuticals 163:63-71 (1998).
Obika et al. Synthesis of 2'-0,4'-C-methyleneuridine and -cytidine. Novel bicyclic nucleosides having a fixed C3'-endo sugar puckering. Tetrahedron Lett. 38(50):8735-8738 (1997).
O'Hare et al. Transformation of mouse fibroblasts to methotrexate resistance by a recombinant plasmid expressing a prokaryotic dihydrofolate reductase. PNAS USA 78:1527-1531 (1981).
PCT/US2018/012672 International Search Report and Written Opinion dated May 24, 2018.
PCT/US2018/012672 Invitation to Pay Additional Fees dated Mar. 20, 2018.

(56) References Cited

OTHER PUBLICATIONS

PCT/US2018/052289 International Search Report and Written Opinion dated Jan. 11, 2019.
PCT/US2020/029731 International Invitation to Pay Additional Fees dated Aug. 3, 2020.
PCT/US2020/029731 International Search Report and Written Opinion dated Oct. 6, 2020.
Perrault et al. Mixed deoxyribo- and ribo-oligonucleotides with catalytic activity. Nature 344:565-568 (1990).
Pieken et al. Kinetic characterization of ribonuclease-resistant 2'-modified hammerhead ribozymes. Science 253:314-317 (1991).
Rozema et al. Dynamic PolyConjugates for targeted in vivo delivery of siRNA to hepatocytes. PNAS USA 104(32):12982-12987 (2007).
Santerre et al. Expression of prokaryotic genes for hygromycin B and G418 resistance as dominant-selection markers in mouse L cells. Gene 30(1-3):147-156 (1984).
Schnyder et al. Targeting of skeletal muscle in vitro using biotinylated immunoliposomes. Biochem J 377(Pt.1):61-67 (2004).
Schwarz et al. Evidence that siRNAs function as guides, not primers, in the *Drosophila* and human RNAi pathways. Molecular Cell 10:537-548 (2002).
Sekyere et al. Examination of the distribution of the transferrin homologue, melanotransferrin (tumour antigen p97), in mouse and human. Biochimica et Biophysica Acta 1722(2):131-142 (2005).
Singh et al. Recent developments in oligonucleotide conjugation. Chem Soc Rev 39(6):2054-2070 (2010).
Skerra et al. Assembly of a functional Immunoglobulin Fv fragment in *Escherichia coli*. Science 240(4855):1038-1041 (1988).
Strop et al. Location matters: site of conjugation modulates stability and pharmacokinetics of antibody drug conjugates. Chem Biol 20(2):161-167 (2013).
Sugo et al. Development of antibody-siRNA conjugate targeted to cardiac and skeletal muscles. J Control release 237:1-13 (2016).
Summerton, et al. Morpholino antisense oligomers: design, preparation, and properties. Antisense Nucleic Acid Drug Dev. Jun. 1997;7(3):187-95.
Sune-Pou et al. Targeting Splicing in the Treatment of Human Disease. Genes 8:E87 (2017).
Suriano et al. Beta-catenin (CTNNB1) gene amplification: a new mechanism of protein overexpression in cancer. Genes Chromosomes Cancer 42(3):238-246 (2005).
Suzuki et al. Endogenous Multiple Exon Skipping and Back-Splicing at the DMD Mutation Hotspot. Int JMol Sci. 17(10):1722 (2016).
Szybalska et al. Genetics of human cell line. IV. DNA-mediated heritable transformation of a biochemical trait. PNAS USA 48:2026-2034 (1962).
Takeda et al. Construction of chimaeric processed immunoglobulin genes containing mouse variable and human constant region sequences. Nature 314(6010):452-454 (1985).
Talasila et al. EGFR Wild-type Amplification and Activation Promote Invasion and Development of Glioblastoma Independent of Angiogenesis. Acta Neuropathol. 125(5):683-698 (2013).
Tolstoshev. Gene Therapy, Concepts, Current Trials and Future Directions. Ann. Rev. Pharmacol. Toxicol. 32:573-596 (1993).
U.S. Appl. No. 16/128,450 Miscellaneous Communication re: Third Party Submission dated Jul. 1, 2019.
U.S. Appl. No. 16/128,450 Office Action dated Apr. 19, 2019.
U.S. Appl. No. 16/128,450 Office Action dated Apr. 30, 2020.
U.S. Appl. No. 16/128,450 Office Action dated Dec. 16, 2020.
U.S. Appl. No. 16/128,450 Office Action dated Sep. 19, 2019.
U.S. Appl. No. 16/129,696 Miscellaneous Communication re: Third Party Submission dated Jul. 3, 2019.
U.S. Appl. No. 16/129,696 Office Action dated Apr. 13, 2020.
U.S. Appl. No. 16/129,696 Office Action dated Apr. 17, 2019.
U.S. Appl. No. 16/129,696 Office Action dated Dec. 14, 2020.
U.S. Appl. No. 16/129,696 Office Action dated May 26, 2021.
U.S. Appl. No. 16/129,696 Office Action dated Sep. 19, 2019.
U.S. Appl. No. 16/649,572 Miscellaneous Communication re: Third Party Submission dated Mar. 19, 2021.
U.S. Appl. No. 17/463,473 Office Action dated Dec. 13, 2021.
U.S. Appl. No. 17/463,484 Office Action dated Jan. 4, 2022.
Usman et al. Exploiting the chemical synthesis of RNA. Trends Biochem Sci 17:334-339 (1992).
Valtorta et al. KRAS gene amplification in colorectal cancer and impact on response to EGFR-targeted therapy. Int J Cancer 133:1259-1266 (2013).
Van Deutekom et al. Antisense-induced exon skipping restores dystrophin expression in DMD patient derived muscle cells. Hum Mol Genet. 10(15):1547-54 (2001).
Van Vliet et al. Assessment of the feasibility of exon 45-55 multiexon skipping for duchenne muscular dystrophy. BMC Medical Genetics 9:105 (2008).
Verma et al. Modified oligonucleotides: synthesis and strategy for users. Annu Rev Biochem 67:99-134 (1998).
Walker et al. Improved cellular delivery of antisense oligonucleotides using transferrin receptor antibody-oligonucleotide conjugates. Pharmaceutical research 12(10):1548-1553 (1995).
Ward et al. Binding activities of a repertoire of single immunoglobulin variable domains secreted from *Escherichia coli*. Nature 341(6242):544-546 (1989).
Watts et al. Chemically modified siRNA: tools and applications. Drug Discov Today 13(19-20):842-855 (2008).
Wigler et al. Transfer of purified herpes virus thymidine kinase gene to cultured mouse cells. Cell 11:223-232 (1977).
Wigler et al. Transformation of mammalian cells with an amplifiable dominant-acting gene. PNAS USA 77:3567-3570 (1980).
Winkler. Oligonucleotide conjugates for therapeutic applications. Ther Del 4(7):791-809 (2013).
Wong et al. Co-injection of a targeted, reversibly masked endosomolytic polymer dramatically improves the efficacy of cholesterol-conjugated small interfering RNAs in vivo. Nucleic Acid Ther 22(6):380-390 (2012).
Wu et al. Building complex glycopeptides: Development of a cysteine-free native chemical ligation protocol. Angew. Chem. Int. Ed. 45:4116-4125 (2006).
Wu et al. Cell-penetrating peptides as transporters for morpholino oligomers: effects of amino acid composition on intracellular delivery and cytotoxicity. Nucleic Acids Res 35(15):5182-5191 (2007).
Wu et al. Delivery systems for gene therapy. Biotherapy 3:87-95 (1991).
Wu et al. Site-specific chemical modification of recombinant proteins produced in mammalian cells by using the genetically encoded aldehyde tag. PNAS USA 106(9):3000-3005 (2009).
Xia et al. Intravenous siRNA of brain cancer with receptor targeting and avidin-biotin technology. Pharm Res 24(12):2309-16 (2007).
Xu et al. Delivery systems for siRNA drug development in cancer therapy. Asian Journal of Pharmaceutical Sciences 10(1):1-12 (2015).
Yessine et al. Characterization of the membrane-destabilizing properties of different pH-sensitive methacrylic acid copolymers. Biochimica et Biophysica Acta 1613:28-38 (2003).
Yuan et al. Development of siRNA payloads to target KRAS-mutant cancer. Cancer Discov 4(10):1182-1197 (2014).
Zhang et al. A remote arene-binding site on prostate specific membrane antigen revealed by antibody-recruiting small molecules. J Am Chem Soc. 132(36):12711-12716 (2010).
Aartsma-Rus et al. Exploring the Frontiers of Therapeutic Exon Skipping for Duchenne Muscular Dystrophy by Double Targeting within One or Multiple Exons. Mol Ther 14(3):401-407 (2006).
Echigoya et al. Multiple Exon Skipping in the Duchenne Muscular Dystrophy Hot Spots: Prospects and Challenges. J Pers Med 8(4):41 (2018).
Echigoya et al. Skipping Multiple Exons of Dystrophin Transcripts Using Cocktail Antisense Oligonucleotides. Nucleic Acids Ther 24(1):57-68 (2014).
Meregalli et al. Duchenne muscular dystrophy caused by a frameshift mutation in the acceptor splice site of intron 26. BMC Med Genet 17(1):55 (2016).
Rhodes et al. Bicyclic Peptides as Next-Generation Therapeutics. Chemistry 23(52):12690-12703 (2017).

(56) References Cited

OTHER PUBLICATIONS

Shabanpoor et al. Bi-specific splice-switching PMO oligonucleotides conjugated via a single peptide active in a mouse model of Duchenne muscular dystrophy. Nucleic Acids Res. 43(1):29-39 (2015).
Suter et al.: Double-target antisense U7 snRNAs promote efficient skipping of an aberrant exon in three human beta-thalassemic mutations. Hum Mol Genet 8(13):2415-2423 (1999).
U.S. Appl. No. 16/649,572 Office Action dated Aug. 31, 2023.
U.S. Appl. No. 17/843,705 Office Action dated Feb. 9, 2024.
U.S. Appl. No. 18/052,899 Office Action dated Feb. 15, 2024.
Vorobjev et al. Nuclease resistance and RNase H sensitivity of oligonucleotides bridged by oligomethylenediol and oligoethylene glycol linkers. Antisense Nucleic Acid Drug Dev 11(2):77-85 (2001).
U.S. Appl. No. 16/649,572 Office Action dated Jul. 23, 2025.
Wolfe, Justin M. et al. Perfluoroaryl bicyclic cell-penetrating peptides for delivery of antisense oligonucleotides. Angewandte Chemie International Edition 57(17):4756-4759 (2018).

\* cited by examiner

NUCLEIC ACID COMPOSITIONS AND METHODS OF MULTI-EXON SKIPPING

CROSS-REFERENCE

This application is a National Stage Entry of International Application No. PCT/US2020/029731, filed on Apr. 24, 2020, which claims the benefit of U.S. Provisional Application No. 62/838,888, filed Apr. 25, 2019, each of which is incorporated herein by reference in its entirety.

SEQUENCE LISTING

The instant application contains a Sequence Listing which has been submitted electronically in ASCII format and is hereby incorporated by reference in its entirety. Said ASCII copy, created on May 21, 2020, is named 45532-727-831_SL.txt and is 5,242 bytes in size.

BACKGROUND OF THE DISCLOSURE

Modulation of RNA function is a developing area of therapeutic interest. Drugs that affect mRNA stability like antisense oligonucleotides and short interfering RNAs are one way to modulate RNA function, Another group of oligonucleotides can modulate RNA function by altering the processing of pre-mRNA to include or exclude specific regions of pre-mRNAs from the ultimate gene product: the encoded protein. As such, oligonucleotide therapeutics represents a means of modulating protein expression in disease states and as such have utility as therapeutics.

SUMMARY OF THE DISCLOSURE

Disclosed herein, in certain embodiments, are oligonucleotide conjugates and pharmaceutical compositions for inducing multi-exon skipping. In some instances, also disclosed herein are methods of treating a muscular dystrophy, e.g., treating Duchenne muscular dystrophy or Becker muscular dystrophy.

In some embodiments, provided herein is an oligonucleotide conjugate comprising a first hybridization region linked to a second hybridization region by a polymer, wherein the first hybridization region hybridizes to a first target sequence of a pre-mRNA of a pre-splicing pre-mRNA complex and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein. Further provided herein are oligonucleotide conjugates, wherein the first hybridization region hybridizes to a region within the first exon in the exon-containing lariat. Further provided herein are oligonucleotide conjugates, wherein the second hybridization region hybridizes to a region within the second exon in the exon-containing lariat. Further provided herein are oligonucleotide conjugates, wherein the region within the first exon is within about 500 nucleotides, about 400 nucleotides, about 300 nucleotides, about 200 nucleotides, about 100 nucleotides, about 50 nucleotides, or about 30 nucleotides downstream of the 5' splice site. Further provided herein are oligonucleotide conjugates, wherein the region within the second exon is within about 500 nucleotides, about 400 nucleotides, about 300 nucleotides, about 200 nucleotides, about 100 nucleotides, about 50 nucleotides, or about 30 nucleotides upstream of the 3' splice site. Further provided herein are oligonucleotide conjugates, wherein the first hybridization region hybridizes to a region within a third exon, wherein the third exon is located upstream of the first exon. Further provided herein are oligonucleotide conjugates, wherein the third exon is located adjacent and upstream of the first exon. Further provided herein are oligonucleotide conjugates, wherein the second hybridization region hybridizes to a region within a fourth exon, wherein the fourth exon is located downstream of the second exon. Further provided herein are oligonucleotide conjugates, wherein the fourth exon is located adjacent and downstream of the second exon. Further provided herein are oligonucleotide conjugates, wherein the third and fourth exons are located adjacent to each other in the processed mRNA. Further provided herein are oligonucleotide conjugates, wherein the exon-containing lariat comprises at least 3, 4, 5, 6, 7, 8, 9, 10, 11, 12, 13, 14, 15, or more exons. Further provided herein are oligonucleotide conjugates, wherein the at least 3, 4, 5, 6, 7, 8, 9, 10, 11, 12, 13, 14, 15, or more exons are located between the first exon and the second exon. Further provided herein are oligonucleotide conjugates, wherein one or more exons within the exon-containing lariat comprises a mutation. Further provided herein are oligonucleotide conjugates, wherein one or more exons within the exon-containing lariat comprises a non-sense mutation. Further provided herein are oligonucleotide conjugates, wherein one or more exons within the exon-containing lariat comprises a deletion. Further provided herein are oligonucleotide conjugates, wherein the pre-mRNA comprises a mutation, a deletion, an insertion, or a combination thereof. Further provided herein are oligonucleotide conjugates, wherein the pre-mRNA comprises a mutation. Further provided herein are oligonucleotide conjugates, wherein the mutation is a non-sense mutation. Further provided herein are oligonucleotide conjugates, wherein the pre-mRNA comprises a deletion. Further provided herein are oligonucleotide conjugates, wherein the deletion is a frameshift deletion. Further provided herein are oligonucleotide conjugates, wherein the pre-mRNA encodes a functionally impaired protein. Further provided herein are oligonucleotide conjugates, wherein the pre-mRNA encodes a non-functional protein. Further provided herein are oligonucleotide conjugates, wherein the mRNA encodes a truncated protein that is partially functional, compared to a function of an equivalent wild-type protein. Further provided herein are oligonucleotide conjugates, wherein the first hybridization region comprises a sequence that is complementary to at least 8 contiguous bases of the first target sequence. Further provided herein are oligonucleotide conjugates, wherein the first hybridization region comprises a sequence that is complementary to at least 10 contiguous bases of the first target sequence. Further provided herein are oligonucleotide conjugates, wherein the second hybridization region comprises a sequence that is complementary to at least 8 contiguous bases of the second target sequence. Further provided herein are oligonucleotide conjugates, wherein the second hybridization region comprises a sequence that is complementary to at least 10 contiguous bases of the second target sequence. Further provided herein are oligonucleotide conjugates, wherein the first hybridization region is from about 10 to about 50 nucleotides in length or from about 10 to about 30 nucleotides in length. Further provided herein are oligonucleotide conjugates, wherein the second hybridization region is from about 10 to about 50 nucleotides in length or from about 10 to about 30 nucleotides in length. Further provided herein are oligonucleotide conjugates, wherein the oligonucleotide conjugate comprises phosphorodiamidate morpholino oligomers (PMO). Further provided herein are oligonucleotide conjugates, wherein the oligonucleotide conjugate comprises 100% phosphorodiamidate morpholino oligomers (PMO). Further provided herein are oligonucleotide conjugates, wherein the polymer is a natural polymer. Further provided herein are oligonucleotide conjugates, wherein the polymer is a synthetic polymer. Further provided herein are oligonucleotide conjugates, wherein the polymer is polyethylene glycol (PEG). Further provided herein are oligonucleotide conjugates, wherein the PEG is a discreet PEG. Further provided herein are oligonucleotide conjugates, wherein the discreet PEG comprises from about 2 to about 60 repeating ethylene oxide units. Further provided herein are oligonucleotide conjugates, wherein the polymer is a peptide. Further provided herein are oligonucleotide conjugates, wherein the oligonucleotide conjugate is further conjugated to a binding moiety. Further provided herein are oligonucleotide conjugates, wherein the binding moiety is an antibody or its binding fragments thereof. Further provided herein are oligonucleotide conjugates, wherein the antibody or its binding fragments thereof is an anti-transferrin receptor antibody. Further provided herein are oligonucleotide conjugates, wherein the first hybridization region and the second hybridization region each independently hybridizes to a separate target sequence of a pre-mRNA that encodes dystrophin. Further provided herein are oligonucleotide conjugates, wherein the pre-mRNA that encodes dystrophin comprises a mutation, a deletion, an insertion, or a combination thereof. Further provided herein are oligonucleotide conjugates, wherein the pre-mRNA that encodes dystrophin comprises a mutation. Further provided herein are oligonucleotide conjugates, wherein the mutation is a non-sense mutation. Further provided herein are oligonucleotide conjugates, wherein the pre-mRNA that encodes dystrophin comprises a deletion. Further provided herein are oligonucleotide conjugates, wherein the deletion is a frameshift deletion. Further provided herein are oligonucleotide conjugates, wherein the pre-mRNA encodes a functionally impaired dystrophin. Further provided herein are oligonucleotide conjugates, wherein the pre-mRNA encodes a non-functional dystrophin. Further provided herein are oligonucleotide conjugates, wherein the exon-containing lariat comprises at least 3, 4, 5, 6, 7, 8, 9, 10, 11, 12, 13, 14, 15, or more exons of DMD. Further provided herein are oligonucleotide conjugates, wherein the exon-containing lariat comprises exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61 of DMD. Further provided herein are oligonucleotide conjugates, wherein the first hybridization region hybridizes to a region within exon 39, 40, 41, 42, 43, 44, 45, 46, 47, 48, 49, 50, or 51 of DMD. Further provided herein are oligonucleotide conjugates, wherein the first hybridization region hybridizes to a region within exon 40, 41, 42, 43, 44, 45, 46, 47, 48, or 49 of DMD. Further provided herein are oligonucleotide conjugates, wherein the second hybridization region hybridizes to a region within exon 51, 52, 53, 54, 55, 56, 57, 58, 59, 60, 61, 62, or 63 of DMD. Further provided herein are oligonucleotide conjugates, wherein the second hybridization region hybridizes to a region within exon 54, 55, 56, 57, 58, 59, 60, 61, 62, or 63 of DMD. Further provided herein are oligonucleotide conjugates, wherein the processed mRNA of DMD does not comprise exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61.

Provided herein is a pharmaceutical composition comprising: an oligonucleotide conjugate of as described herein; and a pharmaceutically acceptable excipient and/or a pharmaceutically acceptable delivery vehicle. Further provided herein are pharmaceutical compositions, wherein the pharmaceutical composition is formulated for systemic delivery. Further provided herein are pharmaceutical compositions, wherein the pharmaceutical composition is formulated for parenteral administration.

Provided herein is a method of inducing multiple exon skipping from a pre-mRNA, comprising: contacting the pre-mRNA in a cell with an oligonucleotide conjugate comprising a first hybridization region linked to a second hybridization region by a polymer, wherein the first hybridization region hybridizes to a first target sequence of the pre-mRNA and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein. Provided herein are methods, wherein the first hybridization region hybridizes to a region within the first exon in the exon-containing lariat. Provided herein are methods, wherein the second hybridization region hybridizes to a region within the second exon in the exon-containing lariat. Provided herein are methods, wherein the region within the first exon is within about 500 nucleotides, about 400 nucleotides, about 300 nucleotides, about 200 nucleotides, about 100 nucleotides, about 50 nucleotides, or about 30 nucleotides downstream of the 5' splice site. Provided herein are methods, wherein the region within the second exon is within about 500 nucleotides, about 400 nucleotides, about 300 nucleotides, about 200 nucleotides, about 100 nucleotides, about 50 nucleotides, or about 30 nucleotides upstream of the 3' splice site. Provided herein are methods, wherein the first hybridization region hybridizes to a region within a third exon, wherein the third exon is located upstream of the first exon. Provided herein are methods, wherein the third exon is located adjacent and upstream of the first exon. Provided herein are methods, wherein the second hybridization region hybridizes to a region within a fourth exon, wherein the fourth exon is located downstream of the second exon. Provided herein are methods, wherein the fourth exon is located adjacent and downstream of the second exon. Provided herein are methods, wherein the third and fourth exons are located adjacent to each other in the processed mRNA. Provided herein are methods, wherein the exon-containing lariat comprises at least 3, 4, 5, 6, 7, 8, 9, 10, 11, 12, 13, 14, 15, or more exons. Provided herein are methods, wherein the at least 3, 4, 5, 6, 7, 8, 9, 10, 11, 12, 13, 14, 15, or more exons are located between the first exon and the second exon. Provided herein are methods, wherein one or more exons within the exon-containing lariat comprises a mutation. Provided herein are methods, wherein one or more exons within the exon-containing lariat comprises a nonsense mutation. Provided herein are methods, wherein one or more exons within the exon-containing lariat comprises a deletion. Provided herein are methods, wherein the pre-mRNA comprises a mutation, a deletion, an insertion, or a combination thereof. Provided herein are methods, wherein the pre-mRNA comprises a mutation. Provided herein are methods, wherein the mutation is a non-sense mutation. Provided herein are methods, wherein the pre-mRNA comprises a deletion. Provided herein are methods, wherein the deletion is a frameshift deletion. Provided herein are methods, wherein the pre-mRNA encodes a functionally impaired protein. Provided herein are methods, wherein the pre-mRNA encodes a non-functional protein. Provided herein are methods, wherein the mRNA encodes a truncated protein that is partially functional, compared to a function of an equivalent wild-type protein. Provided herein are methods, wherein the first hybridization region and the second hybridization region each independently hybridizes to a separate target sequence of a pre-mRNA that encodes dystrophin. Provided herein are methods, wherein the pre-mRNA that encodes dystrophin comprises a mutation, a deletion, an insertion, or a combination thereof. Provided herein are methods, wherein the pre-mRNA that encodes dystrophin comprises a mutation. Provided herein are methods, wherein the mutation is a non-sense mutation. Provided herein are methods, wherein the pre-mRNA that encodes dystrophin comprises a deletion. Provided herein are methods, wherein the deletion is a frameshift deletion. Provided herein are methods, wherein the pre-mRNA encodes a functionally impaired dystrophin. Provided herein are methods, wherein the pre-mRNA encodes a non-functional dystrophin. Provided herein are methods, wherein the exon-containing lariat comprises at least 3, 4, 5, 6, 7, 8, 9, 10, 11, 12, 13, 14, 15, or more exons of DMD. Provided herein are methods, wherein the exon-containing lariat comprises exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61 of DMD. Provided herein are methods, wherein the first hybridization region hybridizes to a region within exon 39, 40, 41, 42, 43, 44, 45, 46, 47, 48, 49, 50, or 51 of DMD. Provided herein are methods, wherein the first hybridization region hybridizes to a region within exon 40, 41, 42, 43, 44, 45, 46, 47, 48, or 49 of DMD. Provided herein are methods, wherein the second hybridization region hybridizes to a region within exon 51, 52, 53, 54, 55, 56, 57, 58, 59, 60, 61, 62, or 63 of DMD. Provided herein are methods, wherein the second hybridization region hybridizes to a region within exon 54, 55, 56, 57, 58, 59, 60, 61, 62, or 63 of DMD. Provided herein are methods, wherein the processed mRNA of DMD does not comprise exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61. Provided herein are methods, wherein the first hybridization region comprises one or more PMOs (e.g., 100% PMOs). Provided herein are methods, wherein the first hybridization region comprising one or more PMOs hybridizes to an exonic region within the first target sequence of the pre-mRNA. Provided herein are methods, wherein the first hybridization region comprising one or more PMOs hybridizes to an exon/intron junction. Provided herein are methods, wherein the second hybridization region comprises one or more PMOs (e.g., 100% PMOs). Provided herein are methods, wherein the second hybridization region comprising one or more PMOs hybridizes to an exonic region within the second target sequence of the pre-mRNA. Provided herein are methods, wherein the second hybridization region comprising one or more PMOs hybridizes to an exon/intron junction. Provided herein are methods, wherein the first hybridization region comprising one or more PMOs hybridizes to a region within an intron that is adjacent upstream of the first exon. Provided herein are methods, wherein the intron is between the third exon and the first exon, e.g., adjacent downstream of the third exon and adjacent upstream of the first exon. Provided herein are methods, wherein the first hybridization region comprising one or more PMOs (e.g., 100% PMOs) hybridizes to a region at the intron-first exon junction. Provided herein are methods, wherein the first hybridization region comprising one or more PMOs (e.g., 100% PMOs) hybridizes to a region at the intron-third exon junction. Provided herein are methods, wherein the second hybridization region comprising one or more PMOs (e.g., 100% PMOs) hybridizes to a region within an intron that is adjacent downstream of the second exon. Provided herein are methods, wherein the intron is between the fourth exon and the second exon, e.g., adjacent downstream from the second exon and adjacent upstream of the fourth exon. Provided herein are methods, wherein the second hybridization region comprising one or more PMOs (e.g., 100% PMOs) hybridizes to a region at the intron-second exon junction. Provided herein are methods, wherein the second hybridization region comprising one or more PMOs (e.g., 100% PMOs) hybridizes to a region at the intron-fourth exon junction. Provided herein are methods, wherein the disease or condition is a neuromuscular disease, a genetic disease, cancer, a hereditary disease, or a cardiovascular disease. Provided herein are methods, wherein the neuromuscular disease is a muscular dystrophy. Provided herein are methods, wherein the muscular dystrophy is Duchenne muscular dystrophy, Becker's muscular dystrophy, facioscapulohumeral muscular dystrophy, congenital muscular dystrophy, or myotonic dystrophy. Provided herein are methods, wherein the subject is a human. Provided herein are methods, wherein the subject has muscular dystrophy. Provided herein are methods, wherein the subject has Duchenne muscular dystrophy. Provided herein are methods, wherein the subject has Becker muscular dystrophy.

Provided herein is a method of treating a disease characterized with a defective protein function in a subject in need thereof, comprising: administering to the subject a pharmaceutical composition comprising an oligonucleotide conjugate comprising a first hybridization region linked to a second hybridization region by a polymer, wherein the first hybridization region hybridizes to a first target sequence of a pre-mRNA and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein, thereby treating the disease or condition in the subject. Provided herein are methods, wherein the first hybridization region hybridizes to a region within the first exon in the exon-containing lariat. Provided herein are methods, wherein the second hybridization region hybridizes to a region within the second exon in the exon-containing lariat. Provided herein are methods, wherein the region within the first exon is within about 500 nucleotides, about 400 nucleotides, about 300 nucleotides, about 200 nucleotides, about 100 nucleotides, about 50 nucleotides, or about 30 nucleotides downstream of the 5' splice site. Provided herein are methods, wherein the region within the second exon is within about 500 nucleotides, about 400 nucleotides, about 300 nucleotides, about 200 nucleotides, about 100 nucleotides, about 50 nucleotides, or about 30 nucleotides upstream of the 3' splice site. Provided herein are methods, wherein the first hybridization region hybridizes to a region within a third exon, wherein the third exon is located upstream of the first exon. Provided herein are methods, wherein the third exon is located adjacent and upstream of the first exon. Provided herein are methods, wherein the second hybridization region hybridizes to a region within a fourth exon, wherein the fourth exon is located downstream of the second exon. Provided herein are methods, wherein the fourth exon is located adjacent and downstream of the second exon. Provided herein are methods, wherein the third and fourth exons are located adjacent to each other in the processed mRNA. Provided herein are methods, wherein the exon-containing lariat comprises at least 3, 4, 5, 6, 7, 8, 9, 10, 11, 12, 13, 14, 15, or more exons. Provided herein are methods, wherein the at least 3, 4, 5, 6, 7, 8, 9, 10, 11, 12, 13, 14, 15, or more exons are located between the first exon and the second exon. Provided herein are methods, wherein one or more exons within the exon-containing lariat comprises a mutation. Provided herein are methods, wherein one or more exons within the exon-containing lariat comprises a nonsense mutation. Provided herein are methods, wherein one or more exons within the exon-containing lariat comprises a deletion. Provided herein are methods, wherein the pre-mRNA comprises a mutation, a deletion, an insertion, or a combination thereof. Provided herein are methods, wherein the pre-mRNA comprises a mutation. Provided herein are methods, wherein the mutation is a non-sense mutation. Provided herein are methods, wherein the pre-mRNA comprises a deletion. Provided herein are methods, wherein the deletion is a frameshift deletion. Provided herein are methods, wherein the pre-mRNA encodes a functionally impaired protein. Provided herein are methods, wherein the pre-mRNA encodes a non-functional protein. Provided herein are methods, wherein the mRNA encodes a truncated protein that is partially functional, compared to a function of an equivalent wild-type protein. Provided herein are methods, wherein the first hybridization region and the second hybridization region each independently hybridizes to a separate target sequence of a pre-mRNA that encodes dystrophin. Provided herein are methods, wherein the pre-mRNA that encodes dystrophin comprises a mutation, a deletion, an insertion, or a combination thereof. Provided herein are methods, wherein the pre-mRNA that encodes dystrophin comprises a mutation. Provided herein are methods, wherein the mutation is a non-sense mutation. Provided herein are methods, wherein the pre-mRNA that encodes dystrophin comprises a deletion. Provided herein are methods, wherein the deletion is a frameshift deletion. Provided herein are methods, wherein the pre-mRNA encodes a functionally impaired dystrophin. Provided herein are methods, wherein the pre-mRNA encodes a non-functional dystrophin. Provided herein are methods, wherein the exon-containing lariat comprises at least 3, 4, 5, 6, 7, 8, 9, 10, 11, 12, 13, 14, 15, or more exons of DMD. Provided herein are methods, wherein the exon-containing lariat comprises exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61 of DMD. Provided herein are methods, wherein the first hybridization region hybridizes to a region within exon 39, 40, 41, 42, 43, 44, 45, 46, 47, 48, 49, 50, or 51 of DMD. Provided herein are methods, wherein the first hybridization region hybridizes to a region within exon 40, 41, 42, 43, 44, 45, 46, 47, 48, or 49 of DMD. Provided herein are methods, wherein the second hybridization region hybridizes to a region within exon 51, 52, 53, 54, 55, 56, 57, 58, 59, 60, 61, 62, or 63 of DMD. Provided herein are methods, wherein the second hybridization region hybridizes to a region within exon 54, 55, 56, 57, 58, 59, 60, 61, 62, or 63 of DMD. Provided herein are methods, wherein the processed mRNA of DMD does not comprise exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61. Provided herein are methods, wherein the first hybridization region comprises one or more PMOs (e.g., 100% PMOs). Provided herein are methods, wherein the first hybridization region comprising one or more PMOs hybridizes to an exonic region within the first target sequence of the pre-mRNA. Provided herein are methods, wherein the first hybridization region comprising one or more PMOs hybridizes to an exon/intron junction. Provided herein are methods, wherein the second hybridization region comprises one or more PMOs (e.g., 100% PMOs). Provided herein are methods, wherein the second hybridization region comprising one or more PMOs hybridizes to an exonic region within the second target sequence of the pre-mRNA. Provided herein are methods, wherein the second hybridization region comprising one or more PMOs hybridizes to an exon/intron junction. Provided herein are methods, wherein the first hybridization region comprising one or more PMOs hybridizes to a region within an intron that is adjacent upstream of the first exon. Provided herein are methods, wherein the intron is between the third exon and the first exon, e.g., adjacent downstream of the third exon and adjacent upstream of the first exon. Provided herein are methods, wherein the first hybridization region comprising one or more PMOs (e.g., 100% PMOs) hybridizes to a region at the intron-first exon junction. Provided herein are methods, wherein the first hybridization region comprising one or more PMOs (e.g., 100% PMOs) hybridizes to a region at the intron-third exon junction. Provided herein are methods, wherein the second hybridization region comprising one or more PMOs (e.g., 100% PMOs) hybridizes to a region within an intron that is adjacent downstream of the second exon. Provided herein are methods, wherein the intron is between the fourth exon and the second exon, e.g., adjacent downstream from the second exon and adjacent upstream of the fourth exon. Provided herein are methods, wherein the second hybridization region comprising one or more PMOs (e.g., 100% PMOs) hybridizes to a region at the intron-second exon junction. Provided herein are methods, wherein the second hybridization region comprising one or more PMOs (e.g., 100% PMOs) hybridizes to a region at the intron-fourth exon junction. Provided herein are methods, wherein the disease or condition is a neuromuscular disease, a genetic disease, cancer, a hereditary disease, or a cardiovascular disease. Provided herein are methods, wherein the neuromuscular disease is a muscular dystrophy. Provided herein are methods, wherein the muscular dystrophy is Duchenne muscular dystrophy, Becker's muscular dystrophy, facioscapulohumeral muscular dystrophy, congenital muscular dystrophy, or myotonic dystrophy. Provided herein are methods, wherein the subject is a human. Provided herein are methods, wherein the subject has muscular dystrophy. Provided herein are methods, wherein the subject has Duchenne muscular dystrophy. Provided herein are methods, wherein the subject has Becker muscular dystrophy.

Provided herein are kits comprising an oligonucleotide conjugate as described herein or a pharmaceutical composition as described herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4A shows an exemplary strategy to detect DMD Δ45-55 mRNAs in primary human skeletal muscle cells. FIG. 4B shows a gel analysis of DMD PCR amplification products in primary human skeletal muscle cells. As indicated, cells were either untreated (U), or treated with individual exon 45 or 55 skipping PMOs, mixtures of exon 45 and 55 skipping PMOs, or linked exon 45-55 PMOs. Some of the fragments showing the expected size for Δ45-55 generated amplification products (circled) were excised and sequenced. FIG. 4C shows example of sequence results. All sequenced PCR fragments showed the expected exon 44-56 splice junction. FIG. 4C discloses SEQ ID NO: 20.

FIG. 5A shows an exemplary strategy to quantify relative DMD Δ45-55 mRNAs in non-treated and treated primary human skeletal muscle cells. FIG. 5B shows a relative DMD Δ45-55 mRNAs in non-treated and treated primary human skeletal muscle cells. Relative DMD Δ45-55 mRNAs levels are shown as cycle thresholds (CT values) determined by qPCR using a Taqman assay that specifically recognizes the DMD Δ45-55 mRNA.

FIG. 6A shows a gel analysis of DMD amplification products in immortalized human skeletal muscle cells. As indicated, cells were either untreated (U), or treated with 0.16-5 uM of a linked PMO (A-P8-C; Tab. 1). PCR products generated from WT and Δ44-54 DMD mRNAs are indicated. FIG. 6B shows an example of sequence results. All sequenced PCR fragments showed the expected exon 43-55 splice junction. FIG. 6B discloses SEQ ID NO: 21. FIG. 6C shows quantification of relative D44-54 levels in untreated and linked PMO transfected human skeletal muscle cells. Relative DMD Δ44-54 mRNAs levels are shown as cycle thresholds (CT values) determined by qPCR using a Taqman assay that specifically recognizes the DMD Δ44-54 mRNA. The cycle number of the RT-PCR reaction used to generate the template was varied as indicated.

FIG. 7A discloses SEQ ID NOS 6 and 22, respectively, in order of appearance.

DETAILED DESCRIPTION OF THE DISCLOSURE

Figure 1:
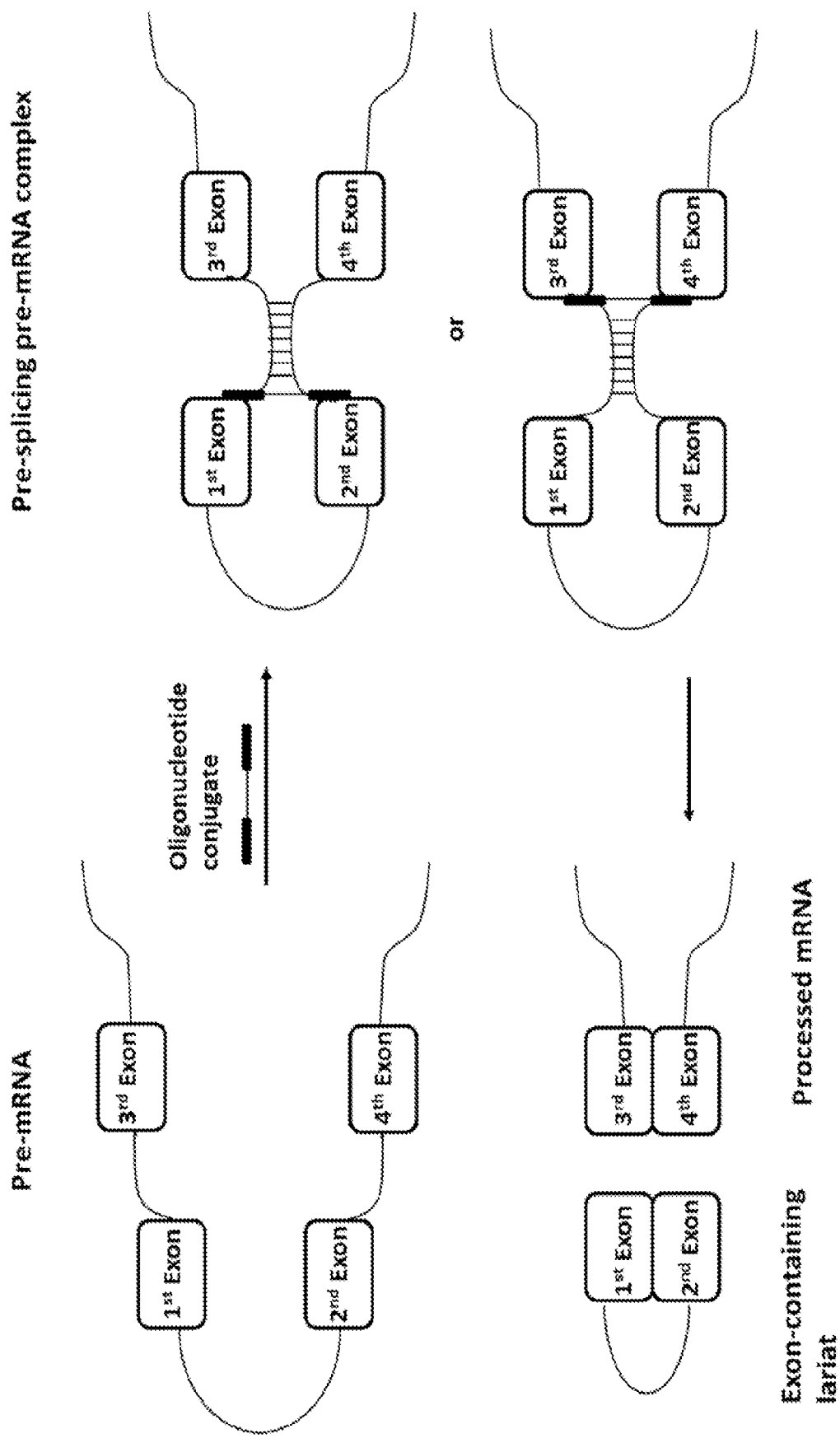
FIG. 1 illustrates a cartoon representation of a multi-exon skipping mechanism described herein.

Muscular dystrophies are a group of inheritable genetic diseases characterized with muscle weakness and loss. Muscular dystrophies include Duchenne muscular dystrophy (DMD), Becker muscular dystrophy (BMD), myotonic muscular dystrophy (MMD), Limb-Girdle muscular dystrophy (LGMD), Facioscapulohumeral muscular dystrophy (FSH), congenital muscular dystrophy (CMD) and myopathies, distal muscular dystrophy (DD), oculopharyngeal muscular dystrophy (OPMD), and Emery-Dreifuss muscular dystrophy (EDMD).

Duchenne muscular dystrophy (DMD) is a lethal genetic disorder characterized by progressive muscle degeneration and is caused by non-sense/frame-shifting mutations (e.g. deletions) in the DMD gene, which impairs the expression of dystrophin. Dystrophin is a rod-shaped cytoplasmic protein that functions as a shock-absorber during muscle contractions. In skeletal and cardiac muscles, dystrophin associates with other proteins to form the dystrophin-associated protein complex (DAPC), which is involved in a structural role in regulating muscle cell regeneration and survival.

Becker muscular dystrophy is a milder form of DMD and can be considered as a variant of DMD. It is caused by missense or in frame deletions/insertions in the DMD gene resulting in the expression of a partially functional but truncated dystrophin.

Skipping of a single exon can be utilized to increase dystrophin expression or restore dystrophin function. However, only up to 13% of patients have been shown to be benefited by such method. Further, it has been shown that over 50% of DMD patients have deletions within exon 44 and 55. Skipping of exons 44-54 or 45-55 does not alter the reading frame and yields a functional dystrophin.

Several approaches to skip multiple exons in the dystrophin pre-mRNA have been made, using oligonucleotide cocktails in which each oligonucleotide targets a specific exon. However, use of the oligonucleotide cocktails lead to production of a multitude of non-productive splicing products.

Disclosed herein, in certain embodiments, are compositions and methods of inducing multi-exon skipping. In some instances, the compositions and methods utilize a single oligonucleotide conjugate, which stabilizes an exon-containing lariat. In some instances, the oligonucleotide conjugate improves the splicing efficiency, leading to a decrease in non-productive splicing products.

Multi-Exon Skipping

Exon skipping is a form of RNA splicing. In some cases, multi-exon skipping occurs when two or more exons are skipped over or are spliced out of a processed mRNA. As a result of skipping a region of the pre-mRNA comprising two or more exons, the subsequent processed mRNA lead to expression of an altered protein product. In some instances, the truncated protein product has a partial function or near wild-type function.

In some embodiments, an oligonucleotide conjugate is used to induce multi-exon skipping. In some cases, the oligonucleotide conjugate comprises a first hybridization region and a second hybridization linked by a polymer, in which each region binds to a respective target region of the pre-mRNA. In some cases, each of the hybridization regions binds to an alternative splice site, a cryptic splice site, or an exonic enhancer. In some instances, binding of the oligonucleotide conjugate to specific pre-mRNA sequences generates double-stranded regions. In some instances, formation of double-stranded regions occurs at sites where the spliceosome or proteins associated with the spliceosome would normally bind and causes exons to be skipped.

In some embodiments, a lariat comprising multiple exons is spliced out or skipped according to a mechanism as illustrated in FIG. 1. In some instances, the oligonucleotide conjugate comprises a first hybridization region which hybridizes to a first target sequence of a first exon within the exon-containing lariat and a second hybridization region which hybridizes to a second target sequence of a second exon within the exon-containing lariat. In some instances, the oligonucleotide conjugate induces splicing out of the exon-containing lariat from the pre-mRNA to generate a processed mRNA, which encodes a truncated and functional protein. In some instances, the first hybridization region hybridizes to a target region within a third exon, in which the third exon is located upstream (e.g., adjacent and upstream) of the first exon. In some instances, the second hybridization region hybridizes to a target region within a fourth exon, in which the fourth exon is downstream (e.g., adjacent and downstream) of the second exon. In some instances, the oligonucleotide conjugate stabilizes the exon-containing lariat. In some cases, the oligonucleotide conjugate enhances or improves splicing efficiency, and decreases non-productive splicing side products.

In some instances, the first hybridization region hybridizes to a region within the first exon in the exon-containing lariat. In some cases, the region within the first exon is within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides downstream of the 5' splice site. In some cases, the region within the first exon is within about 500 nucleotides downstream of the 5' splice site. In some cases, the region within the first exon is within about 400 nucleotides downstream of the 5' splice site. In some cases, the region within the first exon is within about 300 nucleotides downstream of the 5' splice site. In some cases, the region within the first exon is within about 200 nucleotides downstream of the 5' splice site. In some cases, the region within the first exon is within about 100 nucleotides downstream of the 5' splice site. In some cases, the region within the first exon is within about 50 nucleotides downstream of the 5' splice site. In some cases, the region within the first exon is within about 30 nucleotides downstream of the 5' splice site.

In some cases, the first hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides upstream of the 3' splice site. In some cases, the first hybridization region hybridizes to a region within about 500 nucleotides upstream of the 3' splice site. In some cases, the first hybridization region hybridizes to a region within about 400 nucleotides upstream of the 3' splice site. In some cases, the first hybridization region hybridizes to a region within about 300 nucleotides upstream of the 3' splice site. In some cases, the first hybridization region hybridizes to a region within about 200 nucleotides upstream of the 3' splice site. In some cases, the first hybridization region hybridizes to a region within about 100 nucleotides upstream of the 3' splice site. In some cases, the first hybridization region hybridizes to a region within about 50 nucleotides upstream of the 3' splice site.

In some instances, the second hybridization region hybridizes to a region within the second exon in the exon-containing lariat. In some cases, the region within the second exon is within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides upstream of the 3' splice site. In some cases, the region within the second exon is within about 500 nucleotides upstream of the 3' splice site. In some cases, the region within the second exon is within about 400 nucleotides upstream of the 3' splice site. In some cases, the region within the second exon is within about 300 nucleotides upstream of the 3' splice site. In some cases, the region within the second exon is within about 200 nucleotides upstream of the 3' splice site. In some cases, the region within the second exon is within about 100 nucleotides upstream of the 3' splice site. In some cases, the region within the second exon is within about 50 nucleotides upstream of the 3' splice site. In some cases, the region within the second exon is within about 30 nucleotides upstream of the 3' splice site.

In some cases, the second hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides downstream of the 5' splice site. In some cases, the second hybridization region hybridizes to a region within about 500 nucleotides downstream of the 5' splice site. In some cases, the second hybridization region hybridizes to a region within about 400 nucleotides downstream of the 5' splice site. In some cases, the second hybridization region hybridizes to a region within about 300 nucleotides downstream of the 5' splice site. In some cases, the second hybridization region hybridizes to a region within about 200 nucleotides downstream of the 5' splice site. In some cases, the second hybridization region hybridizes to a region within about 100 nucleotides downstream of the 5' splice site. In some cases, the second hybridization region hybridizes to a region within about 50 nucleotides downstream of the 5' splice site.

In some embodiments, the first hybridization region hybridizes to a region within a third exon, wherein the third exon is located upstream of the first exon. In some instances, the third exon is located adjacent and upstream of the first exon. In some cases, the first hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides downstream of the 5' splice site. In some cases, the first hybridization region hybridizes to a region within about 500 nucleotides downstream of the 5' splice site. In some cases, the first hybridization region hybridizes to a region within about 400 nucleotides downstream of the 5' splice site. In some cases, the first hybridization region hybridizes to a region within about 300 nucleotides downstream of the 5' splice site. In some cases, the first hybridization region hybridizes to a region within about 200 nucleotides downstream of the 5' splice site. In some cases, the first hybridization region hybridizes to a region within about 100 nucleotides downstream of the 5' splice site. In some cases, the first hybridization region hybridizes to a region within about 50 nucleotides downstream of the 5' splice site.

In some instances, the first hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides upstream of the 3' splice site. In some cases, the first hybridization region hybridizes to a region within about 500 nucleotides upstream of the 3' splice site. In some cases, the first hybridization region hybridizes to a region within about 400 nucleotides upstream of the 3' splice site. In some cases, the first hybridization region hybridizes to a region within about 300 nucleotides upstream of the 3' splice site. In some cases, the first hybridization region hybridizes to a region within about 200 nucleotides upstream of the 3' splice site. In some cases, the first hybridization region hybridizes to a region within about 100 nucleotides upstream of the 3' splice site. In some cases, the first hybridization region hybridizes to a region within about 50 nucleotides upstream of the 3' splice site.

In some embodiments, the second hybridization region hybridizes to a region within a fourth exon, wherein the fourth exon is located downstream of the second exon. In some instances, the fourth exon is located adjacent and downstream of the second exon. In some instances, the second hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides upstream of the 3' splice site. In some instances, the second hybridization region hybridizes to a region within about 500 nucleotides upstream of the 3' splice site. In some instances, the second hybridization region hybridizes to a region within about 400 nucleotides upstream of the 3' splice site. In some instances, the second hybridization region hybridizes to a region within about 300 nucleotides upstream of the 3' splice site. In some instances, the second hybridization region hybridizes to a region within about 200 nucleotides upstream of the 3' splice site. In some instances, the second hybridization region hybridizes to a region within about 100 nucleotides upstream of the 3' splice site. In some instances, the second hybridization region hybridizes to a region within about 50 nucleotides upstream of the 3' splice site.

In some cases, the second hybridization region hybridizes to a region within about 2000 nucleotides, about 1000 nucleotides, about 500 nucleotides, about 400 nucleotides, about 300 nucleotides, about 200 nucleotides, about 100 nucleotides, about 50 nucleotides, or about 30 nucleotides downstream of the 5' splice site. In some cases, the second hybridization region hybridizes to a region within about 500 nucleotides downstream of the 5' splice site. In some cases, the second hybridization region hybridizes to a region within about 400 nucleotides downstream of the 5' splice site. In some cases, the second hybridization region hybridizes to a region within about 300 nucleotides downstream of the 5' splice site. In some cases, the second hybridization region hybridizes to a region within about 200 nucleotides downstream of the 5' splice site. In some cases, the second hybridization region hybridizes to a region within about 100 nucleotides downstream of the 5' splice site. In some cases, the second hybridization region hybridizes to a region within about 50 nucleotides downstream of the 5' splice site.

In some instances, the exon-containing lariat comprises at least 3, 4, 5, 6, 7, 8, 9, 10, 11, 12, 13, 14, 15, or more exons. In some cases, the at least 3, 4, 5, 6, 7, 8, 9, 10, 11, 12, 13, 14, 15, or more exons are located between the first exon and the second exon.

In some embodiments, one or more exons within the exon-containing lariat comprise a mutation, a deletion, or an insertion. In some instances, the one or more exons within the exon-containing lariat comprise a mutation. In some cases, the mutation is a nonsense mutation. In some instances, the one or more exons within the exon-containing lariat comprise a deletion. In some cases, the deletion is a frameshift deletion. In some instances, the one or more exons within the exon-containing lariat comprise an insertion.

In some embodiments, the pre-mRNA comprises a mutation, a deletion, an insertion, or a combination thereof. In some instances, the pre-mRNA comprises a mutation. In some cases, the mutation is a non-sense mutation. In some instances, the pre-mRNA comprises a deletion. In some cases, the deletion is a frameshift deletion.

In some embodiments, the pre-mRNA encodes a functionally impaired protein. In some cases, the pre-mRNA encodes a non-functional protein. In some cases, the mRNA encodes a truncated protein that is partially functional, compared to a function of an equivalent wild-type protein.

In some embodiments, a pre-mRNA transcript comprising a mutation, a deletion, an insertion, or a combination thereof, results in a disease or disorder. In some instances, the disease or disorder is a neuromuscular disease, a genetic disease, cancer, a hereditary disease, or a cardiovascular disease. In some cases, a neuromuscular disease or disorder is a muscular dystrophy. In some cases, the muscular dystrophy is Duchenne muscular dystrophy, Becker muscular dystrophy, facioscapulohumeral muscular dystrophy, congenital muscular dystrophy, or myotonic dystrophy.

In some instances, an oligonucleotide conjugate described herein targets a pre-mRNA which encodes an impaired protein leading to a muscular dystrophy, such as but not limited to, Duchenne muscular dystrophy (DMD), Becker muscular dystrophy (BMD), facioscapulohumeral muscular dystrophy (FSH), congenital muscular dystrophy, Limb-Girdle (LGMD) muscular dystrophy, distal muscular dystrophy (DD), myotonic dystrophy (MMD), oculopharyngeal muscular dystrophy (OPMD), and Emery-Dreifuss muscular dystrophy (EDMD). In some instances, the oligonucleotide conjugate targets a pre-mRNA that encodes dystrophin.

In some instances, an oligonucleotide conjugate described herein induces splicing out of two or more exons in the DMD gene selected from, but not limited to, exon 2, 3, 4, 5, 6, 7, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, and 78. In some instances, the oligonucleotide conjugate induces splicing out of at least 3, 4, 5, 6, 7, 8, 9, 10, 11, 12, 13, 14, 15, or more exons from DMD. In some cases, the oligonucleotide conjugate induces splicing out of exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61 of DMD. In some cases, the oligonucleotide conjugate induces splicing out of exons 40-62 of DMD. In some cases, the oligonucleotide conjugate induces splicing out of exons 40-61 of DMD. In some cases, the oligonucleotide conjugate induces splicing out of exons 40-60 of DMD. In some cases, the oligonucleotide conjugate induces splicing out of exons 42-60 of DMD. In some cases, the oligonucleotide conjugate induces splicing out of exons 41-61 of DMD. In some cases, the oligonucleotide conjugate induces splicing out of exons 41-60 of DMD. In some cases, the oligonucleotide conjugate induces splicing out of exons 42-60 of DMD. In some cases, the oligonucleotide conjugate induces splicing out of exons 42-59 of DMD. In some cases, the oligonucleotide conjugate induces splicing out of exons 42-55 of DMD. In some cases, the oligonucleotide conjugate induces splicing out of exons 44-61 of DMD. In some cases, the oligonucleotide conjugate induces splicing out of exons 44-60 of DMD. In some cases, the oligonucleotide conjugate induces splicing out of exons 47-61 of DMD. In some cases, the oligonucleotide conjugate induces splicing out of exons 44-58 of DMD. In some cases, the oligonucleotide conjugate induces splicing out of exons 44-56 of DMD. In some cases, the oligonucleotide conjugate induces splicing out of exons 44-54 of DMD. In some cases, the oligonucleotide conjugate induces splicing out of exons 45-60 of DMD. In some cases, the oligonucleotide conjugate induces splicing out of exons 45-59 of DMD. In some cases, the oligonucleotide conjugate induces splicing out of exons 45-57 of DMD. In some cases, the oligonucleotide conjugate induces splicing out of exons 45-55 of DMD. In some cases, the oligonucleotide conjugate induces splicing out of exons 48-61 of DMD. In some cases, the oligonucleotide conjugate induces splicing out of exons 48-60 of DMD. In some cases, the oligonucleotide conjugate induces splicing out of exons 49-61 of DMD.

In some embodiments, the first hybridization region hybridizes to a region within exon 39, 40, 41, 42, 43, 44, 45, 46, 47, 48, 49, 50, or 51 of DMD. In some instances, the first hybridization region hybridizes to a region within exon 40, 41, 42, 43, 44, 45, 46, 47, 48, or 49 of DMD. In some cases, the first hybridization region hybridizes to a region within exon 39. In some cases, the first hybridization region hybridizes to a region within exon 40. In some cases, the first hybridization region hybridizes to a region within exon 41. In some cases, the first hybridization region hybridizes to a region within exon 42. In some cases, the first hybridization region hybridizes to a region within exon 43. In some cases, the first hybridization region hybridizes to a region within exon 44. In some cases, the first hybridization region hybridizes to a region within exon 45. In some cases, the first hybridization region hybridizes to a region within exon 46. In some cases, the first hybridization region hybridizes to a region within exon 47. In some cases, the first hybridization region hybridizes to a region within exon 48. In some cases, the first hybridization region hybridizes to a region within exon 49. In some cases, the first hybridization region hybridizes to a region within exon 50.

In some embodiments, the second hybridization region hybridizes to a region within exon 51, 52, 53, 54, 55, 56, 57, 58, 59, 60, 61, 62, or 63 of DMD. In some instances, the second hybridization region hybridizes to a region within exon 54, 55, 56, 57, 58, 59, 60, 61, 62, or 63 of DMD. In some cases, the second hybridization region hybridizes to a region within exon 51. In some cases, the second hybridization region hybridizes to a region within exon 52. In some cases, the second hybridization region hybridizes to a region within exon 53. In some cases, the second hybridization region hybridizes to a region within exon 54. In some cases, the second hybridization region hybridizes to a region within exon 55. In some cases, the second hybridization region hybridizes to a region within exon 56. In some cases, the second hybridization region hybridizes to a region within exon 57. In some cases, the second hybridization region hybridizes to a region within exon 58. In some cases, the second hybridization region hybridizes to a region within exon 59. In some cases, the second hybridization region hybridizes to a region within exon 60. In some cases, the second hybridization region hybridizes to a region within exon 61. In some cases, the second hybridization region hybridizes to a region within exon 62. In some cases, the second hybridization region hybridizes to a region within exon 63.

In some instances, the processed mRNA of DMD does not comprise exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61. In some cases, the processed mRNA of DMD does not comprise exons 40-62. In some cases, the processed mRNA of DMD does not comprise exons 40-61. In some cases, the processed mRNA of DMD does not comprise exons 40-60. In some cases, the processed mRNA of DMD does not comprise exons 42-60. In some cases, the processed mRNA of DMD does not comprise exons 41-61. In some cases, the processed mRNA of DMD does not comprise exons 41-60. In some cases, the processed mRNA of DMD does not comprise exons 42-60. In some cases, the processed mRNA of DMD does not comprise exons 42-59. In some cases, the processed mRNA of DMD does not comprise exons 42-55. In some cases, the processed mRNA of DMD does not comprise exons 44-61. In some cases, the processed mRNA of DMD does not comprise exons 44-60. In some cases, the processed mRNA of DMD does not comprise exons 47-61. In some cases, the processed mRNA of DMD does not comprise exons 44-58. In some cases, the processed mRNA of DMD does not comprise exons 44-56. In some cases, the processed mRNA of DMD does not comprise exons 44-54. In some cases, the processed mRNA of DMD does not comprise exons 45-60. In some cases, the processed mRNA of DMD does not comprise exons 45-59. In some cases, the processed mRNA of DMD does not comprise exons 45-57. In some cases, the processed mRNA of DMD does not comprise exons 45-55. In some cases, the processed mRNA of DMD does not comprise exons 48-61. In some cases, the processed mRNA of DMD does not comprise exons 48-60. In some cases, the processed mRNA of DMD does not comprise exons 49-61.

In some cases, the processed mRNA of DMD encodes a truncated and functional dystrophin. In some cases, the truncated and functional dystrophin has a reduced function compared to a wild-type dystrophin. In some cases, the truncated and functional dystrophin treats or prevents Duchenne muscular dystrophy.

Oligonucleotide Conjugates

In some embodiments, an oligonucleotide conjugate described herein comprises RNA or DNA. In some cases, the oligonucleotide conjugate comprises RNA. In some instances, RNA comprises short interfering RNA (siRNA), short hairpin RNA (shRNA), microRNA (miRNA), double-stranded RNA (dsRNA), transfer RNA (tRNA), ribosomal RNA (rRNA), or heterogeneous nuclear RNA (hnRNA). In some instances, RNA comprises shRNA. In some instances, RNA comprises miRNA. In some instances, RNA comprises dsRNA. In some instances, RNA comprises tRNA. In some instances, RNA comprises rRNA. In some instances, RNA comprises hnRNA. In some instances, the RNA comprises siRNA. In some instances, the oligonucleotide conjugate comprises siRNA. In some instances, the oligonucleotide conjugate is an antisense oligonucleotide (ASO).

In some embodiments, the first hybridization region is from about 10 to about 50 nucleotides in length. In some instances, the first hybridization region is from about 10 to about 30, from about 15 to about 30, from about 18 to about 30, from about 18 to about 25, form about 18 to about 24, from about 19 to about 23, from about 19 to about 30, from about 19 to about 25, form about 19 to about 24, from about 19 to about 23, from about 20 to about 30, from about 20 to about 25, from about 20 to about 24, from about 20 to about 23, or from about 20 to about 22 nucleotides in length. In some instances, the first hybridization region is from about 10 to about 50 nucleotides in length. In some instances, the first hybridization region is from about 10 to about 45 nucleotides in length. In some instances, the first hybridization region is from about 10 to about 40 nucleotides in length. In some instances, the first hybridization region is from about 10 to about 35 nucleotides in length. In some instances, the first hybridization region is from about 10 to about 30 nucleotides in length. In some instances, the first hybridization region is from about 10 to about 25 nucleotides in length. In some instances, the first hybridization region is from about 10 to about 20 nucleotides in length. In some instances, the first hybridization region is from about 15 to about 25 nucleotides in length. In some instances, the first hybridization region is from about 15 to about 30 nucleotides in length. In some instances, the first hybridization region is from about 12 to about 30 nucleotides in length. In some instances, the first hybridization region is from about 19 to about 30 nucleotides in length. In some instances, the first hybridization region is from about 20 to about 30 nucleotides in length. In some instances, the first hybridization region is from about 19 to about 25 nucleotides in length. In some instances, the first hybridization region is from about 20 to about 25 nucleotides in length.

In some embodiments, the first hybridization region is at least or about 50 nucleotides in length. In some instances, the first hybridization region is at least or about 45 nucleotides in length. In some instances, the first hybridization region is at least or about 40 nucleotides in length. In some instances, the first hybridization region is at least or about 35 nucleotides in length. In some instances, the first hybridization region is at least or about 30 nucleotides in length. In some instances, the first hybridization region is at least or about 25 nucleotides in length. In some instances, the first hybridization region is at least or about 20 nucleotides in length. In some instances, the first hybridization region is at least or about 19 nucleotides in length. In some instances, the first hybridization region is at least or about 18 nucleotides in length. In some instances, the first hybridization region is at least or about 17 nucleotides in length. In some instances, the first hybridization region is at least or about 16 nucleotides in length. In some instances, the first hybridization region is at least or about 15 nucleotides in length. In some instances, the first hybridization region is at least or about 14 nucleotides in length. In some instances, the first hybridization region is at least or about 13 nucleotides in length. In some instances, the first hybridization region is at least or about 12 nucleotides in length. In some instances, the first hybridization region is at least or about 11 nucleotides in length. In some instances, the first hybridization region is at least or about 10 nucleotides in length.

In some embodiments, the second hybridization region is from about 10 to about 50 nucleotides in length. In some instances, the second hybridization region is from about 10 to about 30, from about 15 to about 30, from about 18 to about 30, from about 18 to about 25, form about 18 to about 24, from about 19 to about 23, from about 19 to about 30, from about 19 to about 25, form about 19 to about 24, from about 19 to about 23, from about 20 to about 30, from about 20 to about 25, from about 20 to about 24, from about 20 to about 23, or from about 20 to about 22 nucleotides in length. In some instances, the second hybridization region is from about 10 to about 50 nucleotides in length. In some instances, the second hybridization region is from about 10 to about 45 nucleotides in length. In some instances, the second hybridization region is from about 10 to about 40 nucleotides in length. In some instances, the second hybridization region is from about 10 to about 35 nucleotides in length. In some instances, the second hybridization region is from about 10 to about 30 nucleotides in length. In some instances, the second hybridization region is from about 10 to about 25 nucleotides in length. In some instances, the second hybridization region is from about 10 to about 20 nucleotides in length. In some instances, the second hybridization region is from about 15 to about 25 nucleotides in length. In some instances, the second hybridization region is from about 15 to about 30 nucleotides in length. In some instances, the second hybridization region is from about 12 to about 30 nucleotides in length. In some instances, the second hybridization region is from about 19 to about 30 nucleotides in length. In some instances, the second hybridization region is from about 20 to about 30 nucleotides in length. In some instances, the second hybridization region is from about 19 to about 25 nucleotides in length. In some instances, the second hybridization region is from about 20 to about 25 nucleotides in length.

In some embodiments, the second hybridization region is at least or about 50 nucleotides in length. In some instances, the second hybridization region is at least or about 45 nucleotides in length. In some instances, the second hybridization region is at least or about 40 nucleotides in length. In some instances, the second hybridization region is at least or about 35 nucleotides in length. In some instances, the second hybridization region is at least or about 30 nucleotides in length. In some instances, the second hybridization region is at least or about 25 nucleotides in length. In some instances, the second hybridization region is at least or about 20 nucleotides in length. In some instances, the second hybridization region is at least or about 19 nucleotides in length. In some instances, the second hybridization region is at least or about 18 nucleotides in length. In some instances, the second hybridization region is at least or about 17 nucleotides in length. In some instances, the second hybridization region is at least or about 16 nucleotides in length. In some instances, the second hybridization region is at least or about 15 nucleotides in length. In some instances, the second hybridization region is at least or about 14 nucleotides in length. In some instances, the second hybridization region is at least or about 13 nucleotides in length. In some instances, the second hybridization region is at least or about 12 nucleotides in length. In some instances, the second hybridization region is at least or about 11 nucleotides in length. In some instances, the second hybridization region is at least or about 10 nucleotides in length.

In some embodiments, the first hybridization region comprises a sequence that is complementary to at least 10 contiguous bases of the first target sequence. In some cases, the first hybridization region comprises a sequence that is complementary to at least 8 contiguous bases of the first target sequence.

In some embodiments, the second hybridization region comprises a sequence that is complementary to at least 10 contiguous bases of the second target sequence. In some cases, the second hybridization region comprises a sequence that is complementary to at least 8 contiguous bases of the second target sequence.

In some embodiments, the sequence of the first hybridization region or second hybridization region is at least 40%, 50%, 55%, 60%, 65%, 70%, 75%, 80%, 85%, 90%, 95%, 98%, 99%, or 99.5% complementary to a target sequence described herein. In some embodiments, the sequence of the first hybridization region or second hybridization region is at least 50% complementary to a target sequence described herein. In some embodiments, the sequence of the first hybridization region or second hybridization region is at least 60% complementary to a target sequence described herein. In some embodiments, the sequence of the first hybridization region or second hybridization region is at least 70% complementary to a target sequence described herein. In some embodiments, the sequence of the first hybridization region or second hybridization region is at least 80% complementary to a target sequence described herein. In some embodiments, the sequence of the first hybridization region or second hybridization region is at least 90% complementary to a target sequence described herein. In some embodiments, the sequence of the first hybridization region or second hybridization region is at least 95% complementary to a target sequence described herein. In some embodiments, the sequence of the first hybridization region or second hybridization region is at least 99% complementary to a target sequence described herein. In some instances, the sequence of the first hybridization region or second hybridization region is 100% complementary to a target sequence described herein.

In some embodiments, the sequence of the first hybridization region or second hybridization region has 5 or less mismatches to a target sequence described herein. In some embodiments, the sequence of the first hybridization region or second hybridization region has 4 or less mismatches to a target sequence described herein. In some instances, the sequence of the first hybridization region or second hybridization region has 3 or less mismatches to a target sequence described herein. In some cases, the sequence of the first hybridization region or second hybridization region has 2 or less mismatches to a target sequence described herein. In some cases, the sequence of the first hybridization region or second hybridization region has 1 or less mismatches to a target sequence described herein.

In some embodiments, the specificity of the first hybridization region or second hybridization region that hybridizes to a target sequence described herein is a 95%, 98%, 99%, 99.5% or 100% sequence complementarity. In some instances, the hybridization is a high stringent hybridization condition.

In some embodiments, the oligonucleotide conjugate has reduced off-target effect. In some instances, "off-target" or "off-target effects" refer to any instance in which an oligonucleotide conjugate directed against a given target causes an unintended effect by interacting either directly or indirectly with another mRNA sequence, a DNA sequence or a cellular protein or other moiety. In some instances, an "off-target effect" occurs when there is a simultaneous degradation of other transcripts due to partial homology or complementarity between that other transcript and the oligonucleotide conjugate.

In some embodiments, the oligonucleotide conjugate comprises natural or synthetic or artificial nucleotide analogues or bases. In some cases, the oligonucleotide conjugate comprises combinations of DNA, RNA and/or nucleotide analogues. In some instances, the synthetic or artificial nucleotide analogues or bases comprise modifications at one or more of ribose moiety, phosphate moiety, nucleoside moiety, or a combination thereof.

In some embodiments, nucleotide analogues comprise morpholinos. Morpholino or phosphorodiamidate morpholino oligomer (PMO) comprises synthetic molecules whose structure mimics natural nucleic acid structure by deviates from the normal sugar and phosphate structures. In some instances, the five member ribose ring is substituted with a six member morpholino ring containing four carbons, one nitrogen and one oxygen. In some cases, the ribose monomers are linked by a phosphordiamidate group instead of a phosphate group. In such cases, the backbone alterations remove all positive and negative charges making morpholinos neutral molecules capable of crossing cellular membranes without the aid of cellular delivery agents such as those used by charged oligonucleotides.

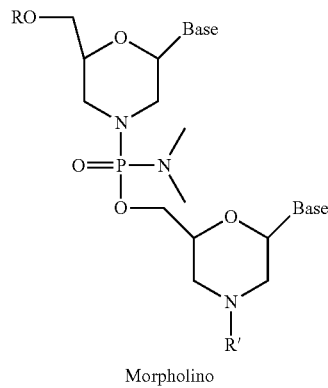

Morpholino

In some embodiments, a morpholino or PMO described above is a PMO-X (Sarepta). In some cases, PMO-X refers to phosphorodiamidate morpholino oligomers comprising at least one linkage or at least one of the disclosed terminal modifications, such as those disclosed in PCT Publication No. WO2011/150408 and U.S. Publication No. 2012/0065169.

In some embodiments, a morpholino or PMO described above is a PMO as described in Table 5 of U.S. Publication No. 2014/0296321.

In some embodiments, one or more modifications comprise a modified phosphate backbone in which the modification generates a neutral or uncharged backbone. In some instances, the phosphate backbone is modified by alkylation to generate an uncharged or neutral phosphate backbone. As used herein, alkylation includes methylation, ethylation, and propylation. In some cases, an alkyl group, as used herein in the context of alkylation, refers to a linear or branched saturated hydrocarbon group containing from 1 to 6 carbon atoms. In some instances, exemplary alkyl groups include, but are not limited to, methyl, ethyl, n-propyl, isopropyl, n-butyl, isobutyl, sec-butyl, tert-butyl, n-pentyl, isopentyl, neopentyl, hexyl, isohexyl, 1, 1-dimethylbutyl, 2,2-dimethylbutyl, 3.3-dimethylbutyl, and 2-ethylbutyl groups. In some cases, a modified phosphate is a phosphate group as described in U.S. Pat. No. 9,481,905.

In some embodiments, additional modified phosphate backbones comprise methylphosphonate, ethylphosphonate, methylthiophosphonate, or methoxyphosphonate. In some cases, the modified phosphate is methylphosphonate. In some cases, the modified phosphate is ethylphosphonate. In some cases, the modified phosphate is methylthiophosphonate. In some cases, the modified phosphate is methoxyphosphonate.

In some embodiments, one or more modifications further optionally include modifications of the ribose moiety, phosphate backbone and the nucleoside, or modifications of the nucleotide analogues at the 3' or the 5' terminus. For example, the 3' terminus optionally include a 3' cationic group, or by inverting the nucleoside at the 3'-terminus with a 3'-3' linkage. In another alternative, the 3'-terminus is optionally conjugated with an aminoalkyl group, e.g., a 3' C5-aminoalkyl dT. In an additional alternative, the 3'-terminus is optionally conjugated with an abasic site, e.g., with an apurinic or apyrimidinic site. In some instances, the 5-terminus is conjugated with an aminoalkyl group, e.g., a 5'-O-alkylamino substituent. In some cases, the 5'-terminus is conjugated with an abasic site, e.g., with an apurinic or apyrimidinic site.

In some embodiments, the oligonucleotide conjugate comprises one or more of the artificial nucleotide analogues described herein. In some instances, the oligonucleotide conjugate comprises 1, 2, 3, 4, 5, 6, 7, 8, 9, 10, 11, 12, 13, 14, 15, 16, 17, 18, 20, 25, or more morpholinos. In some instances, the oligonucleotide conjugate comprises 1, 2, 3, 4, 5, 6, 7, 8, 9, 10, 11, 12, 13, 14, 15, 16, 17, 18, 20, or more morpholinos.

In some instances, the oligonucleotide conjugate comprises at least one of: from about 5% to about 100% modification, from about 10% to about 100% modification, from about 20% to about 100% modification, from about 30% to about 100% modification, from about 40% to about 100% modification, from about 50% to about 100% modification, from about 60% to about 100% modification, from about 70% to about 100% modification, from about 80% to about 100% modification, and from about 90% to about 100% modification. In some instances, the oligonucleotide conjugate is modified with PMOs.

In some cases, the oligonucleotide conjugate comprises at least one of from about 10% to about 90% modification, from about 20% to about 90% modification, from about 30% to about 90% modification, from about 40% to about 90% modification, from about 50% to about 90% modification, from about 60% to about 90% modification, from about 70% to about 90% modification, and from about 80% to about 100% modification. In some instances, the oligonucleotide conjugate is modified with PMOs.

In some cases, the oligonucleotide conjugate comprises at least one of from about 10% to about 80% modification, from about 20% to about 80% modification, from about 30% to about 80% modification, from about 40% to about 80% modification, from about 50% to about 80% modification, from about 60% to about 80% modification, and from about 70% to about 80% modification. In some instances, the oligonucleotide conjugate is modified with PMOs.

In some instances, the oligonucleotide conjugate comprises at least one of from about 10% to about 70% modification, from about 20% to about 70% modification, from about 30% to about 70% modification, from about 40% to about 70% modification, from about 50% to about 70% modification, and from about 60% to about 70% modification. In some instances, the oligonucleotide conjugate is modified with PMOs.

In some instances, the oligonucleotide conjugate comprises at least about 1, about 2, about 3, about 4, about 5, about 6, about 7, about 8, about 9, about 10, about 11, about 12, about 13, about 14, about 15, about 16, about 17, about 18, about 19, about 20, about 21, about 22 or more modified nucleotides.

In some instances, from about 5 to about 100% of an oligonucleotide conjugate comprise PMOs. In some instances, about 5%, 1, 1%, 20%, 2%, 30%, 35%, 40%, 45%, 50%, 55%, 60%, 65%, 70%, 75%, 80%, 85%, 90%, 95% or 100% of the oligonucleotide conjugate comprise PMOs. In some instances, about 5% of an oligonucleotide conjugate comprises PMOs. In some instances, about 10% of an oligonucleotide conjugate comprises PMOs. In some instances, about 15% of an oligonucleotide conjugate comprises PMOs. In some instances, about 20% of an oligonucleotide conjugate comprises PMOs. In some instances, about 25% of an oligonucleotide conjugate comprises PMOs. In some instances, about 30% of an oligonucleotide conjugate comprises PMOs. In some instances, about 35% of an oligonucleotide conjugate comprises PMOs. In some instances, about 40% of an oligonucleotide conjugate comprises PMOs. In some instances, about 45% of an oligonucleotide conjugate comprises PMOs. In some instances, about 50% of an oligonucleotide conjugate comprises PMOs. In some instances, about 55% of an oligonucleotide conjugate comprises PMOs. In some instances, about 60% of an oligonucleotide conjugate comprises PMOs. In some instances, about 65% of an oligonucleotide conjugate comprises PMOs. In some instances, about 70% of an oligonucleotide conjugate comprises PMOs. In some instances, about 75% of an oligonucleotide conjugate comprises PMOs. In some instances, about 80% of an oligonucleotide conjugate comprises PMOs. In some instances, about 85% of an oligonucleotide conjugate comprises PMOs. In some instances, about 90% of an oligonucleotide conjugate comprises PMOs. In some instances, about 95% of an oligonucleotide conjugate comprises PMOs. In some instances, about 96% of an oligonucleotide conjugate comprises PMOs. In some instances, about 97% of an oligonucleotide conjugate comprises PMOs. In some instances, about 98% of an oligonucleotide conjugate comprises PMOs. In some instances, about 99% of an oligonucleotide conjugate comprises PMOs. In some instances, about 100% of an oligonucleotide conjugate comprises PMOs.

In some cases, one or more PMOs described herein are resistant toward nucleases such as for example ribonuclease such as RNase H, deoxyribonuclease such as DNase, or exonuclease such as 5'-3' exonuclease and 3'-5' exonuclease when compared to natural polynucleic acid molecules.

In some embodiments, one or more PMOs described herein have increased binding affinity toward their mRNA target relative to an equivalent natural oligonucleotide conjugate. In some cases, the increased affinity is illustrated with a lower Kd, a higher melt temperature (Tm), or a combination thereof.

In some embodiments, a first hybridization region comprising one or more PMOs (e.g., 100% PMOs) hybridizes to an exonic region within the first target sequence of the pre-mRNA. In some instances, the first hybridization region comprising one or more PMOs (e.g., 100% PMOs) hybridizes to an intronic region within the first target sequence. In some instances, the first hybridization region comprising one or more PMOs (e.g., 100% PMOs) hybridizes to an exon/intron junction.

In some embodiments, a second hybridization region comprising one or more PMOs (e.g., 100% PMOs) hybridizes to an exonic region within the second target sequence of the pre-mRNA. In some instances, the second hybridization region comprising one or more PMOs (e.g., 100% PMOs) hybridizes to an intronic region within the second target sequence. In some instances, the second hybridization region comprising one or more PMOs (e.g., 100% PMOs) hybridizes to an exon/intron junction.

In some embodiments, the first hybridization region comprising one or more PMOs (e.g., 100% PMOs) hybridizes to a region within an intron that is adjacent upstream of the first exon. In some instances, the intron is between the third exon and the first exon, e.g., adjacent downstream of the third exon and adjacent upstream of the first exon. In some instances, the first hybridization region comprising one or more PMOs (e.g., 100% PMOs) hybridizes to a region at the intron-first exon junction. In additional instances, the first hybridization region comprising one or more PMOs (e.g., 100% PMOs) hybridizes to a region at the intron-third exon junction.

In some embodiments, the second hybridization region comprising one or more PMOs (e.g., 100% PMOs) hybridizes to a region within an intron that is adjacent downstream of the second exon. In some instances, the intron is between the fourth exon and the second exon, e.g., adjacent downstream from the second exon and adjacent upstream of the fourth exon. In some instances, the second hybridization region comprising one or more PMOs (e.g., 100% PMOs) hybridizes to a region at the intron-second exon junction. In additional instances, the second hybridization region comprising one or more PMOs (e.g., 100% PMOs) hybridizes to a region at the intron-fourth exon junction.

In some embodiments, an oligonucleotide conjugate described herein is a chirally pure (or stereo pure) oligonucleotide conjugate, or an oligonucleotide conjugate comprising a single enantiomer. In some instances, the oligonucleotide conjugate comprises L-nucleotide. In some instances, the oligonucleotide conjugate comprises D-nucleotides. In some instance, an oligonucleotide conjugate comprises less than 30%, 25%, 20%, 15%, 10%, 5%, 4%, 3%, 2%, 1%, or less of its mirror enantiomer. In some cases, an oligonucleotide conjugate comprises less than 30%, 25%, 20%, 15%, 10%, 5%, 4%, 3%, 2%, 1%, or less of a racemic mixture. In some instances, the oligonucleotide conjugate comprises a polynucleic acid described in: U.S. Patent Publication Nos: 2014/194610 and 2015/211006; and PCT Publication No.: WO2015107425.

In some instances, the polymer linking the first hybridization region and the second hybridization region is a natural or synthetic polymer, consisting of long chains of branched or unbranched monomers, and/or cross-linked network of monomers in two or three dimensions. In some instances, the polymer includes a polysaccharide, lignin, rubber, or polyalkylen oxide (e.g., polyethylene glycol). In some instances, the polymer includes, but is not limited to, alpha-omega-dihydroxylpolyethyleneglycol, biodegradable lactone-based polymer (e.g., polyacrylic acid, polylactide acid (PLA), poly(glycolic acid) (PGA), polypropylene, polystyrene, polyolefin, polyamide, polycyanoacrylate, polyimide, polyethylenterephthalat (PET, PETG), polyethylene terephthalate (PETE), polytetramethylene glycol (PTG), or polyurethane as well as mixtures thereof). As used herein, a mixture refers to the use of different polymers within the same compound as well as in reference to block copolymers. In some cases, block copolymers are polymers wherein at least one section of a polymer is build up from monomers of another polymer. In some instances, the polymer comprises polyalkylene oxide. In some instances, the polymer comprises PEG. In some instances, the polymer comprises polyethylene imide (PEI) or hydroxy ethyl starch (HES).

In some instances, the polymer is a PEG moiety. In some embodiments, the polyalkylene oxide (e.g., PEG) is a polydispers or monodispers compound. In some instances, polydispers material comprises disperse distribution of different molecular weight of the material, characterized by mean weight (weight average) size and dispersity. In some instances, the monodisperse PEG comprises one size of molecules. In some embodiments, the polymer is poly- or monodispersed polyalkylene oxide (e.g., PEG) and the indicated molecular weight represents an average of the molecular weight of the polyalkylene oxide (e.g., PEG) molecules.

In some embodiments, the molecular weight of the polyalkylene oxide (e.g., PEG) is about 200, 300, 400, 500, 600, 700, 800, 900, 1000, 1100, 1200, 1300, 1400, 1450, 1500, 1600, 1700, 1800, 1900, 2000, 2100, 2200, 2300, 2400, 2500, 2600, 2700, 2800, 2900, 3000, 3250, 3350, 3500, 3750, 4000, 4250, 4500, 4600, 4750, 5000, 5500, 6000, 6500, 7000, 7500, 8000, 10,000, 12,000, 20,000, 35,000, 40,000, 50,000, 60,000, or 100,000 Da.

In some embodiments, the polyalkylene oxide (e.g., PEG) is a discrete PEG, in which the discrete PEG is a polymeric PEG comprising more than one repeating ethylene oxide units. In some instances, a discrete PEG (dPEG) comprises from 2 to 60, from 2 to 50, or from 2 to 48 repeating ethylene oxide units. In some instances, a dPEG comprises about 2, 3, 4, 5, 6, 7, 8, 9, 10, 11, 12, 13, 14, 15, 16, 17, 18, 19, 20, 22, 24, 26, 28, 30, 35, 40, 42, 48, 50 or more repeating ethylene oxide units. In some instances, a dPEG comprises about 2 or more repeating ethylene oxide units. In some instances, a dPEG comprises about 3 or more repeating ethylene oxide units. In some instances, a dPEG comprises about 4 or more repeating ethylene oxide units. In some instances, a dPEG comprises about 5 or more repeating ethylene oxide units. In some instances, a dPEG comprises about 6 or more repeating ethylene oxide units. In some instances, a dPEG comprises about 7 or more repeating ethylene oxide units. In some instances, a dPEG comprises about 8 or more repeating ethylene oxide units. In some instances, a dPEG comprises about 9 or more repeating ethylene oxide units. In some instances, a dPEG comprises about 10 or more repeating ethylene oxide units. In some instances, a dPEG comprises about 11 or more repeating ethylene oxide units. In some instances, a dPEG comprises about 12 or more repeating ethylene oxide units. In some instances, a dPEG comprises about 13 or more repeating ethylene oxide units. In some instances, a dPEG comprises about 14 or more repeating ethylene oxide units. In some instances, a dPEG comprises about 15 or more repeating ethylene oxide units. In some instances, a dPEG comprises about 16 or more repeating ethylene oxide units. In some instances, a dPEG comprises about 17 or more repeating ethylene oxide units. In some instances, a dPEG comprises about 18 or more repeating ethylene oxide units. In some instances, a dPEG comprises about 19 or more repeating ethylene oxide units. In some instances, a dPEG comprises about 20 or more repeating ethylene oxide units. In some instances, a dPEG comprises about 22 or more repeating ethylene oxide units. In some instances, a dPEG comprises about 24 or more repeating ethylene oxide units. In some instances, a dPEG comprises about 26 or more repeating ethylene oxide units. In some instances, a dPEG comprises about 28 or more repeating ethylene oxide units. In some instances, a dPEG comprises about 30 or more repeating ethylene oxide units. In some instances, a dPEG comprises about 35 or more repeating ethylene oxide units. In some instances, a dPEG comprises about 40 or more repeating ethylene oxide units. In some instances, a dPEG comprises about 42 or more repeating ethylene oxide units. In some instances, a dPEG comprises about 48 or more repeating ethylene oxide units. In some instances, a dPEG comprises about 50 or more repeating ethylene oxide units. In some cases, a dPEG is synthesized as a single molecular weight compound from pure (e.g., about 95%, 98%, 99%, or 99.5%) staring material in a step-wise fashion. In some cases, a dPEG has a specific molecular weight, rather than an average molecular weight. In some cases, a dPEG described herein is a dPEG from Quanta Biodesign, LMD.

In some instances, the polymer linking the first hybridization region and the second hybridization region is a peptide. In some instances, the peptide comprises about 2, 3, 4, 5, 6, 7, 8, 9, 10, 15, 20, 25, 30, 40, 50, or more residues. In some instances, the peptide comprises about 2, 3, 4, 5, 6, 7, 8, 9, 10, 15, 20, 25, 30, 40, 50, or less residues. In some instances, the peptide is polyAla, polyGly, or a mixture of Ala and Gly.

In some instances, the polymer linking the first hybridization region and the second hybridization region is a $C_1$-$C_{20}$ alkyl group. In some instances, the polymer is a $C_1$-$C_{15}$, a $C_1$-$C_{10}$, a $C_1$-$C_8$, a $C_1$-$C_6$, a $C_4$-$C_{15}$, a $C_4$-$C_{10}$, a $C_4$-$C_8$, a $C_4$-$C_6$, a $C_5$-$C_{15}$, a $C_5$-$C_{10}$, a $C_5$-$C_8$, a $C_5$-$C_6$, a $C_6$-$C_{15}$, a $C_6$-$C_{10}$, a $C_6$-$C_8$, a $C_8$-$C_{20}$, a $C_{10}$-$C_{15}$ alkyl group. In some cases, the polymer comprises a $C_{15}$, a $C_{10}$, a $C_8$, a $C_7$, a $C_6$, a $C_5$, $C_4$, $C_3$, $C_2$, or $C_1$ alkyl group.

In some instances, the polymer linking the first hybridization region and the second hybridization region is a peptidomimetic.

In some embodiments, a linker described herein is a cleavable linker or a non-cleavable linker. In some instances, the linker is a cleavable linker. In some instances, the linker is an acid cleavable linker. In some instances, the linker is a non-cleavable linker. In some instances, the linker includes a C1-C6 alkyl group (e.g., a Cs, C4, C3, C2, or C1 alkyl group). In some instances, the linker includes heterobifunctional cross linkers, and the like. In some instances, the liker is a traceless linker (or a zero-length linker). In some instances, the linker is a non-polymeric linker. In some cases, the linker is a non-peptide linker or a linker that does not contain an amino acid residue.

In some embodiments, the linker comprises a heterobifunctional linker. Exemplary heterobifunctional linker include, but are not limited to, amine-reactive and sulfhydryl cross-linkers such as N-succinimidyl 3-(2-pyridyldithio) propionate (sPDP), long-chain N-succinimidyl 3-(2-pyridyldithio)propionate (LC-sPDP), water-soluble-long-chain N-succinimidyl 3-(2-pyridyldithio) propionate (sulfo-LC-sPDP), succinimidyloxycarbonyl-a-methyl-a-(2-pyridyldithio)toluene (sMPT), sulfosuccinimidyl-6-[a-methyl-a-(2-pyridyldithio)toluamido]hexanoate (sulfo-LC-sMPT), succinimidyl-4-(N-maleimidomethyl)cyclohexane-1-carboxylate (sMCC), sulfosuccinimidyl-4-(N-maleimidomethyl)cyclohexane-1-carboxylate (sulfo-sMCC), m-maleimidobenzoyl-N-hydroxysuccinimide ester (MBs), m-maleimidobenzoyl-N-hydroxysulfosuccinimide ester (sulfo-MBs), N-succinimidyl(4-iodoacteyl)aminobenzoate (sIAB), sulfosuccinimidyl(4-iodoacteyl)aminobenzoate (sulfo-sIAB), succinimidyl-4-(p-maleimidophenyl)butyrate (sMPB), sulfosuccinimidyl-4-(p-maleimi<lophenyl)butyrate (sulfo-sMPB), N-(y-maleimidobutyryloxy)succinimide ester (GMBs), N-(y-maleimidobutyryloxy)sulfosuccinimide ester (sulfo-GMBs), succinimidyl 6-((iodoacetyl) amino)hexanoate (sIAX), succinimidyl 6-[6-(((iodoacetyl) amino)hexanoyl)amino]hexanoate (sIAXX), succinimidyl 4-(((iodoacetyl)amino)methyl)cyclohexane-1-carboxylate (sIAC), succinimidyl 6-((((4-iodoacetyl)amino)methyl)cyclohexane-1-carbonyl)amino) hexanoate (sIACX), p-nitrophenyl iodoacetate (NPIA), carbonyl-reactive and sulfhydryl-reactive cross-linkers such as 4-(4-N-maleimidophenyl) butyric acid hydrazide (MPBH), 4-(N-maleimidomethyl) cyclohexane-1-carboxyl-hydrazide-8 (M2C2H), 3-(2-pyridyldithio)propionyl hydrazide (PDPH), amine-reactive and photoreactive cross-linkers such as N-hydroxysuccinimidyl-4-azidosalicylic acid (NHs-AsA), N-hydroxysulfosuccinimidyl-4-azidosalicylic acid (sulfo-NHs-AsA), sulfosuccinimidyl-(4-azidosalicylamido) hexanoate (sulfo-NHs-LC-AsA), sulfosuccinimidyl-2-(p-azidosalicylamido)ethyl-1,3'-dithiopropionate (sAsD), N-hydroxysuccinimidyl-4-azidobenzoate (HsAB), N-hydroxysulfosuccinimidyl-4-azidobenzoate (sulfo-HsAB), N-succinimidyl-6-(4'-azido-2'-nitrophenylamino)hexanoate (sANPAH), sulfosuccinimidyl-6-(4'-azido-2'-nitrophenylamino) hexanoate (sulfo-sANPAH), N-5-azido-2-nitrobenzoyloxysuccinimide (ANB-NOs), sulfosuccinimidyl-2-(m-azido-o-nitrobenzamido)-ethyl-1,3'-dithiopropionate (sAND), N-succinimidyl-4 (4-azidophenyl) 1,3'-dithiopropionate (sADP), N-sulfosuccinimidyl(4-azidophenyl)-1,3'-dithiopropionate (sulfo-sADP), sulfosuccinimidyl 4-(p-azidophenyl)butyrate (sulfo-sAPB), sulfosuccinimidyl 2-(7-azido-4-methylcoumarin-3-acetamide)ethyl-1,3'-dithiopropionate (sAED), sulfosuccinimidyl 7-azido-4-methylcoumain-3-acetate (sulfo-sAMCA), p-nitrophenyl diazopyruvate (pNPDP), p-nitrophenyl-2-diazo-3,3,3-trifluoropropionate (PNP-DTP), sulfhydryl-reactive and photoreactive cross-linkers such asl-(p-Azidosalicylamido)-4-(iodoacetamido) butane (AsIB), N-[4-(p-azidosalicylamido)butyl]-3'-(2'-pyridyldithio) propionamide (APDP), benzophenone-4-iodoacetamide, benzophenone-4-maleimide carbonyl-reactive and photoreactive cross-linkers such as p-azidobenzoyl hydrazide (ABH), carboxylate-reactive and photoreactive cross-linkers such as 4-(p-azidosalicylamido) butylamine (AsBA), and arginine-reactive and photoreactive cross-linkers such as p-azidophenyl glyoxal (APG).

In some instances, the linker comprises a reactive functional group. In some cases, the reactive functional group comprises a nucleophilic group that is reactive to an electrophilic group present on a binding moiety. Exemplary electrophilic groups include carbonyl groups-such as aldehyde, ketone, carboxylic acid, ester, amide, enone, acyl halide or acid anhydride. In some embodiments, the reactive functional group is aldehyde. Exemplary nucleophilic groups include hydrazide, oxime, amino, hydrazine, thiosemicarbazone, hydrazine carboxylate, and arylhydrazide.

In some embodiments, the linker comprises a maleimide group. In some instances, the maleimide group is also referred to as a maleimide spacer. In some instances, the maleimide group further encompasses a caproic acid, forming maleimidocaproyl (me). In some cases, the linker comprises maleimidocaproyl (me). In some cases, the linker is maleimidocaproyl (me). In other instances, the maleimide group comprises a maleimidomethyl group, such as succinimidyl-4-(N-maleimidomethyl)cyclohexane-1-carboxylate (sMCC) or sulfosuccinimidyl-4-(N-maleimidomethyl)cyclohexane-1-carboxylate (sulfo-sMCC) described above.

In some embodiments, the maleimide group is a self-stabilizing maleimide. In some instances, the self-stabilizing maleimide utilizes diaminopropionic acid (DPR) to incorporate a basic amino group adjacent to the maleimide to provide intramolecular catalysis of tiosuccinimide ring hydrolysis, thereby eliminating maleimide from undergoing an elimination reaction through a retro-Michael reaction. In some instances, the self-stabilizing maleimide is a maleimide group described in Lyon, et al., "Self-hydrolyzing maleimides improve the stability and pharmacological properties of antibody-drug conjugates," Nat. Biotechnol. 32(10): 1059-1062 (2014). In some instances, the linker comprises a self-stabilizing maleimide. In some instances, the linker is a self-stabilizing maleimide.

In some embodiments, the linker comprises a peptide moiety. In some instances, the peptide moiety comprises at least 2, 3, 4, 5, 6, 7, 8, or more amino acid residues. In some instances, the peptide moiety is a cleavable peptide moiety (e.g., either enzymatically or chemically). In some instances, the peptide moiety is anon-cleavable peptide moiety. In some instances, the peptide moiety comprises Val-Cit (valine-citrulline), Gly-Gly-Phe-Gly (SEQ ID NO: 1), Phe-Lys, Val-Lys, Gly-Phe-Lys, Phe-Phe-Lys, Ala-Lys, Val-Arg, Phe-Cit, Phe-Arg, Leu-Cit, Ile-Cit, Trp-Cit, Phe-Ala, Ala-Leu-Ala-Leu (SEQ ID NO: 2), or Gly-Phe-Leu-Gly (SEQ ID NO: 3). In some instances, the linker comprises a peptide moiety such as: Val-Cit (valine-citrulline), Gly-Gly-Phe-Gly (SEQ ID NO: 1), Phe-Lys, Val-Lys, Gly-Phe-Lys, Phe-Phe-Lys, Ala-Lys, Val-Arg, Phe-Cit, Phe-Arg, Leu-Cit, Ile-Cit, Trp-Cit, Phe-Ala, Ala-Leu-Ala-Leu (SEQ ID NO: 2), or Gly-Phe-Leu-Gly (SEQ ID NO: 3). In some cases, the linker comprises Val-Cit. In some cases, the linker is Val-Cit.

In some embodiments, the linker comprises a benzoic acid group, or its derivatives thereof. In some instances, the benzoic acid group or its derivatives thereof comprise paraaminobenzoic acid (PABA). In some instances, the benzoic acid group or its derivatives thereof comprise gamma-aminobutyric acid (GABA).

In some embodiments, the linker comprises one or more of a maleimide group, a peptide moiety, and/or a benzoic acid group, in any combination. In some embodiments, the linker comprises a combination of a maleimide group, a peptide moiety, and/or a benzoic acid group. In some instances, the maleimide group is maleimidocaproyl (me). In some instances, the peptide group is val-cit. In some instances, the benzoic acid group is PABA. In some instances, the linker comprises a me-val-cit group. In some cases, the linker comprises a val-cit-PABA group. In additional cases, the linker comprises a me-val-cit-PABA group.

In some embodiments, the linker is a self-immolative linker or a self-elimination linker. In some cases, the linker is a self-immolative linker. In other cases, the linker is a self-elimination linker (e.g., a cyclization self-elimination linker). In some instances, the linker comprises a linker described in U.S. Pat. No. 9,089,614 or PCT Publication No. WO2015038426.

In some embodiments, the linker is a dendritic type linker. In some instances, the dendritic type linker comprises a branching, multifunctional linker moiety. In some instances, the dendritic type linker is used to increase the molar ratio of polynucleotide B to the binding moiety A. In some instances, the dendritic type linker comprises PAMAM dendrimers.

In some embodiments, the linker is a traceless linker or a linker in which after cleavage does not leave behind a linker moiety (e.g., an atom or a linker group). Exemplary traceless linkers include, but are not limited to, germanium linkers, silicium linkers, sulfur linkers, selenium linkers, nitrogen linkers, phosphorus linkers, boron linkers, chromium linkers, or phenylhydrazide linker. In some cases, the linker is a traceless aryl-triazene linker as described in Hejesen, et al., "A traceless aryl-triazene linker for DNA-directed chemistry," Org Biomol Chem 11(15): 2493-2497 (2013). In some instances, the linker is a traceless linker described in Blaney, et al., "Traceless solid-phase organic synthesis," Chem. Rev. 102: 2607-2024 (2002). In some instances, a linker is a traceless linker as described in U.S. Pat. No. 6,821,783.

In some instances, the linker comprises a functional group that exerts steric hindrance at the site of bonding between the linker and a conjugating moiety. In some instances, the steric hindrance is a steric hindrance around a disulfide bond. Exemplary linkers that exhibit steric hindrance comprises a heterobifuctional linker, such as a heterobifunctional linker described above. In some cases, a linker that exhibits steric hindrance comprises SMCC and SPDB.

In some instances, the linker is an acid cleavable linker. In some instances, the acid cleavable linker comprises a hydrazone linkage, which is susceptible to hydrolytic cleavage. In some cases, the acid cleavable linker comprises a thiomaleamic acid linker. In some cases, the acid cleavable linker is a thiomaleamic acid linker as described in Castaneda, et al, "Acid-cleavable thiomaleamic acid linker for homogeneous antibody-drug conjugation," Chem. Commun. 49: 8187-8189 (2013).

In some instances, the linker is a linker described in U.S. Pat. Nos. 6,884,869; 7,498,298; 8,288,352; 8,609,105; or 8,697,688; U.S. Patent Publication Nos. 2014/0127239; 2013/028919; 2014/286970; 2013/0309256; 2015/037360; or 2014/0294851; or PCT Publication Nos. WO2015057699; WO2014080251; WO2014197854; WO2014145090; or WO2014177042.

Oligonucleotide Conjugate Synthesis

In some embodiments, the oligonucleotide portion of an oligonucleotide conjugate described herein is constructed using chemical synthesis and/or enzymatic ligation reactions using procedures known in the art. For example, the oligonucleotide portion is chemically synthesized using naturally occurring nucleotides or variously modified nucleotides designed to increase the biological stability of the molecules or to increase the physical stability of the duplex formed between the oligonucleotide and target nucleic acids. Exemplary methods include those described in: U.S. Pat. Nos. 5,142,047; 5,185,444; 5,889,136; 6,008,400; and 6,111,086; PCT Publication No. WO2009099942; or European Publication No. 1579015. Additional exemplary methods include those described in: Abramova et al., "Novel oligonucleotide analogues based on morpholino nucleoside subunits-antisense technologies: new chemical possibilities," Indian Journal of Chemistry 48B:1721-1726 (2009). Alternatively, the oligonucleotide portion is produced biologically using an expression vector into which the oligonucleotide portion has been subcloned in an antisense orientation (i.e., RNA transcribed from the inserted oligonucleotide will be of an antisense orientation to a target polynucleic acid molecule of interest).

In some embodiments, the oligonucleotide portion is synthesized via a tandem synthesis methodology, wherein both strands are synthesized as a single contiguous oligonucleotide fragment or strand separated by a cleavable linker which is subsequently cleaved to provide separate fragments or strands that hybridize and permit purification of the duplex.

Additional modification methods for incorporating, for example, sugar, base and phosphate modifications include:

Eckstein et al., International Publication PCT No. WO 92/07065; Perrault et al. *Nature,* 1990, 344, 565-568; Pieken et al. *Science,* 1991, 253, 314-317; Usman and Cedergren, *Trends in Biochem. Sci.,* 1992, 17, 334-339; Usman et al. International Publication PCT No. WO 93/15187; Sproat, U.S. Pat. No. 5,334,711 and Beigelman et al., 1995, *J. Biol. Chem.,* 270, 25702; Beigelman et al., International PCT publication No. WO 97/26270; Beigelman et al., U.S. Pat. No. 5,716,824; Usman et al., U.S. Pat. No. 5,627,053; Woolf et al., International PCT Publication No. WO 98/13526; Thompson et al., U.S. Ser. No. 60/082,404 which was filed on Apr. 20, 1998; Karpeisky et al., 1998, *Tetrahedron Lett.,* 39, 1131; Earnshaw and Gait, 1998, *Biopolymers (Nucleic Acid Sciences),* 48, 39-55; Verma and Eckstein, 1998, *Annu. Rev. Biochem.,* 67, 99-134; and Burlina et al., 1997, *Bioorg. Med. Chem.,* 5, 1999-2010. Such publications describe general methods and strategies to determine the location of incorporation of sugar, base and/or phosphate modifications and the like into nucleic acid molecules without modulating catalysis.

Binding Moieties

In some embodiments, the oligonucleotide conjugate is further conjugated to a binding moiety for delivery to a site of interest. In some instances, the binding moiety is a polypeptide. In some instances, the polypeptide is an antibody or its fragment thereof. In some cases, the fragment is a binding fragment. In some instances, the antibody or binding fragment thereof comprises a humanized antibody or binding fragment thereof, murine antibody or binding fragment thereof, chimeric antibody or binding fragment thereof, monoclonal antibody or binding fragment thereof, monovalent Fab', divalent Fab$_2$, F(ab)'$_3$ fragments, single-chain variable fragment (scFv), bis-scFv, (scFv)$_2$, diabody, minibody, nanobody, triabody, tetrabody, disulfide stabilized Fv protein (dsFv), single-domain antibody (sdAb), Ig NAR, camelid antibody or binding fragment thereof, bispecific antibody or biding fragment thereof, or a chemically modified derivative thereof.

In some instances, the binding moiety is a humanized antibody or binding fragment thereof. In some instances, the binding moiety is a murine antibody or binding fragment thereof. In some instances, the binding moiety is a chimeric antibody or binding fragment thereof. In some instances, the binding moiety is a monoclonal antibody or binding fragment thereof. In some instances, the binding moiety is a monovalent Fab'. In some instances, the binding moiety is a diavalent Fab$_2$. In some instances, the binding moiety is a single-chain variable fragment (scFv).

In some embodiments, the binding moiety is a bispecific antibody or binding fragment thereof. In some instances, the bispecific antibody is a trifunctional antibody or a bispecific mini-antibody. In some cases, the bispecific antibody is a trifunctional antibody. In some instances, the trifunctional antibody is a full length monoclonal antibody comprising binding sites for two different antigens.

In some cases, the bispecific antibody is a bispecific mini-antibody. In some instances, the bispecific mini-antibody comprises divalent Fab$_2$, F(ab)'$_3$ fragments, bis-scFv, (scFv)$_2$, diabody, minibody, triabody, tetrabody or a bi-specific T-cell engager (BiTE). In some embodiments, the bi-specific T-cell engager is a fusion protein that contains two single-chain variable fragments (scFvs) in which the two scFvs target epitopes of two different antigens.

In some embodiments, the binding moiety is a trispecific antibody. In some instances, the trispecific antibody comprises F(ab)'$_3$ fragments or a triabody. In some instances, the binding moiety is a trispecific F(ab)'$_3$ fragment. In some cases, the binding moiety is a triabody. In some embodiments, the binding moiety is a trispecific antibody as described in Dimas, et al., "Development of a trispecific antibody designed to simultaneously and efficiently target three different antigens on tumor cells," *Mol. Pharmaceutics,* 12(9): 3490-3501 (2015).

In some embodiments, the binding moiety is an antibody or binding fragment thereof that recognizes a cell surface protein. In some instances, the binding moiety is an antibody or binding fragment thereof that recognizes a cell surface protein on a muscle cell. Exemplary cell surface proteins recognized by an antibody or binding fragment thereof include, but are not limited to, Sca-1, CD34, Myo-D, myogenin, MRF4, NCAM, CD43, and CD95 (Fas).

In some instances, the cell surface protein comprises clusters of differentiation (CD) cell surface markers. Exemplary CD cell surface markers include, but are not limited to, CD1, CD2, CD3, CD4, CD5, CD6, CD7, CD8, CD9, CD10, CD11a, CD11b, CD11c, CD11d, CDw12, CD13, CD14, CD15, CD15s, CD16, CDw17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42, CD43, CD44, CD45, CD45RO, CD45RA, CD45RB, CD46, CD47, CD48, CD49a, CD49b, CD49c, CD49d, CD49e, CD49f, CD50, CD51, CD52, CD53, CD54, CD55, CD56, CD57, CD58, CD59, CDw60, CD61, CD62E, CD62L (L-selectin), CD62P, CD63, CD64, CD65, CD66a, CD66b, CD66c, CD66d, CD66e, CD79 (e.g., CD79a, CD79b), CD90, CD95 (Fas), CD103, CD104, CD125 (IL5RA), CD134 (OX40), CD137 (4-1BB), CD152 (CTLA-4), CD221, CD274, CD279 (PD-1), CD319 (SLAMF7), CD326 (EpCAM), and the like.

In some instances, the binding moiety is an antibody or binding fragment thereof that recognizes a CD cell surface marker. In some instances, the binding moiety is an antibody or binding fragment thereof that recognizes CD1, CD2, CD3, CD4, CD5, CD6, CD7, CD8, CD9, CD10, CD11a, CD11b, CD11c, CD11d, CDw12, CD13, CD14, CD15, CD15s, CD16, CDw17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42, CD43, CD44, CD45, CD45RO, CD45RA, CD45RB, CD46, CD47, CD48, CD49a, CD49b, CD49c, CD49d, CD49e, CD49f, CD50, CD51, CD52, CD53, CD54, CD55, CD56, CD57, CD58, CD59, CDw60, CD61, CD62E, CD62L (L-selectin), CD62P, CD63, CD64, CD65, CD66a, CD66b, CD66c, CD66d, CD66e, CD79 (e.g., CD79a, CD79b), CD90, CD95 (Fas), CD103, CD104, CD125 (IL5RA), CD134 (OX40), CD137 (4-1BB), CD152 (CTLA-4), CD221, CD274, CD279 (PD-1), CD319 (SLAMF7), CD326 (EpCAM), or a combination thereof.

In some embodiments, the binding moiety is an anti-myosin antibody, an anti-transferrin antibody, and an antibody that recognizes Muscle-Specific kinase (MuSK).

In some instances, the binding moiety is an anti-myosin antibody. In some cases, the anti-myosin antibody is a humanized antibody. In other cases, the anti-myosin antibody is a chimeric antibody. In additional cases, the anti-myosin antibody is a monovalent, a divalent, or a multi-valent antibody.

In some instances, the binding moiety is an anti-transferrin (anti-CD71) antibody. In some cases, the anti-transferrin antibody is a humanized antibody. In other cases, the anti-transferrin antibody is a chimeric antibody. In additional cases, the anti-transferrin antibody is a monovalent, a divalent, or a multi-valent antibody. In some embodiments, exemplary anti-transferrin antibodies include MAB5746 from R&D Systems, AHP858 from Bio-Rad Laboratories, A80-128A from Bethyl Laboratories, Inc., and T2027 from MilliporeSigma. In some instances, the anti-transferrin (anti-CD71) antibodies include human anti-transferrin antibody, an anti-transferrin antibody specifically binding to human transferrin receptor protein, or the anti-transferrin antibody disclosed in PCT/US2019/068078.

In some instances, the binding moiety is an antibody that recognizes MuSK. In some cases, the anti-MuSK antibody is a humanized antibody. In other cases, the anti-MuSK antibody is a chimeric antibody. In additional cases, the anti-MuSK antibody is a monovalent, a divalent, or a multi-valent antibody.

In some embodiments, the binding moiety is conjugated to an oligonucleotide conjugate non-specifically. In some instances, the binding moiety is conjugated to the oligonucleotide conjugate via a lysine residue or a cysteine residue, in a non-site specific manner. In some instances, the binding moiety is conjugated to the oligonucleotide conjugate via a lysine residue in a non-site specific manner. In some cases, the binding moiety is conjugated to the oligonucleotide conjugate via a cysteine residue in a non-site specific manner.

In some embodiments, the binding moiety is conjugated to an oligonucleotide conjugate in a site-specific manner. In some instances, the binding moiety is conjugated to the oligonucleotide conjugate through a lysine residue, a cysteine residue, at the 5'-terminus, at the 3'-terminus, an unnatural amino acid, or an enzyme-modified or enzyme-catalyzed residue, via a site-specific manner. In some instances, the binding moiety is conjugated to the oligonucleotide conjugate through a lysine residue via a site-specific manner. In some instances, the binding moiety is conjugated to the oligonucleotide conjugate through a cysteine residue via a site-specific manner. In some instances, the binding moiety is conjugated to the oligonucleotide conjugate at the 5'-terminus via a site-specific manner. In some instances, the binding moiety is conjugated to the oligonucleotide conjugate at the 3'-terminus via a site-specific manner. In some instances, the binding moiety is conjugated to the oligonucleotide conjugate through an unnatural amino acid via a site-specific manner. In some instances, the binding moiety is conjugated to the oligonucleotide conjugate through an enzyme-modified or enzyme-catalyzed residue via a site-specific manner.

In some embodiments, the number of the oligonucleotide conjugate binding to a binding moiety forms a ratio. In some instances, the ratio is referred to as a DAR (drug-to-antibody) ratio, in which the drug as referred to herein is the oligonucleotide conjugate. In some instances, the DAR ratio of the oligonucleotide conjugate to the binding moiety is about 1, 2, 3, 4, 5, 6, 7, 8, 9, 10, 11, 12, 13, 14, 15, 16, 17, 18, 19, 20, or greater. In some instances, the DAR ratio of the oligonucleotide conjugate to the binding moiety is about 1 or greater. In some instances, the DAR ratio of the oligonucleotide conjugate to the binding moiety is about 2 or greater. In some instances, the DAR ratio of the oligonucleotide conjugate to the binding moiety is about 3 or greater. In some instances, the DAR ratio of the oligonucleotide conjugate to the binding moiety is about 4 or greater. In some instances, the DAR ratio of the oligonucleotide conjugate to the binding moiety is about 5 or greater. In some instances, the DAR ratio of the oligonucleotide conjugate to the binding moiety is about 6 or greater. In some instances, the DAR ratio of the oligonucleotide conjugate to the binding moiety is about 7 or greater. In some instances, the DAR ratio of the oligonucleotide conjugate to the binding moiety is about 8 or greater. In some instances, the DAR ratio of the oligonucleotide conjugate to the binding moiety is about 9 or greater. In some instances, the DAR ratio of the oligonucleotide conjugate to the binding moiety is about 10 or greater. In some instances, the DAR ratio of the oligonucleotide conjugate to the binding moiety is about 11 or greater. In some instances, the DAR ratio of the oligonucleotide conjugate to the binding moiety is about 12 or greater.

In some embodiments, an antibody or its binding fragment is further modified using conventional techniques known in the art, for example, by using amino acid deletion, insertion, substitution, addition, and/or by recombination and/or any other modification (e.g., posttranslational and chemical modifications, such as glycosylation and phosphorylation) known in the art either alone or in combination. In some instances, the modification further comprises a modification for modulating interaction with Fc receptors. In some instances, the one or more modifications include those described in, for example, International Publication No. WO97/34631, which discloses amino acid residues involved in the interaction between the Fc domain and the FcRn receptor. Methods for introducing such modifications in the nucleic acid sequence underlying the amino acid sequence of an antibody or its binding fragment is well known to the person skilled in the art.

In some instances, an antibody binding fragment further encompasses its derivatives and includes polypeptide sequences containing at least one CDR.

In some instances, the term "single-chain" as used herein means that the first and second domains of a bi-specific single chain construct are covalently linked, preferably in the form of a co-linear amino acid sequence encodable by a single nucleic acid molecule.

In some instances, a bispecific single chain antibody construct relates to a construct comprising two antibody derived binding domains. In such embodiments, bi-specific single chain antibody construct is tandem bi-scFv or diabody. In some instances, a scFv contains a VH and VL domain connected by a linker peptide. In some instances, linkers are of a length and sequence sufficient to ensure that each of the first and second domains can, independently from one another, retain their differential binding specificities.

In some embodiments, binding to or interacting with as used herein defines a binding/interaction of at least two antigen-interaction-sites with each other. In some instances, antigen-interaction-site defines a motif of a polypeptide that shows the capacity of specific interaction with a specific antigen or a specific group of antigens. In some cases, the binding/interaction is also understood to define a specific recognition. In such cases, specific recognition refers to that the antibody or its binding fragment is capable of specifically interacting with and/or binding to at least two amino acids of each of a target molecule. For example, specific recognition relates to the specificity of the antibody molecule, or to its ability to discriminate between the specific regions of a target molecule. In additional instances, the specific interaction of the antigen-interaction-site with its specific antigen results in an initiation of a signal, e.g. due to the induction of a change of the conformation of the antigen, an oligomerization of the antigen, etc. In further embodiments, the binding is exemplified by the specificity of a "key-lock-principle". Thus in some instances, specific motifs in the amino acid sequence of the antigen-interaction-site and the antigen bind to each other as a result of their primary, secondary or tertiary structure as well as the result of secondary modifications of said structure. In such cases, the specific interaction of the antigen-interaction-site with its specific antigen results as well in a simple binding of the site to the antigen.

In some instances, specific interaction further refers to a reduced cross-reactivity of the antibody or its binding fragment or a reduced off-target effect. For example, the antibody or its binding fragment that bind to the polypeptide/protein of interest but do not or do not essentially bind to any of the other polypeptides are considered as specific for the polypeptide/protein of interest. Examples for the specific interaction of an antigen-interaction-site with a specific antigen comprise the specificity of a ligand for its receptor, for example, the interaction of an antigenic determinant (epitope) with the antigenic binding site of an antibody.

Additional Binding Moieties

In some embodiments, the binding moiety is a plasma protein. In some instances, the plasma protein comprises albumin. In some instances, the binding moiety is albumin. In some instances, albumin is conjugated by one or more of a conjugation chemistry described herein to an oligonucleotide conjugate. In some instances, albumin is conjugated by native ligation chemistry to an oligonucleotide conjugate. In some instances, albumin is conjugated by lysine conjugation to an oligonucleotide conjugate.

In some instances, the binding moiety is a steroid. Exemplary steroids include cholesterol, phospholipids, di- and triacylglycerols, fatty acids, hydrocarbons that are saturated, unsaturated, comprise substitutions, or combinations thereof. In some instances, the steroid is cholesterol. In some instances, the binding moiety is cholesterol. In some instances, cholesterol is conjugated by one or more of a conjugation chemistry described herein to an oligonucleotide conjugate. In some instances, cholesterol is conjugated by native ligation chemistry to an oligonucleotide conjugate. In some instances, cholesterol is conjugated by lysine conjugation to an oligonucleotide conjugate.

In some instances, the binding moiety is a polymer, including but not limited to polynucleic acid molecule aptamers that bind to specific surface markers on cells. In this instance the binding moiety is a polynucleic acid that does not hybridize to a target gene or mRNA, but instead is capable of selectively binding to a cell surface marker similarly to an antibody binding to its specific epitope of a cell surface marker.

In some cases, the binding moiety is a peptide. In some cases, the peptide comprises between about 1 and about 3 kDa. In some cases, the peptide comprises between about 1.2 and about 2.8 kDa, about 1.5 and about 2.5 kDa, or about 1.5 and about 2 kDa. In some instances, the peptide is a bicyclic peptide. In some cases, the bicyclic peptide is a constrained bicyclic peptide. In some instances, the binding moiety is a bicyclic peptide (e.g., bicycles from Bicycle Therapeutics).

In additional cases, the binding moiety is a small molecule. In some instances, the small molecule is an antibody-recruiting small molecule. In some cases, the antibody-recruiting small molecule comprises a target-binding terminus and an antibody-binding terminus, in which the target-binding terminus is capable of recognizing and interacting with a cell surface receptor. For example, in some instances, the target-binding terminus comprising a glutamate urea compound enables interaction with PSMA, thereby, enhances an antibody interaction with a cell that expresses PSMA. In some instances, a binding moiety is a small molecule described in Zhang et al., "A remote arene-binding site on prostate specific membrane antigen revealed by antibody-recruiting small molecules," J Am Chem Soc. 132(36): 12711-12716 (2010); or McEnaney, et al., "Antibody-recruiting molecules: an emerging paradigm for engaging immune function in treating human disease," ACS Chem Biol. 7(7): 1139-1151 (2012).

Conjugation Chemistry

In some embodiments, an oligonucleotide conjugate is conjugated to a binding moiety. In some instances, the binding moiety comprises amino acids, peptides, polypeptides, proteins, antibodies, antigens, toxins, hormones, lipids, nucleotides, nucleosides, sugars, carbohydrates, polymers such as polyethylene glycol and polypropylene glycol, as well as analogs or derivatives of all of these classes of substances. Additional examples of binding moiety also include steroids, such as cholesterol, phospholipids, di- and triacylglycerols, fatty acids, hydrocarbons (e.g., saturated, unsaturated, or contains substitutions), enzyme substrates, biotin, digoxigenin, and polysaccharides. In some instances, the binding moiety is an antibody or binding fragment thereof. In some instances, the oligonucleotide conjugate is further conjugated to a polymer, and optionally an endosomolytic moiety (e.g., pH-dependent membrane active peptide, amphipathic polypeptide, peptidomimetic, INF, melittin, meucin, or their respective derivatives thereof, small molecule, endosomolytic lipid, etc.) and/or cell membrane penetration moiety (e.g., arginine or lysine rich amino acid sequences, etc.)

In some embodiments, the oligonucleotide conjugate is conjugated to the binding moiety by a chemical ligation process. In some instances, the oligonucleotide conjugate is conjugated to the binding moiety by a native ligation. In some instances, the conjugation is as described in: Dawson, et al. "Synthesis of proteins by native chemical ligation," *Science* 1994, 266, 776-779; Dawson, et al. "Modulation of Reactivity in Native Chemical Ligation through the Use of Thiol Additives," *J. Am. Chem. Soc.* 1997, 119, 4325-4329; Hackeng, et al. "Protein synthesis by native chemical ligation: Expanded scope by using straightforward methodology.," *Proc. Natl. Acad. Sci. USA* 1999, 96, 10068-10073; or Wu, et al. "Building complex glycopeptides: Development of a cysteine-free native chemical ligation protocol," *Angew. Chem. Int. Ed.* 2006, 45, 4116-4125. In some instances, the conjugation is as described in U.S. Pat. No. 8,936,910. In some embodiments, the oligonucleotide conjugate is conjugated to the binding moiety either site-specifically or non-specifically via native ligation chemistry.

In some instances, the oligonucleotide conjugate is conjugated to the binding moiety by a site-directed method utilizing a "traceless" coupling technology (Philochem). In some instances, the "traceless" coupling technology utilizes an N-terminal 1,2-aminothiol group on the binding moiety which is then conjugate with an oligonucleotide conjugate containing an aldehyde group. (see Casi et al., "Site-specific traceless coupling of potent cytotoxic drugs to recombinant antibodies for pharmacodelivery," *JACS* 134(13): 5887-5892 (2012))

In some instances, the oligonucleotide conjugate is conjugated to the binding moiety by a site-directed method utilizing an unnatural amino acid incorporated into the binding moiety. In some instances, the unnatural amino acid comprises p-acetylphenylalanine (pAcPhe). In some instances, the keto group of pAcPhe is selectively coupled to an alkoxy-amine derivatived conjugating moiety to form an oxime bond. (see Axup et al., "Synthesis of site-specific antibody-drug conjugates using unnatural amino acids," *PNAS* 109(40): 16101-16106 (2012)).

In some instances, the oligonucleotide conjugate is conjugated to the binding moiety by a site-directed method utilizing an enzyme-catalyzed process. In some instances, the site-directed method utilizes SMARTag™ technology (Redwood). In some instances, the SMARTag™ technology comprises generation of a formylglycine (FGly) residue from cysteine by formylglycine-generating enzyme (FGE) through an oxidation process under the presence of an aldehyde tag and the subsequent conjugation of FGly to an alkylhydraine-functionalized polynucleic acid molecule via hydrazino-Pictet-Spengler (HIPS) ligation. (see Wu et al., "Site-specific chemical modification of recombinant proteins produced in mammalian cells by using the genetically encoded aldehyde tag," *PNAS* 106(9): 3000-3005 (2009); Agarwal, et al., "A Pictet-Spengler ligation for protein chemical modification," *PNAS* 110(1): 46-51 (2013))

In some instances, the enzyme-catalyzed process comprises microbial transglutaminase (mTG). In some cases, the oligonucleotide conjugate is conjugated to the binding moiety utilizing a microbial transglutaminze catalyzed process. In some instances, mTG catalyzes the formation of a covalent bond between the amide side chain of a glutamine within the recognition sequence and a primary amine of a functionalized polynucleic acid molecule. In some instances, mTG is produced from *Streptomyces mobarensis*. (see Strop et al., "Location matters: site of conjugation modulates stability and pharmacokinetics of antibody drug conjugates," *Chemistry and Biology* 20(2) 161-167 (2013))

In some instances, the oligonucleotide conjugate is conjugated to the binding moiety by a method as described in PCT Publication No. WO2014/140317, which utilizes a sequence-specific transpeptidase.

In some instances, the oligonucleotide conjugate is conjugated to the binding moiety by a method as described in U.S. Patent Publication Nos. 2015/0105539 and 2015/0105540.

Production of Antibodies or Binding Fragments Thereof

In some embodiments, polypeptides described herein (e.g., antibodies and its binding fragments) are produced using any method known in the art to be useful for the synthesis of polypeptides (e.g., antibodies), in particular, by chemical synthesis or by recombinant expression, and are preferably produced by recombinant expression techniques.

In some instances, an antibody or its binding fragment thereof is expressed recombinantly, and the nucleic acid encoding the antibody or its binding fragment is assembled from chemically synthesized oligonucleotides (e.g., as described in Kutmeier et al., 1994, *BioTechniques* 17:242), which involves the synthesis of overlapping oligonucleotides containing portions of the sequence encoding the antibody, annealing and ligation of those oligonucleotides, and then amplification of the ligated oligonucleotides by PCR.

Alternatively, a nucleic acid molecule encoding an antibody is optionally generated from a suitable source (e.g., an antibody cDNA library, or cDNA library generated from any tissue or cells expressing the immunoglobulin) by PCR amplification using synthetic primers hybridizable to the 3' and 5' ends of the sequence or by cloning using an oligonucleotide probe specific for the particular gene sequence.

In some instances, an antibody or its binding is optionally generated by immunizing an animal, such as a rabbit, to generate polyclonal antibodies or, more preferably, by generating monoclonal antibodies, e.g., as described by Kohler and Milstein (1975, *Nature* 256:495-497) or, as described by Kozbor et al. (1983, *Immunology Today* 4:72) or Cole et al. (1985 in *Monoclonal Antibodies and Cancer Therapy*, Alan R. Liss, Inc., pp. 77-96). Alternatively, a clone encoding at least the Fab portion of the antibody is optionally obtained by screening Fab expression libraries (e.g., as described in Huse et al., 1989, *Science* 246:1275-1281) for clones of Fab fragments that bind the specific antigen or by screening antibody libraries (See, e.g., Clackson et al., 1991, *Nature* 352:624; Hane et al., 1997 *Proc. Natl. Acad. Sci. USA* 94:4937).

In some embodiments, techniques developed for the production of "chimeric antibodies" (Morrison et al., 1984, *Proc. Natl. Acad. Sci.* 81:851-855; Neuberger et al., 1984, *Nature* 312:604-608; Takeda et al., 1985, *Nature* 314:452-454) by splicing genes from a mouse antibody molecule of appropriate antigen specificity together with genes from a human antibody molecule of appropriate biological activity are used. A chimeric antibody is a molecule in which different portions are derived from different animal species, such as those having a variable region derived from a murine monoclonal antibody and a human immunoglobulin constant region, e.g., humanized antibodies.

In some embodiments, techniques described for the production of single chain antibodies (U.S. Pat. No. 4,694,778; Bird, 1988, *Science* 242:423-42; Huston et al., 1988, *Proc. Natl. Acad. Sci. USA* 85:5879-5883; and Ward et al., 1989, *Nature* 334:544-54) are adapted to produce single chain antibodies. Single chain antibodies are formed by linking the heavy and light chain fragments of the Fv region via an amino acid bridge, resulting in a single chain polypeptide. Techniques for the assembly of functional Fv fragments in *E. coli* are also optionally used (Skerra et al., 1988, *Science* 242:1038-1041).

In some embodiments, an expression vector comprising the nucleotide sequence of an antibody or the nucleotide sequence of an antibody is transferred to a host cell by conventional techniques (e.g., electroporation, liposomal transfection, and calcium phosphate precipitation), and the transfected cells are then cultured by conventional techniques to produce the antibody. In specific embodiments, the expression of the antibody is regulated by a constitutive, an inducible or a tissue, specific promoter.

In some embodiments, a variety of host-expression vector systems is utilized to express an antibody or its binding fragment described herein. Such host-expression systems represent vehicles by which the coding sequences of the antibody is produced and subsequently purified, but also represent cells that are, when transformed or transfected with the appropriate nucleotide coding sequences, express an antibody or its binding fragment in situ. These include, but are not limited to, microorganisms such as bacteria (e.g., *E. coli* and *B. subtilis*) transformed with recombinant bacteriophage DNA, plasmid DNA or cosmid DNA expression vectors containing an antibody or its binding fragment coding sequences; yeast (e.g., *Saccharomyces Pichia*) transformed with recombinant yeast expression vectors containing an antibody or its binding fragment coding sequences; insect cell systems infected with recombinant virus expression vectors (e.g., baculovirus) containing an antibody or its binding fragment coding sequences; plant cell systems infected with recombinant virus expression vectors (e.g., cauliflower mosaic virus (CaMV) and tobacco mosaic virus (TMV)) or transformed with recombinant plasmid expression vectors (e.g., Ti plasmid) containing an antibody or its binding fragment coding sequences; or mammalian cell systems (e.g., COS, CHO, BH, 293, 293T, 3T3 cells) harboring recombinant expression constructs containing promoters derived from the genome of mammalian cells (e.g., metallothionein promoter) or from mammalian viruses (e.g. the adenovirus late promoter; the vaccinia virus 7.5K promoter).

For long-term, high-yield production of recombinant proteins, stable expression is preferred. In some instances, cell lines that stably express an antibody are optionally engineered. Rather than using expression vectors that contain viral origins of replication, host cells are transformed with DNA controlled by appropriate expression control elements (e.g., promoter, enhancer, sequences, transcription terminators, polyadenylation sites, etc.), and a selectable marker. Following the introduction of the foreign DNA, engineered cells are then allowed to grow for 1-2 days in an enriched media, and then are switched to a selective media. The selectable marker in the recombinant plasmid confers resistance to the selection and allows cells to stably integrate the plasmid into their chromosomes and grow to form foci that in turn are cloned and expanded into cell lines. This method can advantageously be used to engineer cell lines which express the antibody or its binding fragments.

In some instances, a number of selection systems are used, including but not limited to the herpes simplex virus thymidine kinase (Wigler et al., 1977, *Cell* 11:223), hypoxanthine-guanine phosphoribosyltransferase (Szybalska & Szybalski, 192, *Proc. Natl. Acad. Sci. USA* 48:202), and adenine phosphoribosyltransferase (Lowy et al., 1980, *Cell* 22:817) genes are employed in tk-, hgprt- or aprt-cells, respectively. Also, antimetabolite resistance are used as the basis of selection for the following genes: dhfr, which confers resistance to methotrexate (Wigler et al., 1980, *Proc. Natl. Acad. Sci. USA* 77:357; O'Hare et al., 1981, *Proc. Natl. Acad. Sci. USA* 78:1527); gpt, which confers resistance to mycophenolic acid (Mulligan & Berg, 1981, *Proc. Natl. Acad. Sci. USA* 78:2072); neo, which confers resistance to the aminoglycoside G-418 (*Clinical Pharmacy* 12:488-505; Wu and Wu, 1991, *Biotherapy* 3:87-95; Tolstoshev, 1993, *Ann. Rev. Pharmacol. Toxicol.* 32:573-596; Mulligan, 1993, *Science* 260:926-932; and Morgan and Anderson, 1993, *Ann. Rev. Biochem.* 62:191-217; May, 1993, *TIB TECH* 11(5):155-215) and hygro, which confers resistance to hygromycin (Santerre et al., 1984, *Gene* 30:147). Methods commonly known in the art of recombinant DNA technology which can be used are described in Ausubel et al. (eds., 1993, *Current Protocols in Molecular Biology*, John Wiley & Sons, NY; Kriegler, 1990, *Gene Transfer and Expression, A Laboratory Manual*, Stockton Press, NY; and in Chapters 12 and 13, Dracopoli et al. (eds), 1994, *Current Protocols in Human Genetics*, John Wiley & Sons, NY.; Colberre-Garapin et al., 1981, *J. Mol. Biol.* 150:1).

In some instances, the expression levels of an antibody are increased by vector amplification (for a review, see Bebbington and Hentschel, *The use of vectors based on gene amplification for the expression of cloned genes in mammalian cells in DNA cloning*, Vol. 3. (Academic Press, New York, 1987)). When a marker in the vector system expressing an antibody is amplifiable, an increase in the level of inhibitor present in culture of host cell will increase the number of copies of the marker gene. Since the amplified region is associated with the nucleotide sequence of the antibody, production of the antibody will also increase (Crouse et al., 1983, *Mol. Cell Biol.* 3:257).

In some instances, any method known in the art for purification or analysis of an antibody or antibody conjugates is used, for example, by chromatography (e.g., ion exchange, affinity, particularly by affinity for the specific antigen after Protein A, and sizing column chromatography), centrifugation, differential solubility, or by any other standard technique for the purification of proteins. Exemplary chromatography methods included, but are not limited to, strong anion exchange chromatography, hydrophobic interaction chromatography, size exclusion chromatography, and fast protein liquid chromatography.

Methods of Use

In some embodiments, an oligonucleotide conjugate or a pharmaceutical composition described herein is used for the treatment of a disease or disorder characterized with a defective protein function. In some embodiments, an oligonucleotide conjugate or a pharmaceutical composition described herein is used for the treatment of disease or disorder by inducing multiple exon skipping. In some cases, the method comprises administering to the subject a pharmaceutical composition comprising an oligonucleotide conjugate comprising a first hybridization region linked to a second hybridization region by a polymer, wherein the first hybridization region hybridizes to a first target sequence of a pre-mRNA and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein, thereby treating the disease or condition in the subject.

Improperly spliced or partially spliced mRNA in some instances causes a neuromuscular disease, a genetic disease, cancer, a hereditary disease, or a cardiovascular disease. Exemplary neuromuscular diseases include muscular dystrophy such as Duchenne muscular dystrophy, Becker muscular dystrophy, facioscapulohumeral muscular dystrophy, congenital muscular dystrophy, or myotonic dystrophy. In some instances, muscular dystrophy is genetic. In some instances, muscular dystrophy is caused by a spontaneous mutation. Becker muscular dystrophy and Duchenne muscular dystrophy have been shown to involve mutations in the DMD gene, which encodes the protein dystrophin. Facioscapulohumeral muscular dystrophy has been shown to involve mutations in double homeobox, 4 (DUX4) gene.

In some instances, improperly spliced or partially spliced mRNA causes Duchenne muscular dystrophy. Duchenne muscular dystrophy results in severe muscle weakness and is caused by mutations in the DMD gene that abolishes the production of functional dystrophin. In some instances, Duchenne muscular dystrophy is a result of a mutation in an exon in the DMD gene. In some instances, Duchenne muscular dystrophy is a result of a mutation in at least one of exon 1, 2, 3, 4, 5, 6, 7, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78 and 79 in the DMD gene.

In some instances, an oligonucleotide conjugate or a pharmaceutical composition described herein is used for the treatment of muscular dystrophy. In some instances, an oligonucleotide conjugate or a pharmaceutical composition described herein is used for the treatment of Duchenne muscular dystrophy, Becker muscular dystrophy, facioscapulohumeral muscular dystrophy, congenital muscular dystrophy, or myotonic dystrophy. In some instances, an oligonucleotide conjugate or a pharmaceutical composition described herein is used for the treatment of Duchenne muscular dystrophy.

In some embodiments, an oligonucleotide conjugate or a pharmaceutical composition described herein is used for the treatment of Duchenne muscular dystrophy in a subject in need thereof, which comprises administering to the subject a pharmaceutical composition comprising an oligonucleotide conjugate comprising a first hybridization region linked to a second hybridization region by a polymer, wherein the first hybridization region hybridizes to a first target sequence of a pre-mRNA and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein, thereby treating Duchenne muscular dystrophy in the subject. In some instances, the exon-containing lariat comprises at least 3, 4, 5, 6, 7, 8, 9, 10, 11, 12, 13, 14, 15, or more exons of DMD. In some instances, the exon-containing lariat comprises exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61 of DMD. In some cases, the first hybridization region hybridizes to a region within exon 39, 40, 41, 42, 43, 44, 45, 46, 47, 48, 49, 50, or 51 of DMD. In some cases, the first hybridization region hybridizes to a region within exon 40, 41, 42, 43, 44, 45, 46, 47, 48, or 49 of DMD. In some cases, the second hybridization region hybridizes to a region within exon 51, 52, 53, 54, 55, 56, 57, 58, 59, 60, 61, 62, or 63 of DMD. In some cases, the second hybridization region hybridizes to a region within exon 54, 55, 56, 57, 58, 59, 60, 61, 62, or 63 of DMD. In some cases, the processed mRNA of DMD does not comprise exons 40-62, exons 40-61, exons 40-60, exons 42-60, exons 41-61, exons 41-60, exons 42-60, exons 42-59, exons 42-55, exons 44-61, exons 44-60, exons 47-61, exons 44-58, exons 44-56, exons 44-54, exons 45-60, exons 45-59, exons 45-57, exons 45-55, exons 48-61, exons 48-60, or exons 49-61.

In some embodiments, also described herein is a method of inducing multiple exon skipping from a pre-mRNA, which comprises contacting the pre-mRNA in a cell with an oligonucleotide conjugate comprising a first hybridization region linked to a second hybridization region by a polymer, wherein the first hybridization region hybridizes to a first target sequence of the pre-mRNA and the second hybridization region hybridizes to a second target sequence of the pre-mRNA, wherein the oligonucleotide conjugate induces splicing out of an exon-containing lariat from the pre-mRNA to generate a processed mRNA, wherein the exon-containing lariat comprises at least a first exon and a second exon, and wherein the processed mRNA encodes a truncated and functional protein.

Pharmaceutical Formulation

In some embodiments, the pharmaceutical formulations described herein are administered to a subject by multiple administration routes, including but not limited to, parenteral (e.g., intravenous, subcutaneous, intramuscular), oral, intranasal, buccal, rectal, or transdermal administration routes. In some instances, the pharmaceutical composition describe herein is formulated for parenteral (e.g., intravenous, subcutaneous, intramuscular, intra-arterial, intraperitoneal, intrathecal, intracerebral, intracerebroventricular, or intracranial) administration. In other instances, the pharmaceutical composition describe herein is formulated for oral administration. In still other instances, the pharmaceutical composition describe herein is formulated for intranasal administration.

In some embodiments, the pharmaceutical formulations include, but are not limited to, aqueous liquid dispersions, self-emulsifying dispersions, solid solutions, liposomal dispersions, aerosols, solid dosage forms, powders, immediate release formulations, controlled release formulations, fast melt formulations, tablets, capsules, pills, delayed release formulations, extended release formulations, pulsatile release formulations, multiparticulate formulations (e.g., nanoparticle formulations), and mixed immediate and controlled release formulations.

In some instances, the pharmaceutical formulation includes multiparticulate formulations. In some instances, the pharmaceutical formulation includes nanoparticle formulations. In some instances, nanoparticles comprise cMAP, cyclodextrin, or lipids. In some cases, nanoparticles comprise solid lipid nanoparticles, polymeric nanoparticles, self-emulsifying nanoparticles, liposomes, microemulsions, or micellar solutions. Additional exemplary nanoparticles include, but are not limited to, paramagnetic nanoparticles, superparamagnetic nanoparticles, metal nanoparticles, fullerene-like materials, inorganic nanotubes, dendrimers (such as with covalently attached metal chelates), nanofibers, nanohorns, nano-onions, nanorods, nanoropes and quantum dots. In some instances, a nanoparticle is a metal nanoparticle, e.g., a nanoparticle of scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, indium, platinum, gold, gadolinium, aluminum, gallium, indium, tin, thallium, lead, bismuth, magnesium, calcium, strontium, barium, lithium, sodium, potassium, boron, silicon, phosphorus, germanium, arsenic, antimony, and combinations, alloys or oxides thereof.

In some instances, a nanoparticle includes a core or a core and a shell, as in a core-shell nanoparticle.

In some instances, a nanoparticle is further coated with molecules for attachment of functional elements (e.g., with one or more oligonucleotide conjugates or binding moieties described herein). In some instances, a coating comprises chondroitin sulfate, dextran sulfate, carboxymethyl dextran, alginic acid, pectin, carragheenan, fucoidan, agaropectin, porphyran, karaya gum, gellan gum, xanthan gum, hyaluronic acids, glucosamine, galactosamine, chitin (or chitosan), polyglutamic acid, polyaspartic acid, lysozyme, cytochrome C, ribonuclease, trypsinogen, chymotrypsinogen, α-chymotrypsin, polylysine, polyarginine, histone, protamine, ovalbumin or dextrin or cyclodextrin. In some instances, a nanoparticle comprises a graphene-coated nanoparticle.

In some cases, a nanoparticle has at least one dimension (e.g., diameter, etc.) of less than about 500 nm, 400 nm, 300 nm, 200 nm, or 100 nm.

In some instances, the nanoparticle formulation comprises paramagnetic nanoparticles, superparamagnetic nanoparticles, metal nanoparticles, fullerene-like materials, inorganic nanotubes, dendrimers (such as with covalently attached metal chelates), nanofibers, nanohorns, nano-onions, nanorods, nanoropes or quantum dots. In some instances, a polynucleic acid molecule or a binding moiety described herein is conjugated either directly or indirectly to the nanoparticle. In some instances, at least 1, 5, 10, 15, 20, 30, 40, 50, 60, 70, 80, 90, 100 or more polynucleic acid molecules or binding moieties described herein are conjugated either directly or indirectly to a nanoparticle.

In some embodiments, the pharmaceutical formulations include a carrier or carrier materials selected on the basis of compatibility with the composition disclosed herein, and the release profile properties of the desired dosage form. Exemplary carrier materials include, e.g., binders, suspending agents, disintegration agents, filling agents, surfactants, solubilizers, stabilizers, lubricants, wetting agents, diluents, and the like. Pharmaceutically compatible carrier materials include, but are not limited to, acacia, gelatin, colloidal silicon dioxide, calcium glycerophosphate, calcium lactate, maltodextrin, glycerine, magnesium silicate, polyvinylpyrrolidone (PVP), cholesterol, cholesterol esters, sodium caseinate, soy lecithin, taurocholic acid, phosphatidylcholine, sodium chloride, tricalcium phosphate, dipotassium phosphate, cellulose and cellulose conjugates, sugars sodium stearoyl lactylate, carrageenan, monoglyceride, diglyceride, pregelatinized starch, and the like. See, e.g., Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999).

In some instances, the pharmaceutical formulations further include pH adjusting agents or buffering agents which include acids such as acetic, boric, citric, lactic, phosphoric and hydrochloric acids; bases such as sodium hydroxide, sodium phosphate, sodium borate, sodium citrate, sodium acetate, sodium lactate and tris-hydroxymethylaminomethane; and buffers such as citrate/dextrose, sodium bicarbonate and ammonium chloride. Such acids, bases and buffers are included in an amount required to maintain pH of the composition in an acceptable range.

In some instances, the pharmaceutical formulation includes one or more salts in an amount required to bring osmolality of the composition into an acceptable range. Such salts include those having sodium, potassium or ammonium cations and chloride, citrate, ascorbate, borate, phosphate, bicarbonate, sulfate, thiosulfate or bisulfite anions; suitable salts include sodium chloride, potassium chloride, sodium thiosulfate, sodium bisulfite and ammonium sulfate.

In some instances, the pharmaceutical formulations further include diluent which are used to stabilize compounds because they provide a more stable environment. Salts dissolved in buffered solutions (which also provide pH control or maintenance) are utilized as diluents in the art, including, but not limited to a phosphate buffered saline solution. In certain instances, diluents increase bulk of the composition to facilitate compression or create sufficient bulk for homogenous blend for capsule filling. Such compounds include e.g., lactose, starch, mannitol, sorbitol, dextrose, microcrystalline cellulose such as Avicel®; dibasic calcium phosphate, dicalcium phosphate dihydrate; tricalcium phosphate, calcium phosphate; anhydrous lactose, spray-dried lactose; pregelatinized starch, compressible sugar, such as Di-Pac® (Amstar); mannitol, hydroxypropylmethylcellulose, hydroxypropylmethylcellulose acetate stearate, sucrose-based diluents, confectioner's sugar; monobasic calcium sulfate monohydrate, calcium sulfate dihydrate; calcium lactate trihydrate, dextrates; hydrolyzed cereal solids, amylose; powdered cellulose, calcium carbonate; glycine, kaolin; mannitol, sodium chloride; inositol, bentonite, and the like.

In some cases, the pharmaceutical formulations include disintegration agents or disintegrants to facilitate the breakup or disintegration of a substance. The term "disintegrate" include both the dissolution and dispersion of the dosage form when contacted with gastrointestinal fluid. Examples of disintegration agents include a starch, e.g., a natural starch such as corn starch or potato starch, a pregelatinized starch such as National 1551 or Amijel®, or sodium starch glycolate such as Promogel® or Explotab®, a cellulose such as a wood product, methylcrystalline cellulose, e.g., Avicel®, Avicel® PH101, Avicel® PH102, Avicel® PH105, Elcema® P100, Emcocel®, Vivacel®, Ming Tia®, and Solka-Floc®, methylcellulose, croscarmellose, or a cross-linked cellulose, such as cross-linked sodium carboxymethylcellulose (Ac-Di-Sol®), cross-linked carboxymethylcellulose, or cross-linked croscarmellose, a cross-linked starch such as sodium starch glycolate, a cross-linked polymer such as crospovidone, a cross-linked polyvinylpyrrolidone, alginate such as alginic acid or a salt of alginic acid such as sodium alginate, a clay such as Veegum® HV (magnesium aluminum silicate), a gum such as agar, guar, locust bean, Karaya, pectin, or tragacanth, sodium starch glycolate, bentonite, a natural sponge, a surfactant, a resin such as a cation-exchange resin, citrus pulp, sodium lauryl sulfate, sodium lauryl sulfate in combination starch, and the like.

In some instances, the pharmaceutical formulations include filling agents such as lactose, calcium carbonate, calcium phosphate, dibasic calcium phosphate, calcium sulfate, microcrystalline cellulose, cellulose powder, dextrose, dextrates, dextran, starches, pregelatinized starch, sucrose, xylitol, lactitol, mannitol, sorbitol, sodium chloride, polyethylene glycol, and the like.

Lubricants and glidants are also optionally included in the pharmaceutical formulations described herein for preventing, reducing or inhibiting adhesion or friction of materials. Exemplary lubricants include, e.g., stearic acid, calcium hydroxide, talc, sodium stearyl fumarate, a hydrocarbon such as mineral oil, or hydrogenated vegetable oil such as hydrogenated soybean oil (Sterotex®), higher fatty acids and their alkali-metal and alkaline earth metal salts, such as aluminum, calcium, magnesium, zinc, stearic acid, sodium stearates, glycerol, talc, waxes, Stearowet®, boric acid, sodium benzoate, sodium acetate, sodium chloride, leucine, a polyethylene glycol (e.g., PEG-4000) or a methoxypolyethylene glycol such as Carbowax™, sodium oleate, sodium benzoate, glyceryl behenate, polyethylene glycol, magnesium or sodium lauryl sulfate, colloidal silica such as Syloid™, Cab-O-Sil®, a starch such as corn starch, silicone oil, a surfactant, and the like.

Plasticizers include compounds used to soften the microencapsulation material or film coatings to make them less brittle. Suitable plasticizers include, e.g., polyethylene glycols such as PEG 300, PEG 400, PEG 600, PEG 1450, PEG 3350, and PEG 800, stearic acid, propylene glycol, oleic acid, triethyl cellulose and triacetin. Plasticizers also function as dispersing agents or wetting agents.

Solubilizers include compounds such as triacetin, triethylcitrate, ethyl oleate, ethyl caprylate, sodium lauryl sulfate, sodium doccusate, vitamin E TPGS, dimethylacetamide, N-methylpyrrolidone, N-hydroxyethylpyrrolidone, polyvinylpyrrolidone, hydroxypropylmethyl cellulose, hydroxypropyl cyclodextrins, ethanol, n-butanol, isopropyl alcohol, cholesterol, bile salts, polyethylene glycol 200-600, glycofurol, transcutol, propylene glycol, and dimethyl isosorbide and the like.

Stabilizers include compounds such as any antioxidation agents, buffers, acids, preservatives and the like.

Suspending agents include compounds such as polyvinylpyrrolidone, e.g., polyvinylpyrrolidone K12, polyvinylpyrrolidone K17, polyvinylpyrrolidone K25, or polyvinylpyrrolidone K30, vinyl pyrrolidone/vinyl acetate copolymer (S630), polyethylene glycol, e.g., the polyethylene glycol has a molecular weight of about 300 to about 6000, or about 3350 to about 4000, or about 7000 to about 5400, sodium carboxymethylcellulose, methylcellulose, hydroxypropylmethylcellulose, hydroxymethylcellulose acetate stearate, polysorbate-80, hydroxyethylcellulose, sodium alginate, gums, such as, e.g., gum tragacanth and gum acacia, guar gum, xanthans, including xanthan gum, sugars, cellulosics, such as, e.g., sodium carboxymethylcellulose, methylcellulose, sodium carboxymethylcellulose, hydroxypropylmethylcellulose, hydroxyethylcellulose, polysorbate-80, sodium alginate, polyethoxylated sorbitan monolaurate, polyethoxylated sorbitan monolaurate, povidone and the like.

Surfactants include compounds such as sodium lauryl sulfate, sodium docusate, Tween 60 or 80, triacetin, vitamin E TPGS, sorbitan monooleate, polyoxyethylene sorbitan monooleate, polysorbates, poloxamers, bile salts, glyceryl monostearate, copolymers of ethylene oxide and propylene oxide, e.g., Pluronic® (BASF), and the like. Additional surfactants include polyoxyethylene fatty acid glycerides and vegetable oils, e.g., polyoxyethylene (60) hydrogenated castor oil; and polyoxyethylene alkylethers and alkylphenyl ethers, e.g., octoxynol 10, octoxynol 40. Sometimes, surfactants is included to enhance physical stability or for other purposes.

Viscosity enhancing agents include, e.g., methyl cellulose, xanthan gum, carboxymethyl cellulose, hydroxypropyl cellulose, hydroxypropylmethyl cellulose, hydroxypropylmethyl cellulose acetate stearate, hydroxypropylmethyl cellulose phthalate, carbomer, polyvinyl alcohol, alginates, acacia, chitosans and combinations thereof.

Wetting agents include compounds such as oleic acid, glyceryl monostearate, sorbitan monooleate, sorbitan monolaurate, triethanolamine oleate, polyoxyethylene sorbitan monooleate, polyoxyethylene sorbitan monolaurate, sodium docusate, sodium oleate, sodium lauryl sulfate, sodium doccusate, triacetin, Tween 80, vitamin E TPGS, ammonium salts and the like.

Therapeutic Regimens

In some embodiments, the pharmaceutical compositions described herein are administered for therapeutic applications. In some embodiments, the pharmaceutical composition is administered once per day, twice per day, three times per day or more. The pharmaceutical composition is administered daily, every day, every alternate day, five days a week, once a week, every other week, two weeks per month, three weeks per month, once a month, twice a month, three times per month, or more. The pharmaceutical composition is administered for at least 1 month, 2 months, 3 months, 4 months, 5 months, 6 months, 7 months, 8 months, 9 months, 10 months, 11 months, 12 months, 18 months, 2 years, 3 years, or more.

In some embodiments, one or more pharmaceutical compositions are administered simultaneously, sequentially, or at an interval period of time. In some embodiments, one or more pharmaceutical compositions are administered simultaneously. In some cases, one or more pharmaceutical compositions are administered sequentially. In additional cases, one or more pharmaceutical compositions are administered at an interval period of time (e.g., the first administration of a first pharmaceutical composition is on day one followed by an interval of at least 1, 2, 3, 4, 5, or more days prior to the administration of at least a second pharmaceutical composition).

In some embodiments, two or more different pharmaceutical compositions are coadministered. In some instances, the two or more different pharmaceutical compositions are coadministered simultaneously. In some cases, the two or more different pharmaceutical compositions are coadministered sequentially without a gap of time between administrations. In other cases, the two or more different pharmaceutical compositions are coadministered sequentially with a gap of about 0.5 hour, 1 hour, 2 hour, 3 hour, 12 hours, 1 day, 2 days, or more between administrations.

In the case wherein the patient's status does improve, upon the doctor's discretion the administration of the composition is given continuously; alternatively, the dose of the composition being administered is temporarily reduced or temporarily suspended for a certain length of time (i.e., a "drug holiday"). In some instances, the length of the drug holiday varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday is from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Once improvement of the patient's conditions has occurred, a maintenance dose is administered if necessary. Subsequently, the dosage or the frequency of administration, or both, can be reduced, as a function of the symptoms, to a level at which the improved disease, disorder or condition is retained.

In some embodiments, the amount of a given agent that correspond to such an amount varies depending upon factors such as the particular compound, the severity of the disease, the identity (e.g., weight) of the subject or host in need of treatment, but nevertheless is routinely determined in a manner known in the art according to the particular circumstances surrounding the case, including, e.g., the specific agent being administered, the route of administration, and the subject or host being treated. In some instances, the desired dose is conveniently presented in a single dose or as divided doses administered simultaneously (or over a short period of time) or at appropriate intervals, for example as two, three, four or more sub-doses per day.

The foregoing ranges are merely suggestive, as the number of variables in regard to an individual treatment regime is large, and considerable excursions from these recommended values are not uncommon. Such dosages is altered depending on a number of variables, not limited to the activity of the compound used, the disease or condition to be treated, the mode of administration, the requirements of the individual subject, the severity of the disease or condition being treated, and the judgment of the practitioner.

In some embodiments, toxicity and therapeutic efficacy of such therapeutic regimens are determined by standard pharmaceutical procedures in cell cultures or experimental animals, including, but not limited to, the determination of the LD50 (the dose lethal to 50% of the population) and the ED50 (the dose therapeutically effective in 50% of the population). The dose ratio between the toxic and therapeutic effects is the therapeutic index and it is expressed as the ratio between LD50 and ED50. Compounds exhibiting high therapeutic indices are preferred. The data obtained from cell culture assays and animal studies are used in formulating a range of dosage for use in human. The dosage of such compounds lies preferably within a range of circulating concentrations that include the ED50 with minimal toxicity.

The dosage varies within this range depending upon the dosage form employed and the route of administration utilized.

Kits/Article of Manufacture

Disclosed herein, in certain embodiments, are kits and articles of manufacture for use with one or more of the compositions and methods described herein. Such kits include a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. In one embodiment, the containers are formed from a variety of materials such as glass or plastic.

The articles of manufacture provided herein contain packaging materials. Examples of pharmaceutical packaging materials include, but are not limited to, blister packs, bottles, tubes, bags, containers, bottles, and any packaging material suitable for a selected formulation and intended mode of administration and treatment.

For example, the container(s) include oligonucleotide conjugates and/or binding moieties described herein. Such kits optionally include an identifying description or label or instructions relating to its use in the methods described herein.

A kit typically includes labels listing contents and/or instructions for use, and package inserts with instructions for use. A set of instructions will also typically be included.

In one embodiment, a label is on or associated with the container. In one embodiment, a label is on a container when letters, numbers or other characters forming the label are attached, molded or etched into the container itself; a label is associated with a container when it is present within a receptacle or carrier that also holds the container, e.g., as a package insert. In one embodiment, a label is used to indicate that the contents are to be used for a specific therapeutic application. The label also indicates directions for use of the contents, such as in the methods described herein.

In certain embodiments, the pharmaceutical compositions are presented in a pack or dispenser device which contains one or more unit dosage forms containing a compound provided herein. The pack, for example, contains metal or plastic foil, such as a blister pack. In one embodiment, the pack or dispenser device is accompanied by instructions for administration. In one embodiment, the pack or dispenser is also accompanied with a notice associated with the container in form prescribed by a governmental agency regulating the manufacture, use, or sale of pharmaceuticals, which notice is reflective of approval by the agency of the form of the drug for human or veterinary administration. Such notice, for example, is the labeling approved by the U.S. Food and Drug Administration for prescription drugs, or the approved product insert. In one embodiment, compositions containing a compound provided herein formulated in a compatible pharmaceutical carrier are also prepared, placed in an appropriate container, and labeled for treatment of an indicated condition.

Certain Terminologies

Unless defined otherwise, all technical and scientific terms used herein have the same meaning as is commonly understood by one of skill in the art to which the claimed subject matter belongs. It is to be understood that the detailed description are exemplary and explanatory only and are not restrictive of any subject matter claimed. In this application, the use of the singular includes the plural unless specifically stated otherwise. It must be noted that, as used in the specification, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

As used herein, ranges and amounts can be expressed as "about" a particular value or range. About also includes the exact amount. Hence "about 5 µL" means "about 5 µL" and also "5 µL." Generally, the term "about" includes an amount that would be expected to be within experimental error.

The section headings used herein are for organizational purposes only and are not to be construed as limiting the subject matter described.

EXAMPLES

These examples are provided for illustrative purposes only and not to limit the scope of the claims provided herein.

Example 1: Oligonucleotides (PMOs) and Linked PMOs Used to Induce Multiple Exon Skipping in Human DMD Pre-mRNA To enhance multiple exon skipping in the DMD pre-mRNA several PMO oligonucleotides shown to promote skipping of hDMD exons 44, 45, 54 and 55 were synthesized (Table 1). The sequences of hEx45, hEx54, and hEx55 oligos were published by Lee J, et al. PLoS ONE 13(5): e0197084. The hEx44 PMO was identified by Avidity. PMOs were produced by Genetools with a primary amine on the 3' or 5' end to enable conjugation of two PMOs. Using this strategy, eight linked PMOs were synthesized that varied in PMO content, 5'-3' orientation of PMOs relative to each other, and linker length (Table 1)

TABLE 1

Sequence and Structure of PMOs/linked PMOs

| Label | PMO/Linked PMO | PMO Sequence |
|---|---|---|
| A | hEx44 5'-PA | PA-5'-CCATTTCTCAACA GATCTGTCAAATCGC 3' (SEQ ID NO: 4) |
| B | hEx54 3'-PA | 5'-GAAGTTTCAGGGCCAA GTCATTTGCCAC-3'-PA (SEQ ID NO: 5) |
| C | hEx54 5'-PA | PA-5'-GAAGTTTCAGGGC CAAGTCATTTGCCAC-3' (SEQ ID NO: 5) |
| D | hEx45 5'-PA | PA-5' CAACAGTTTGCCG CTGCCCAATGCCATC 3' (SEQ ID NO: 6) |

TABLE 1 -continued

Sequence and Structure of PMOs/linked PMOs

| Label | PMO/Linked PMO | PMO Sequence |
|---|---|---|
| E | hEx55 3'-PA | 5' TTCCAAAGCAGCCTCT CGCTCACTCACC 3'-PA (SEQ ID NO: 7) |
| F | hEx55 5'-PA | PA-5' TTCCAAAGCAGCC TCTCGCTCACTCACC 3' (SEQ ID NO: 7) |
| A-P8-C | hEx44 5'-P4 azide-DBCO-P4-3' hEx54 | |
| A-P28-C | hEx44 5'-P4 azide-DBCO-P24-3' hEx54 | |
| A-P8-B | hEx44 5'-P4 azide-DBCO-P4-5' hEx54 | |
| A-P28-B | hEx44 5'-P4 azide-DBCO-P24-5' hEx54 | |
| D-P8-E | hEx45 5'-P4 azide-DBCO-P4-3' hEx55 | |
| D-P28-E | hEx45 5'-P4 azide-DBCO-P24-3' hEx55 | |
| D-P8-F | hEx45 5'-P4 azide-DBCO-P4-5' hEx55 | |
| D-P28-F | hEx45 5'-P4 azide-DBCO-P24-5' hEx55 | |

Synthesis of Linked PMOs

Each PMO was dissolved in DMSO at 7 mM then mixed with 10 equivalents of the appropriate linker (Azido-dPEG®4-NHS ester, DBCO-dPEG®4-TFP ester, or DBCO-dPEG®24-TFP ester from Quanta Biodesign Limited). The mixture was incubated at room temperature for 45 minutes then excess linker was removed by acetone precipitation. Each PMO was then dissolved in DMSO and equal molar amounts of the appropriate PMO pairs were mixed together and incubated at room temperature for one hour. The yields of the conjugation reactions were assessed by size exclusion chromatography (Table 2).

TABLE 2

Yields of PMO conjugation reactions

| PMO-Linker-PMO | ~yield by SEC (%) |
|---|---|
| hEx44 5'-P4 azide-DBCO-P4 3' hEx54 | 54 |
| hEx44 5'-P4 azide-DBCO-P24 3' hEx54 | 53 |
| hEx44 5'-P4 azide-DBCO-P4 5' hEx54 | 62 |
| hEx44 5'-P4 azide-DBCO-P24 5' hEx54 | 61 |
| hEx45 5'-P4 azide-DBCO-P4 3' hEx55 | 66 |
| hEx45 5'-P4 azide-DBCO-P24 3' hEx55 | 63 |
| hEx45 5'-P4 azide-DBCO-P4 5' hEx55 | 71 |
| hEx45 5'-P4 azide-DBCO-P24 5' hEx55 | 73 |

Purification of Linked PMOs

Unconjugated PMO was removed from linked PMO by strong anion exchange chromatography using SAX method 1. Formation of the linked PMO and removal of unconjugated PMO was confirmed by size exclusion chromatography method 1.

Strong Anion Exchange Chromatography (SAX) Method-1.
1. Column: TSKgel SuperQ-5PW, 10 µm, 7.5 mm×7.5 cm
2. Solvent A: 10 mM sodium hydroxide, 10% acetonitrile; Solvent B: 10 mM sodium hydroxide, 500 mM sodium chloride, 10% acetonitrile; Flow Rate: 1.0 ml/min
3. Gradient:

| | Time | % A | % B |
|---|---|---|---|
| A. | 0.0 | 92 | 8 |
| B. | | | |
| C. | 3.00 | 88 | 12 |
| D. | 73.0 | 66 | 34 |
| E. | 73.5 | 0 | 100 |
| F. | 80.0 | 0 | 100 |
| G. | 80.5 | 92 | 8 |
| H. | 86.0 | 92 | 8 |

Figure 2:
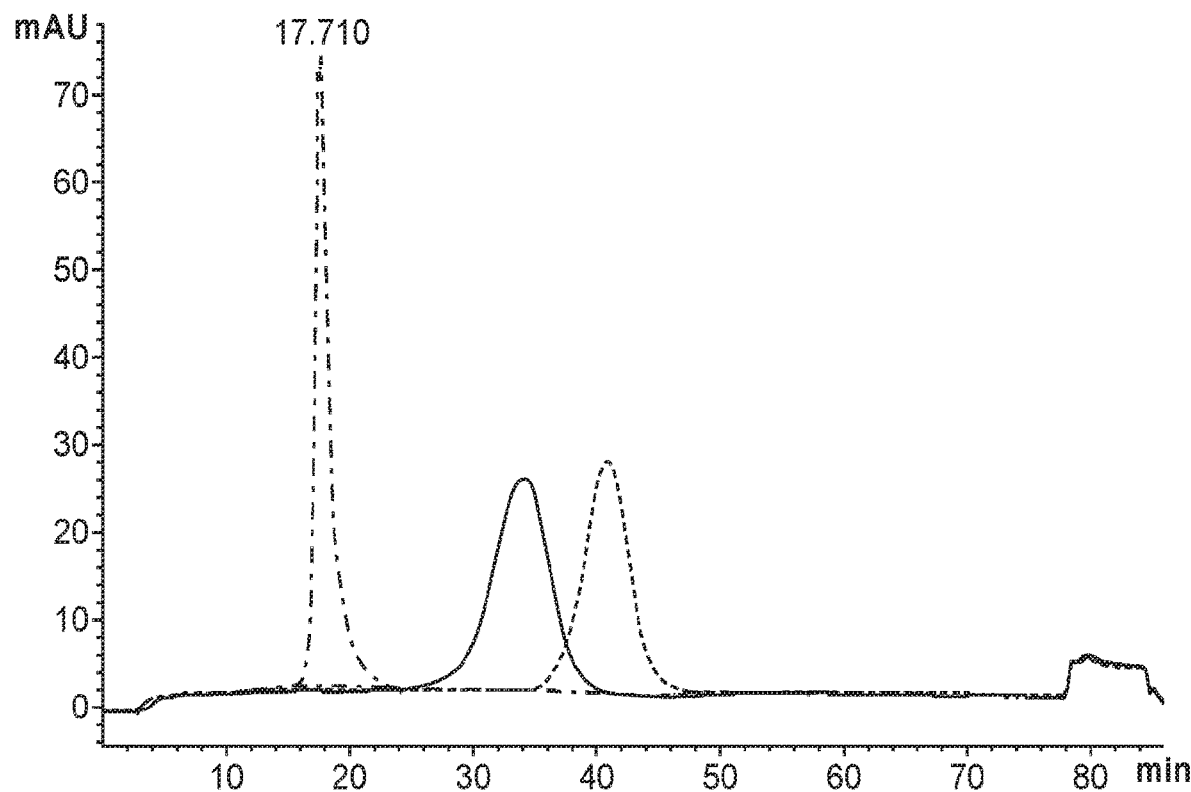
FIG. 2 illustrates a strong anion exchange chromatogram of hEx45 PMO (Blue), hEx55 PMO (Red) and linked hEx45-hEx55 PMO (Green).

Size exclusion chromatography (SEC) by method-1 is illustrated in FIG. 2. The column is Superdex 75 (10/300 GL GE). Solvent A is Phosphate buffered saline, 10% acetonitrile, pH 7.0; and the flow rate is 0.7 ml/min.

Figure 3:
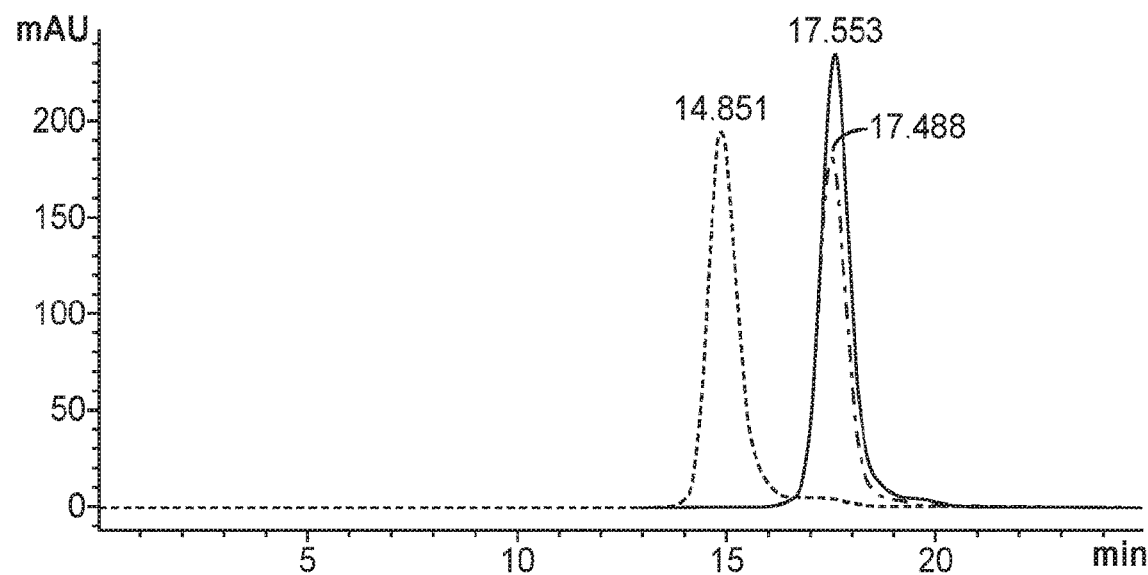
FIG. 3 illustrates a size exclusion chromatogram of hEx45 PMO (Blue), hEx55 PMO (Red) and linked hEx45-hEx55 PMO (Green).

FIG. 3 illustrates size exclusion chromatogram of hEx45 PMO (Blue), hEx55 PMO (Red) and linked hEx45-hEx55 PMO (Green).

Figure 4A:
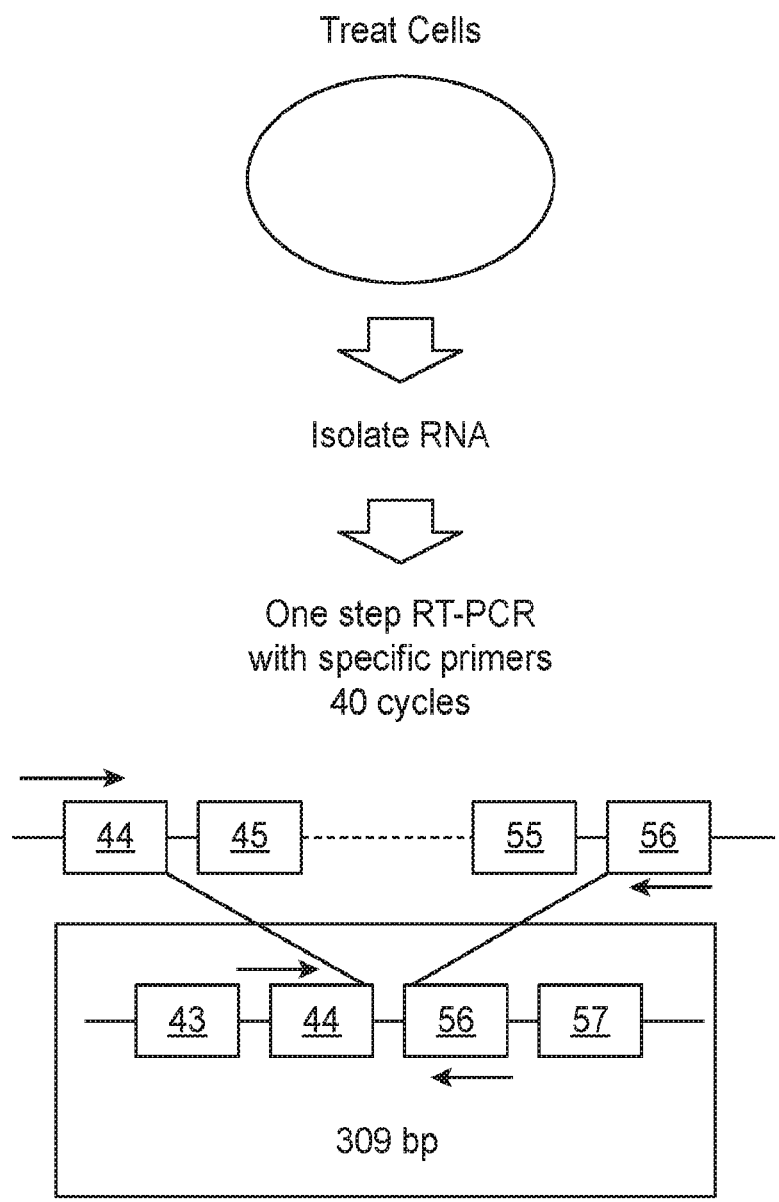
FIG. 4A-FIG. 4C show the presence of Δ45-55 hDMD in primary skeletal muscle cells in the absence and presence of exon-skipping oligonucleotides.

Example 2: The DMD Δ45-55 Splice Product is Present in Untreated and PMO Treated Human Skeletal Muscle Cells The presence of a Δ45-55 DMD splice product was monitored in primary human skeletal muscle cells in the absence and presence of exon skipping PMOs. The evaluation strategy is summarized in FIG. 4A.

Figure 4B:
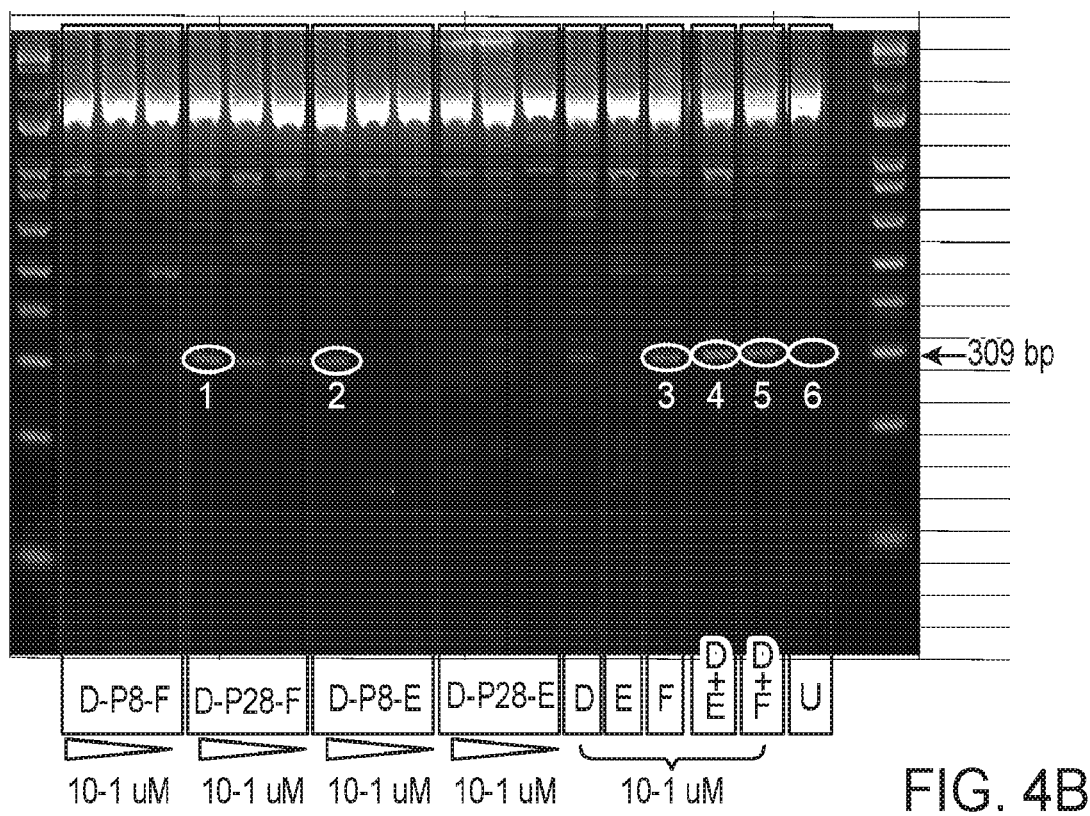
Figure 4C:
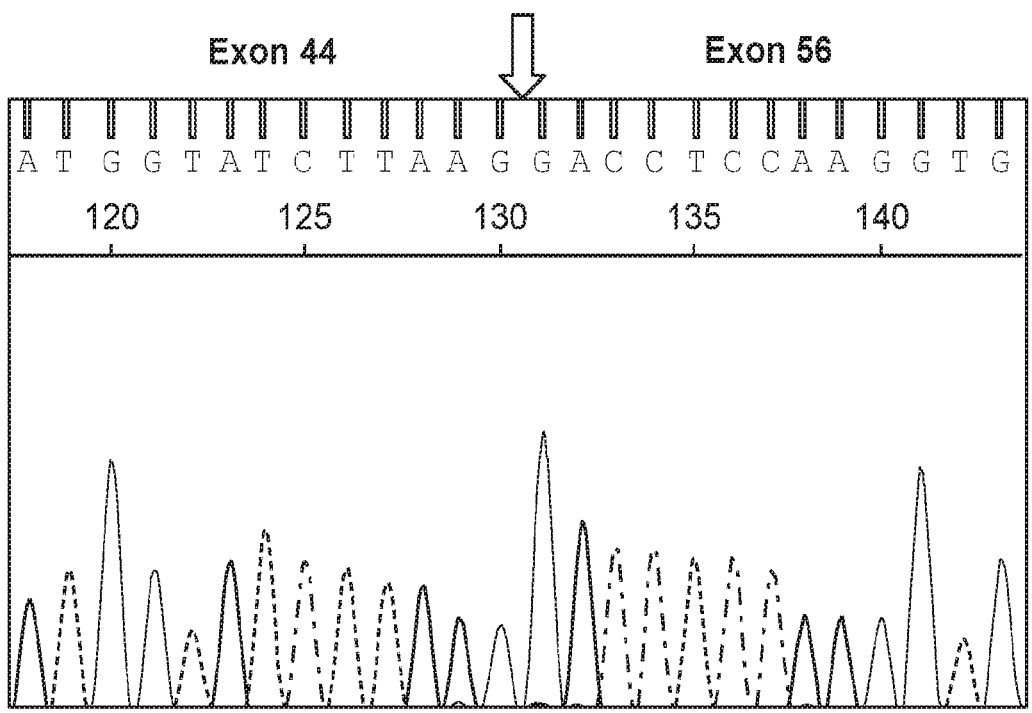

Primary human skeletal muscle cells (Thermo Fisher Scientific A11440) were plated on collagen Type 1 coated 24-well plates (Thermo Fisher A1142802) in 1 mL DMEM supplemented with 2% horse serum (ATCC 30-2040) and 1×ITS (Thermo Fisher Scientific 41400045) and incubated at 37° C. with 5% $CO_2$ for 2 days. These cells are pre-differentiated and form myotubes within 48 hours. The PMO oligonucleotides (1 mM, in water) were heated at 70° C. for 5 min and added to fresh medium at final concentrations of 10, 3 and 1 uM (the PMOs in this experiment were not purified; see table 2 for purity). To facilitate uptake of PMOs into cells, Endo-Porter (Genetools) was added to a final concentration of 2 uM. Treated cells were incubated for 48 hours. The medium was aspirated, cells were lysed in 300 uL Trizol (Ambion 15596018), and either processed immediately or frozen at −80° C. RNAs were prepared using a Direct-zol 96 RNA kit (Zymo Research) according to the manufacturer's specifications. RNA concentrations were measured spectroscopically. RNAs (20 ng) were reverse transcribed using the SuperScript III one-step RT-PCR system (Thermo Fisher 12574026), specific DMD primers (Forward primer: 5'-GACAAGGGCGATTTGACAG-3' (SEQ ID NO: 8), Reverse primer: 5'-TCCGAAGTT-CACTCCACTTG-3' (SEQ ID NO: 9)), and the following PCR conditions: 55° C., 30 min; 94° C., 2 min; followed by 40 cycles of 94° C., 15 sec; 55° C., 30 sec; 68° C., 1 min; final step 68° C., 5 min. PCR products were separated on 4% TAE agarose gels at 50V for 3 hrs. Selected bands corresponding to the expected Δ45-55 splice product (309 bp) were excised as indicated in FIG. 4B, purified using a GeneJET Gel Extraction and DNA cleanup Micro Kit (Thermo Fisher K0831) and sequenced. All sequenced fragments showed the expected exon 44-56 splice junction (FIG. 4C).

These experiments confirmed that DMD Δ45-55 splice product is present in untreated and PMO treated human skeletal muscle cells.

Example 3: Treatment with Selected Exon Skipping PMOs Enhances Skipping of Exons 45-55 in Primary Human Skeletal Muscle Cells To determine whether treatment of human skeletal muscle cells with exon skipping PMOs increases the abundance of the Δ45-55 DMD mRNA, we quantified the levels of the Δ45-55 amplification product in the RT-PCR reaction by qPCR.

In these experiments, the RT-PCR step in Example 2 was repeated with 30 instead of 40 cycles, the amplification products was diluted 1:100 with nuclease free water, and the abundance of the Δ45-55 amplification product quantified using a Taqman assay that specifically recognizes the exon 44/exon 56 splice junction (Forward Primer: 5'-GAGAAT-TGGGAACATGCTAAATACAA-3' (SEQ ID NO: 10), Reverse Primer: 5'-AACATCTGTGTGAGCTTCAAT-TTCA-3' (SEQ ID NO: 11), Probe: 5'-TGGTATCT-TAAGGACCTCCAA-3' (SEQ ID NO: 12)). The evaluation strategy is summarized in FIG. 5A.

Treatment of cells with the linked PMOs D-P8-E, D-P28-E and D-P8-F but not with D-P28-F drastically increased the abundance of Δ45-55 DMD mRNA (under the employed PCR conditions by >400.000-fold). The failure of the linked PMO D-P28-F to enhance Δ45-55 DMD mRNA levels indicates that the underlying alternative splicing process is sensitive to the orientation or linker length of the linked PMOs. Mixtures of unlinked PMOs (D+E, D+F) also increased Δ45-55 DMD mRNA levels (FIG. 5B). However, whereas D-P8-E and D-P28-E increased Δ45-55 DMD mRNA levels at both concentrations tested (3 uM, 10 uM), the mixture of D and E only showed improvement at 10 uM (FIG. 5B). Transfection of cells with individual PMOs also increased Δ45-55 DMD mRNA levels under some conditions (FIG. 5B), however the concentration dependence of these effects was inconsistent and require more extensive dose-response analyses for interpretation. These results demonstrate that linked PMOs can drastically increase the abundance of the DMD Δ45-55 splice product.

Figure 6A:
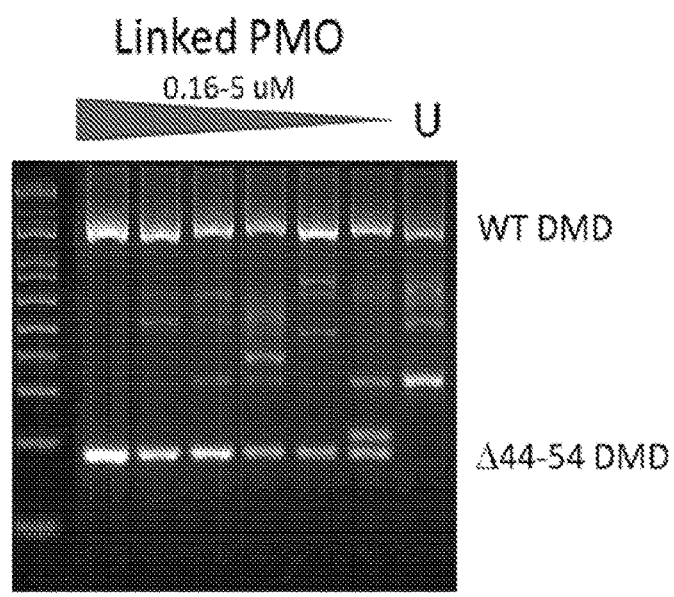
FIG. 6A-FIG. 6C illustrate a linked PMO which facilitates skipping of hDMD exons 44-54 in immortalized human skeletal muscle myotubes.
Figure 6B:
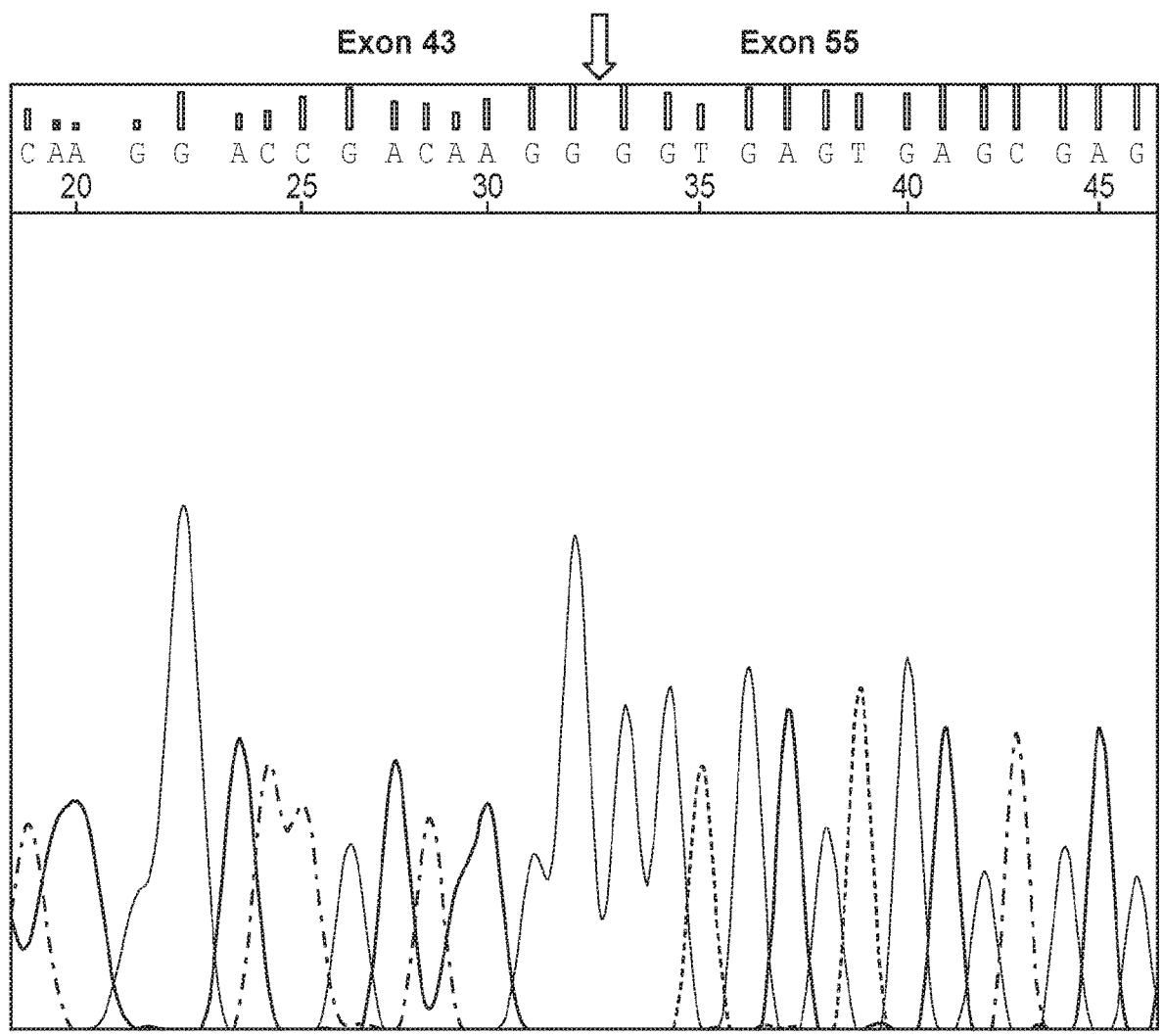
Figure 6C:
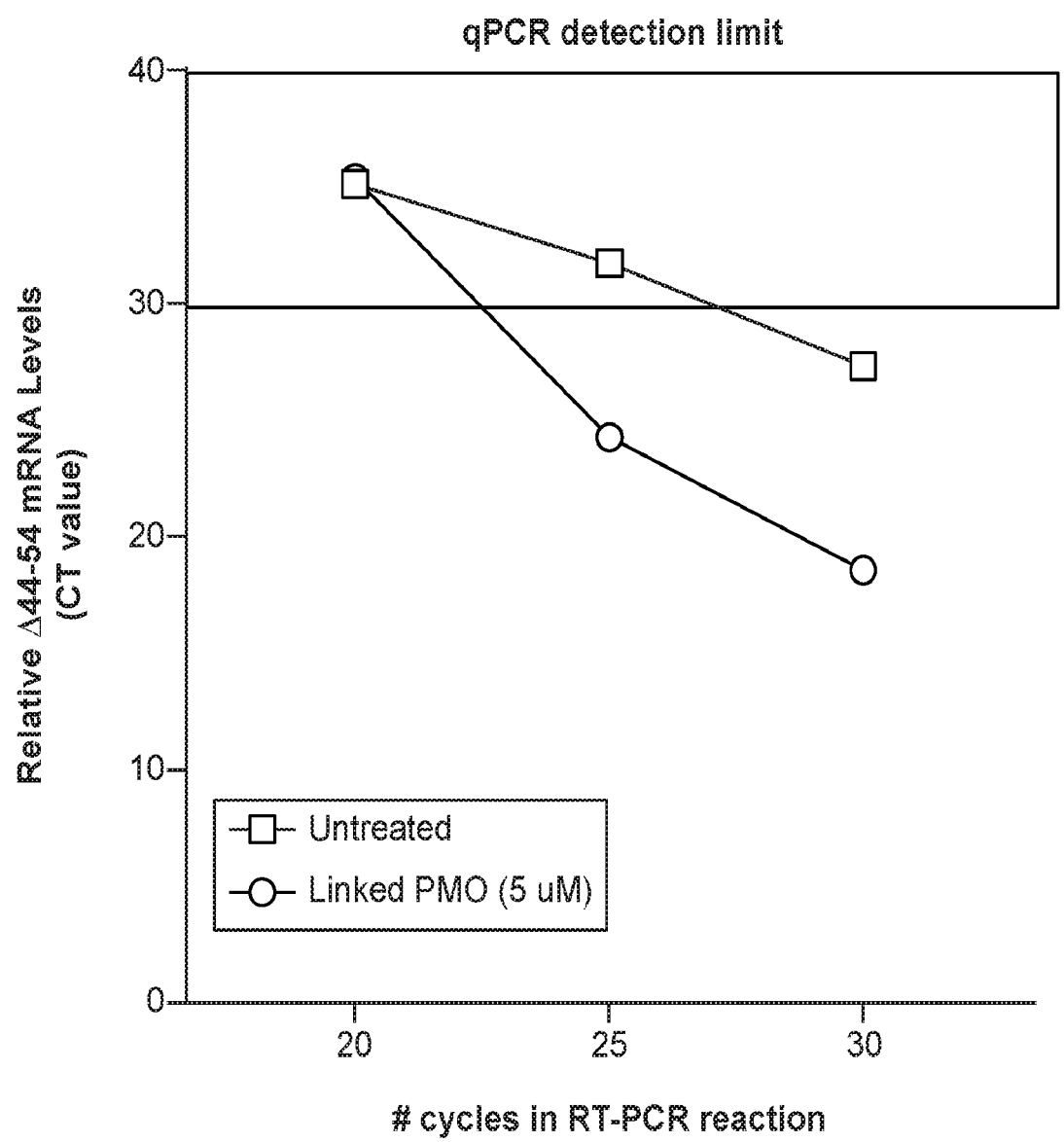

Example 4: Treatment with a Linked PMO Enhances Skipping of Exons 44-54 in Immortalized Human Skeletal Muscle Cells To determine whether the observed oligonucleotide-dependent increase in DMD multiple exon skipping translates to other exons, similar experiments as shown in Examples 2 and 3 were conducted to generate a Δ44-54 splice product. Unlike the Δ45-55 mRNA, which is generated spontaneously, a Δ44-54 mRNA has not been detected in human skeletal muscle cells (FIG. 6A-FIG. 6C).

These experiments were conducted with an immortalized human skeletal muscle cells line for which formation of myotubes needs to be induced by serum starvation. Briefly, immortalized human skeletal muscle cells (Institute of Myology, Paris) were plated in 500 ul Skeletal Muscle Cell Growth Medium (PromoCell C-23260) on 24-well collagen plates (Thermo Fisher A1142802) and incubated at 37° C. in 5% $CO_2$ until myoblasts became confluent. At this point differentiation to myotubes was induced by incubation in 500 ul differentiation medium (DMEM (Gibco 10566-016) supplemented with 10 ug/ml Insulin and 50 ug/ml gentamycin) for 4 days. The medium was refreshed and a purified linked PMO (A-P8-B) added to final concentrations of 0.16-5 uM. The treated cells were incubated for 48 hours before media was removed from wells and the cells were lysed through the addition of 300 uL Trizol (Ambion 15596018). RNA preparation and RT-PCR reactions followed the procedures described in Example 2, with exception that different primers were used to detect the Δ44-54 splice product (Forward primer: 5'-GCTCAGGTCGGAT-TGACATTA-3' (SEQ ID NO: 13); Reverse primer: 5'-GTCTTCTAGGAGCCTTTCCTTAC-3' (SEQ ID NO: 14)). Unlike for the Δ45-55 splice product, visualization of Δ44-54 splice products required a nested PCR reaction. To this end, the RT-PCR product was diluted 1:1000 with nuclease free water and a second PCR reaction was performed using DreamTaq PCR master mix (Thermo Fisher K1072), and 400 nM of a second primer set to amplify both DMD WT and Δ44-54 PCR products (Forward primer: 5'-GCTCTCTCCCAGCTTGATTT-3' (SEQ ID NO: 15); Reverse primer: 5'-GTAGCATCCTGTAGGACATTGG-3' (SEQ ID NO: 16)). The condition for this PCR reaction were as followed: 95° C., 2 min followed by 30 cycles of 95° C., 30 sec; 55° C., 30 sec; 72° C., 1 min, and a final extension step (72° C., 5 min). The final amplification products were separated on 4% TAE at 50V for 1.5 hrs (FIG. 6A). Purification and sequencing of the predicted Δ44-54 amplification products confirmed the expected exon 43/exon 55 splice junction (FIG. 6B).

Figure 5A:
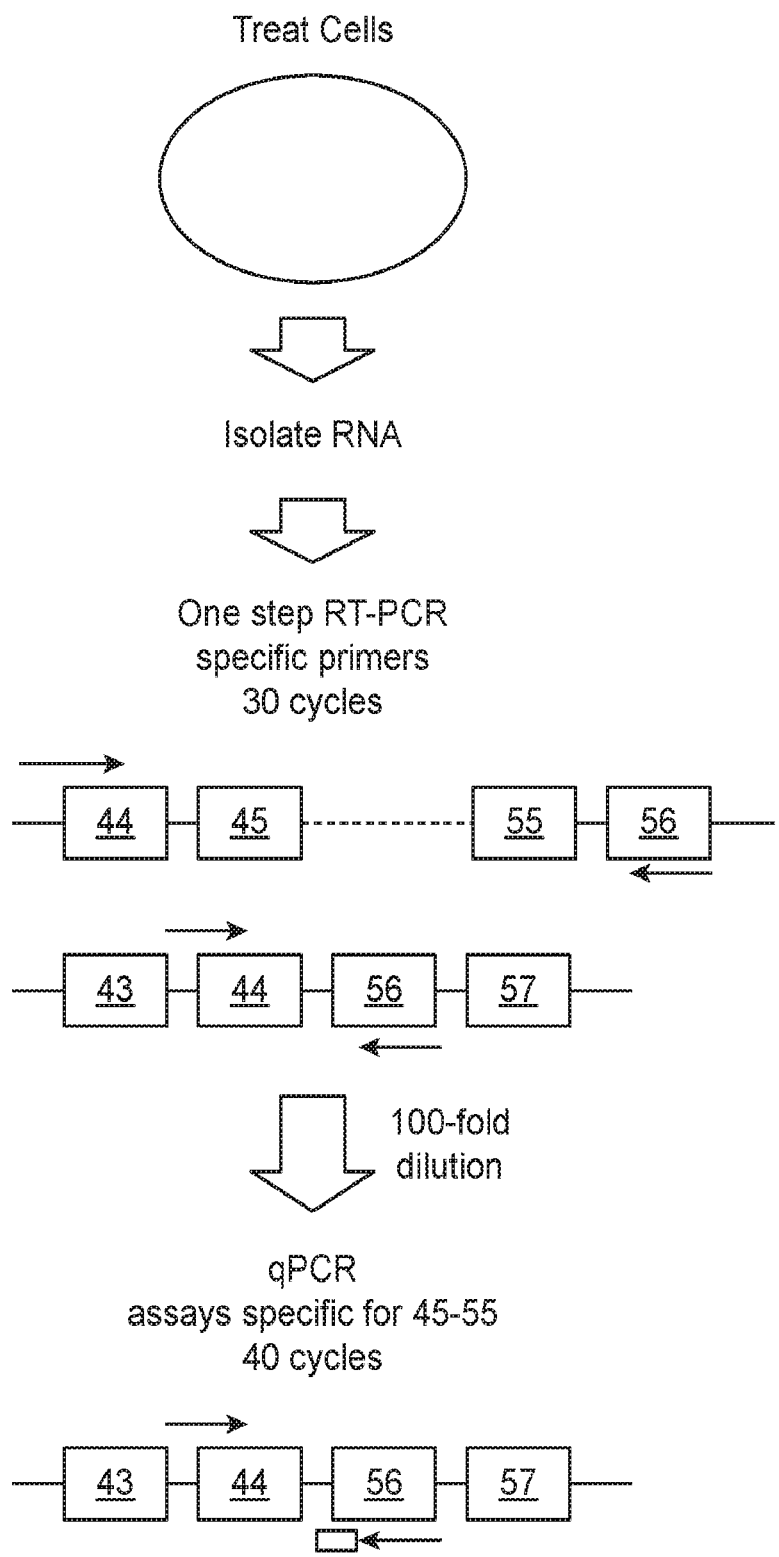
FIG. 5A-FIG. 5B show treatment of cells with selected exon skipping PMOs enhances skipping of exons 45-55 in human skeletal muscle cells.
Figure 5B:
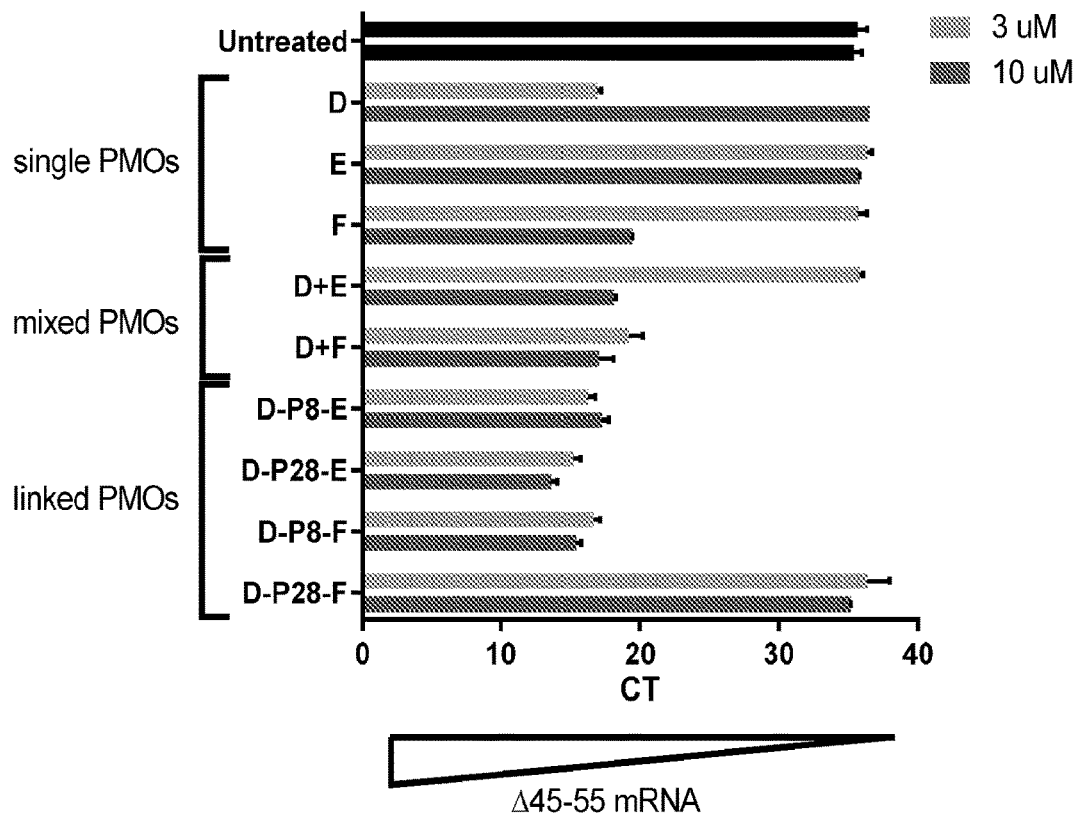

To quantify the relative abundance of the Δ44-54 splice product in untreated and linked PMO-treated cells a similar strategy was used as outlined in FIG. 5A, with exception that the number of cycles in the RT-PCR reaction was varied and that the qPCR reaction was performed using a Δ44-54 specific Taqman assay (Forward primer: 5'-CCCAGCTT-GATTTCCAATGG-3' (SEQ ID NO: 17); Reverse primer: 5'-TCGCTCACTCACCCCTTGTC-3' (SEQ ID NO: 18); Probe: 5'-AAGTTAACAAAATGTACAAGGAC-3' (SEQ ID NO: 19)). The results from the qPCR analysis are shown in FIG. 6C and suggest a >400-fold induction of Δ44-54 mRNA upon treatment of cells with the linked PMO.

The results demonstrate that linked PMOs can be used to generate various multiple exon skipped transcripts.

Figures 7A, 7B:
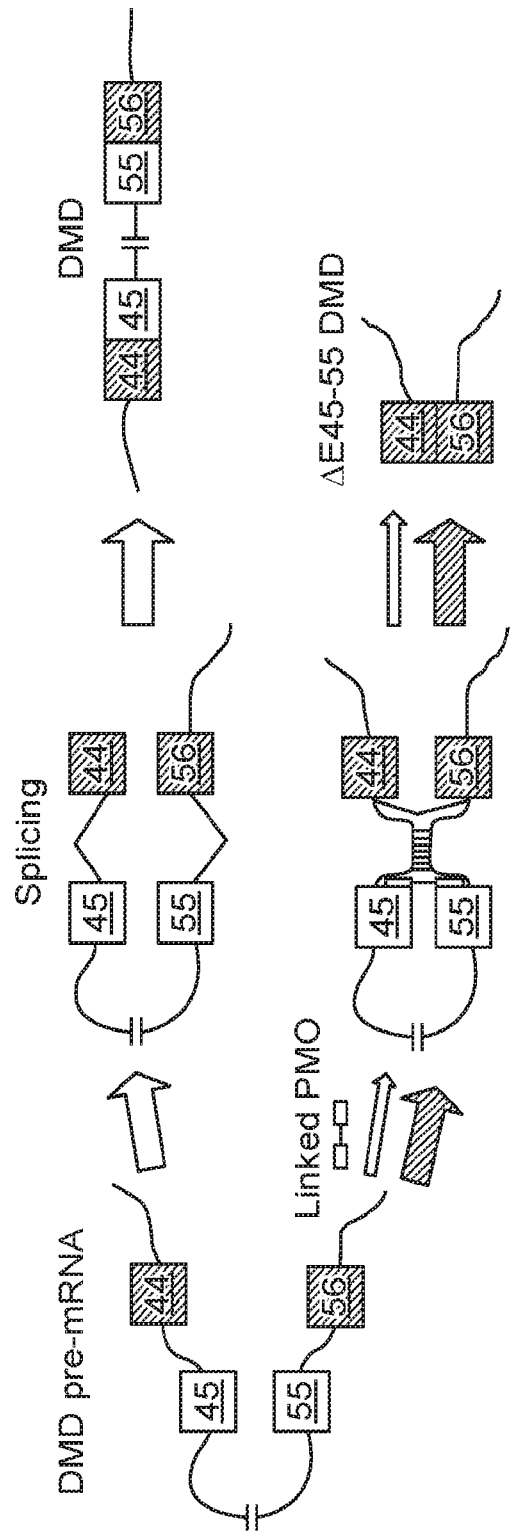
FIG. 7A shows the structure of the linked PMO used to evaluate skipping of DMD exons 45-55.
FIG. 7B shows the proposed mechanism of action of the linked E45-55 PMO.
Figure 7C:
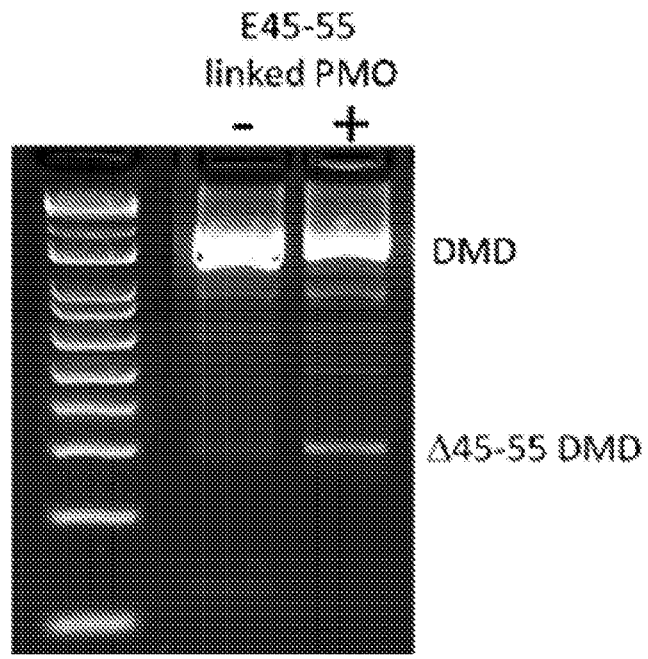
FIG. 7C shows increased occurrence of DE45-55 DMD following treatment of primary human skeletal muscle myotubes with 10 mM E45-55 linked PMO.
Figure 7D:
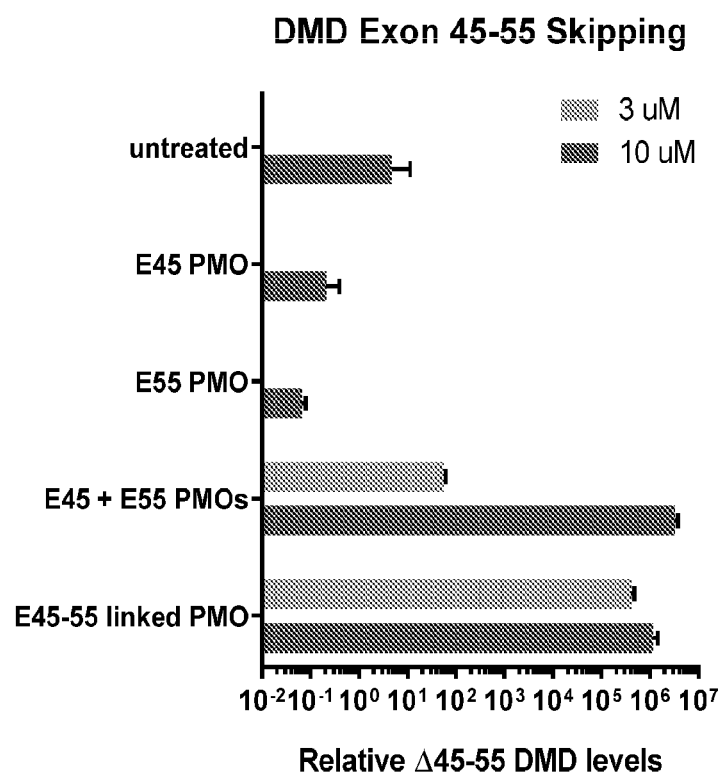
FIG. 7D shows quantification of DE45-55 DMD in primary human skeletal muscle cells transfected with 3 or 10 uM PMOs.

Example 5: Quantification of Exon 45-55 Skipping and Dystrophin Restoration in WT and DMD Patient-Derived Skeletal Muscle Cells Using published PMOs for skipping of DMD exons 45 and 55 (Lee J J A, et al., Direct Reprogramming of Human DMD Fibroblasts into Myotubes for In Vitro Evaluation of Antisense-Mediated Exon Skipping and Exons 45-55 Skipping Accompanied by Rescue of Dystrophin Expression. *Methods Mol Biol.* 2018; 1828:141-150), a linked PMO was synthesized that can hybridize simultaneously to both exons (FIGS. 7A and 7B). The shown hybridization between introns 44/45 and 55/56 is naturally occurring (Suzuki et al., Endogenous Multiple Exon Skipping and Back-Splicing at the DMD Mutation Hotspot. *Int J Mol Sci.* 2016 Oct. 13; 17(10)). When tested in primary human skeletal muscle cells, this linked PMO increased the levels of the DMD AE45-55 mRNA (FIGS. 7C and 7D). Due to the long half-life of dystrophin, skipping of relevant exons in 1-10% of DMD pre-mRNAs have proven enough to restore dystrophin associated activities in DMD muscle cells. Based on results presented by Suzuki et al. (2016), in normal muscle cells, AE45-55 mRNA appears to be expressed at a ratio of 1:4000 compared to full length DMD, suggesting that a 40- to 400-fold enhancement is needed to produce functional levels of AE45-55 dystrophin. The DE45-55 DMD PCR product was confirmed by sequencing. Expression of DE45-55 DMD was quantified by a nested RT-qPCR strategy using a probe specific for the exon 44-56 junction.

The results demonstrate linked PMO oligonucleotides targeting exon 45 and 55 enhance skipping of DMD exons 45-55.

Example 6: Efficiency of Exon 45-55 Skipping and Dystrophin Restoration Using Primary WT and Immortalized Patient-Derived Muscle Cells The linked PMO as described in Example 5 are tested in primary WT and immortalized patient derived muscle cells to compare the efficiency of exon 45-55 skipping and dystrophin restoration in these two cell types. The methodologies required to quantify RNA levels, quantitative Western blot analysis of dystrophin levels, and monitoring assembly of the dystrophin-associated-complex by IHC are well established.

Example 7: Monitor Dystrophin Restoration by an Exon 45-55 Skipping AOC in Skeletal Muscles and Heart of a Human DMD Mouse Model with Deletion of Exon 52

Figure 8A:
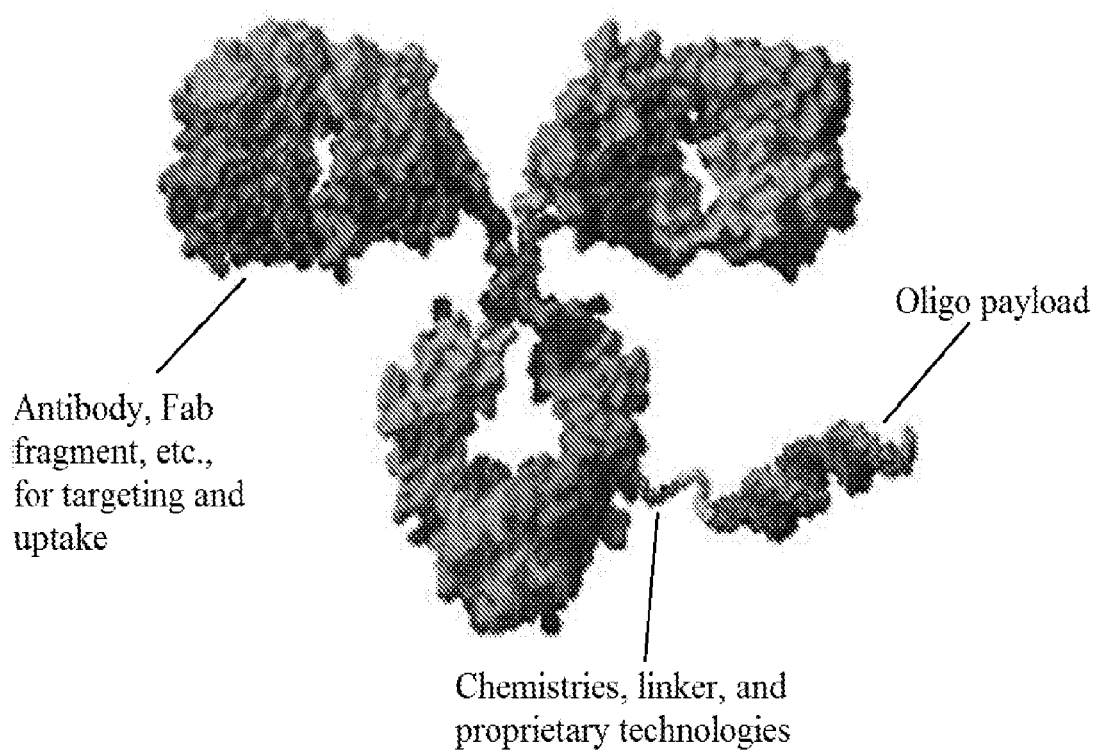
FIG. 8A shows general structure of Antibody-Oligonucleotide-Conjugates.
Figure 8B:
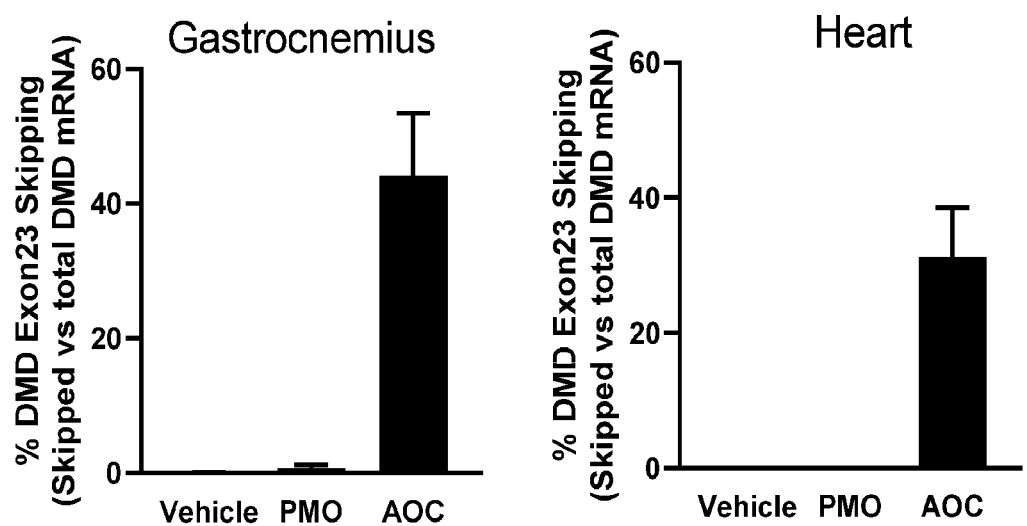
FIG. 8B shows exon 23 skipping in gastrocnemius and heart of mdx mice 14 days after a single 10 mg/kg dose of either PMO or AOC.
Figure 8C:
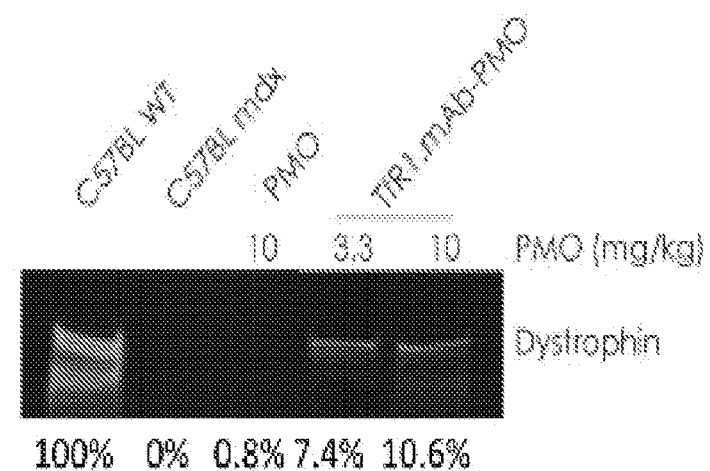
FIG. 8C shows a single 10 mg/kg AOC dose restores 10% of dystrophin protein WT levels in mdx mice.
Figure 8D:
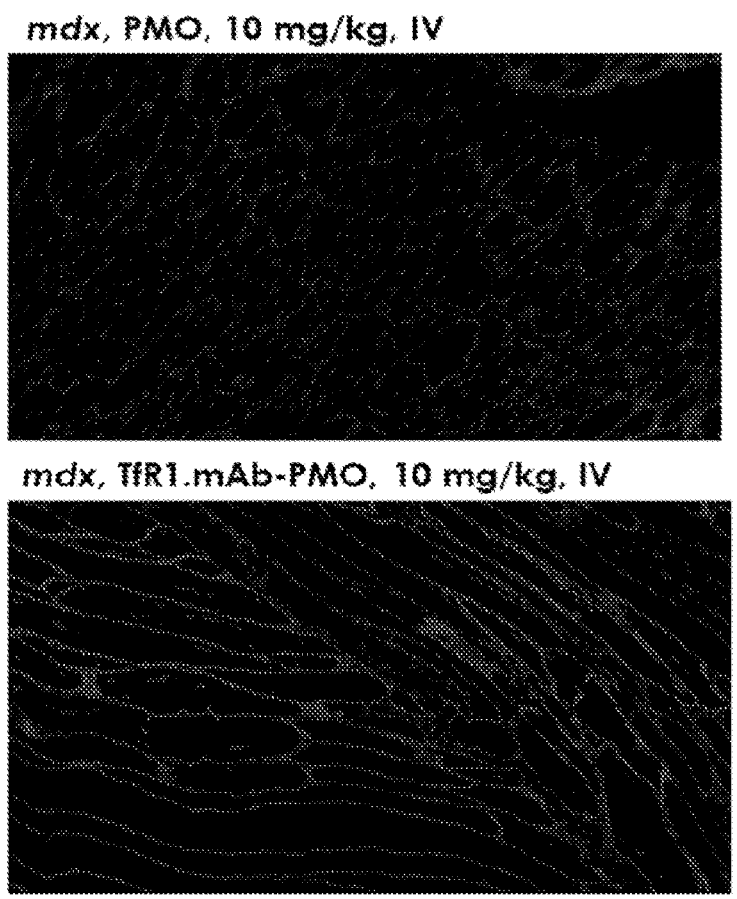
FIG. 8D shows uniform dystrophin protein expression (red) in gastrocnemius of mdx mice 28 days after a single AOC dose. Nuclei are stained blue (DAPI).

An in vivo model for DMD was generated using mdx mice. Exon skipping PMO oligonucleotides conjugated to a transferrin receptor antibody (FIG. 8A) showed mediation of efficient exon skipping in skeletal muscles and heart (FIG. 8B), and restoration of dystrophin expression with 100-fold higher potency than naked PMOs (FIGS. 8C and 8D). The antibody: PMO ratio was usually 1:3-4. In the case of naked PMOs, ~1000 mg/kg dosing over 3 weeks was required to restore dystrophin expression to similar levels.

Example 8: Demonstration of Improved Efficacy of Exon Skipping PMOs In Vivo Using Antibody PMO Conjugates Linked E45-55 PMO are conjugated to a commercially available mouse TfR1 antibody with monitoring of exon 45-55 skipping and dystrophin restoration in skeletal muscles and heart in a human DMD mouse model with deletion of exon 52.

Example 9: Identification of Linked PMO Leads for DMD Exon 45-55 Skipping

Length of the PEG linker and the position of PMOs at the splicing acceptor sites of exon 45 and 55 are optimized. PMOs targeting exon 45 and 55 are selected using the exon-skipping prediction program developed by Echigoya et al. (In silico screening based on predictive algorithms as a design tool for exon skipping oligonucleotides in Duchenne muscular dystrophy, *PLoS One* 2015 Mar. 27; 10(3)). A total of 25 linked PMOs are synthesized and tested for optimal exon 45-55 skipping activity in vitro. Selected linked PMO leads have high exon 45-55 skipping activity, and low off-target activity as evaluated by RNAseq in transfected primary skeletal muscle cells.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An oligonucleotide conjugate comprising a first oligonucleotide linked to a second oligonucleotide by a polymer comprising polyethylene glycol (PEG), wherein a 5' end of the first oligonucleotide is linked to one end of the polymer, and a 3' end of the second oligonucleotide is linked to another end of the polymer, wherein the first oligonucleotide hybridizes to a region in a first exon of a pre-mRNA and the second oligonucleotide hybridizes to a region in a second exon of the pre-mRNA, wherein the first exon and the second exon are not the same exon, wherein the oligonucleotide conjugate induces splicing out of an exon-containing lariat from the pre-mRNA to generate a processed mRNA, and wherein the processed mRNA encodes a truncated and functional protein.

2. The oligonucleotide conjugate of claim 1, wherein the first oligonucleotide or the second oligonucleotide is from about 10 to about 50 nucleotides in length or from about 10 to about 30 nucleotides in length.

3. The oligonucleotide conjugate of claim 1, wherein the first oligonucleotide or the second oligonucleotide comprises one or more phosphorodiamidate morpholino oligomers (PMO).

4. The oligonucleotide conjugate of claim 1, wherein the PEG comprises at least 2 repeating ethylene oxide units.

5. The oligonucleotide conjugate of claim 1, wherein the oligonucleotide conjugate is further conjugated to an anti-transferrin receptor antibody or antigen binding fragments thereof.

6. The oligonucleotide conjugate of claim 1, wherein the pre-mRNA encodes dystrophin, wherein the dystrophin comprises a mutation, a deletion, an insertion, or a combination thereof.

7. The oligonucleotide conjugate of claim 6, wherein the first exon is exon 39, 40, 41, 42, 43, 44, 45, 46, 47, 48, 49, 50, or 51 of DMD, and wherein the second exon is exon 51, 52, 53, 54, 55, 56, 57, 58, 59, 60, 61, 62, or 63 of DMD, and the first exon is at least 2 exons apart from the second exon.

8. A method of inducing multiple exon skipping from a pre-mRNA, comprising:
   contacting the pre-mRNA in a cell with an oligonucleotide conjugate comprising a first oligonucleotide linked to a second oligonucleotide by a polymer comprising polyethylene glycol (PEG), wherein a 5' end of the first oligonucleotide is linked to one end of the polymer, and a 3' end of the second oligonucleotide is linked to another end of the polymer, wherein the first oligonucleotide hybridizes to a region in a first exon of the pre-mRNA and the second oligonucleotide hybridizes to a region in a second exon of the pre-mRNA, wherein the first exon and the second exon are not the same exon, wherein the oligonucleotide conjugate induces splicing out of an exon-containing lariat from the pre-mRNA to generate a processed mRNA, and wherein the processed mRNA encodes a truncated and functional protein.

9. A method of treating a disease characterized by a defective protein function in a subject in need thereof, comprising:
   administering to the subject a pharmaceutical composition comprising an oligonucleotide conjugate comprising a first oligonucleotide linked to a second oligonucleotide by a polymer comprising polyethylene glycol (PEG), wherein a 5' end of the first oligonucleotide is linked to one end of the polymer, and a 3' end of the second oligonucleotide is linked to another end of the polymer, wherein the first oligonucleotide hybridizes to a region in a first exon of a pre-mRNA and the second oligonucleotide hybridizes to a region in a second exon of the pre-mRNA, wherein the first exon and the second exon are not the same exon, wherein the oligonucleotide conjugate induces splicing out of an exon-containing lariat from the pre-mRNA to generate a processed mRNA, and wherein the processed mRNA encodes a truncated and functional protein, thereby treating the disease or condition in the subject.

10. The method of claim 9, wherein the disease or condition is Duchenne muscular dystrophy, Becker's muscular dystrophy, facioscapulohumeral muscular dystrophy, congenital muscular dystrophy, myotonic dystrophy, a neuromuscular disease, a genetic disease, cancer, a hereditary disease, or a cardiovascular disease.

11. The method of claim 8, wherein the first oligonucleotide or the second oligonucleotide comprises one or more phosphorodiamidate morpholino oligomers (PMO).

12. The method of claim 8, wherein the PEG comprises at least 2 repeating ethylene oxide units.

13. The method of claim 8, wherein the oligonucleotide conjugate is further conjugated to an anti-transferrin receptor antibody or antigen binding fragments thereof.

14. The method of claim 8, wherein the pre-mRNA encodes dystrophin, wherein the dystrophin comprises a mutation, a deletion, an insertion, or a combination thereof.

15. The method of claim 8, wherein the first exon is exon 39, 40, 41, 42, 43, 44, 45, 46, 47, 48, 49, 50, or 51 of DMD, and wherein the second exon is exon 51, 52, 53, 54, 55, 56, 57, 58, 59, 60, 61, 62, or 63 of DMD, and wherein the first exon is at least 2 exons apart from the second exon.

\* \* \* \* \*

SEQUENCE LISTING

```
<160> NUMBER OF SEQ ID NOS: 22

<210> SEQ ID NO 1
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Gly Gly Phe Gly
1

<210> SEQ ID NO 2
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Ala Leu Ala Leu
1

<210> SEQ ID NO 3
<211> LENGTH: 4
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 3

Gly Phe Leu Gly
1

<210> SEQ ID NO 4
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
ccatttctca acagatctgt caaatcgc                                            28

<210> SEQ ID NO 5
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
gaagtttcag ggccaagtca tttgccac                                            28

<210> SEQ ID NO 6
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
caacagtttg ccgctgccca atgccatc                                            28

<210> SEQ ID NO 7
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
ttccaaagca gcctctcgct cactcacc                                            28

<210> SEQ ID NO 8
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
gacaagggcg atttgacag                                                      19

<210> SEQ ID NO 9
<211> LENGTH: 20
<212> TYPE: DNA
```

```
<213> ORGANISM: Artificial Sequence
<220> FEATURE:
<223> OTHER INFORMATION: Description of Artificial Sequence: Synthetic
      primer

<400> SEQUENCE: 9
tccgaagttc actccacttg                                                 20

<210> SEQ ID NO 10
<211> LENGTH: 26
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 10
gagaattggg aacatgctaa atacaa                                          26

<210> SEQ ID NO 11
<211> LENGTH: 25
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
aacatctgtg tgagcttcaa tttca                                           25

<210> SEQ ID NO 12
<211> LENGTH: 21
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 12
tggtatctta aggacctcca a                                               21

<210> SEQ ID NO 13
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13
gctcaggtcg gattgacatt a                                               21

<210> SEQ ID NO 14
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14
gtcttctagg agcctttcct tac                                             23

<210> SEQ ID NO 15
<211> LENGTH: 20
<212> TYPE: DNA
<213> ORGANISM: Artificial Sequence
```

<220> FEATURE:
<223> OTHER INFORMATION: Description of Artificial Sequence: Synthetic
      primer

<400> SEQUENCE: 15
gctctctccc agcttgattt                                              20

<210> SEQ ID NO 16
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 16
gtagcatcct gtaggacatt gg                                           22

<210> SEQ ID NO 17
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 17
cccagcttga tttccaatgg                                              20

<210> SEQ ID NO 18
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 18
tcgctcactc acccttgtc                                               20

<210> SEQ ID NO 19
<211> LENGTH: 23
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 19
aagttaacaa aatgtacaag gac                                          23

<210> SEQ ID NO 20
<211> LENGTH: 26
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20
atggtatctt aaggacctcc aaggtg                                       26

<210> SEQ ID NO 21
<211> LENGTH: 29
<212> TYPE: DNA
<213> ORGANISM: Artificial Sequence
<220> FEATURE:

```
<223> OTHER INFORMATION: Description of Artificial Sequence: Synthetic
      oligonucleotide

<400> SEQUENCE: 21
caaggaccga caagggtga gtgagcgag                                              29

<210> SEQ ID NO 22
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 22
ccactcactc gctctccgac gaaacctt                                              28
```